United States Patent [19]

Catapano et al.

[11] Patent Number: 5,504,843
[45] Date of Patent: Apr. 2, 1996

[54] APPARATUS AND METHOD FOR PROCESSING A STREAM OF IMAGE DATA IN A PRINTING SYSTEM

[75] Inventors: David A. Catapano, Rochester, N.Y.; Paul E. Reilly, Santa Clara, Calif.; Thomas B. Zell, Victor, N.Y.; Lillian-Liu Hsu; Eric W. Baxter, both of Rochester, N.Y.; Mark F. Simpson, Mountain View, Calif.

[73] Assignee: Xerox Corporation, Stamford, Conn.

[21] Appl. No.: 470,653

[22] Filed: Jun. 6, 1995

Related U.S. Application Data

[63] Continuation of Ser. No. 000,074, Jan. 4, 1993, abandoned.

[51] Int. Cl.⁶ .................................................. G06K 15/00
[52] U.S. Cl. ......................................... 395/115; 358/448
[58] Field of Search ........................... 395/114, 115, 395/325, 100, 101, 114, 115, 109; 364/241.8, 228, 229, 148

[56] References Cited

U.S. PATENT DOCUMENTS

| | | | |
|---|---|---|---|
| 4,653,112 | 3/1987 | Ouimette | 382/69 |
| 4,661,951 | 4/1987 | Segarra | 370/85 |
| 4,949,188 | 8/1990 | Sato | 358/448 |
| 4,993,025 | 2/1991 | Vesel et al. | 370/94.1 |
| 5,136,688 | 8/1992 | Morikawa et al. | 395/115 |
| 5,170,340 | 12/1992 | Prouop et al. | 364/143 |
| 5,175,679 | 12/1992 | Allen et al. | 364/148 |
| 5,325,484 | 6/1994 | Motoyama | 395/162 |

FOREIGN PATENT DOCUMENTS

| | | |
|---|---|---|
| 470782A3 | 2/1991 | European Pat. Off. . |
| 574224A2 | 6/1993 | European Pat. Off. . |
| 4013369 | 4/1992 | Japan . |

*Primary Examiner*—Mark R. Powell
*Assistant Examiner*—Gabriel I. Garcia
*Attorney, Agent, or Firm*—Gary B. Cohen; Thomas B. Zell

[57] ABSTRACT

A printing system for producing prints from a job represented by a stream of image data written in a page description language and having a token expressed as a plurality of bits. The stream of image data is generated by and transmitted from an image data source. The printing system comprises an input section, communicating with the image data source, for receiving the stream of image data. The input section includes an arrangement for reading a block of image data to determine the presence of the token in the block of image data. An area, communicating with the input section, is adapted to store the stream of image data. An arrangement, responsive to the reading means determining the presence of the token, is adapted to initiate a selected operation in the printing system after the input section receives a potion of the stream of image data. A parser, communicating with the storage area, is adapted to parse the stream of image data to separate the stream into a plurality of image-related components.

19 Claims, 12 Drawing Sheets

| | | |
|---|---|---|
| First Segment | Break Entry Length | Pointer to First Line Boundary Code |
| Second Segment | Break Entry Length | Pointer to First Line Boundary Code |
| Third Segment | Break Entry Length | Pointer to First Line Boundary Code |
| ⋮ | ⋮ | ⋮ |
| Nth Segment | Break Entry Length | Pointer to First Line Boundary Code |

73

5,504,843

APPARATUS AND METHOD FOR PROCESSING A STREAM OF IMAGE DATA IN A PRINTING SYSTEM

This is a continuation of application Ser. No. 08/000,072, filed Jan. 4, 1993, now abandoned.

BACKGROUND OF THE INVENTION

The present application is related to the co-pending U.S. patent application Ser. No. 08,000,072 entitled "Apparatus and Method for Storing and Printing Image Data", filed Jan. 4, 1993 (Attorney Docket No. D/92498).

The present invention relates generally to a technique for printing a stream of image data written in a printer page description language and more specifically to an image filtering arrangement which selectively removes one or more images from the stream of image data to thereby form a modified stream of image data.

Network printing systems are becoming prevalent in office settings where extensive document processing is performed. In one example of such network printing systems, a client at an input, such as a workstation, sends electronic documents that comprise a job over a local area network (LAN) to one of the printers selected for printing of the job. In particular, LANs provide a means by which users running dedicated processors are able to share resources such as printers, file servers and scanners. Integration of shared resources has been a problem addressed by LAN managers. LAN managers have made different network protocols transparent to devices running different network protocols. LANs also have a variety of print drivers emitting different page description languages (PDLs), which are directed to specific print devices.

In the exemplary network printing system, image data is transmitted to an electronic printing system, such as a network DocuTech® electronic printer manufactured by Xerox® Corporation, in the form of a stream of image data expressed in terms of the PDL. The PDL stream can include, among other things, an image, such as a bitmap, or a reference to one or more images existing outside of the PDL stream. Preferably, as discussed in the following patent application, the pertinent portions of which are incorporated herein, a decomposer, with one or more processors and suitable software, is employed to "take apart" an input document so that the PDL is "parsed" into various image related components with a preparser.

> Patent application Ser. No. 07/898,761 Entitled: Apparatus and Method for Multi-Stage/Multi-Process Decomposing Filed: Jun. 12, 1992

As discussed in the above-indicated reference, the decomposer executes the PDL to generate imaging primitives. In doing this, the decomposer, for example uses an arrangement for parsing the PDL into various image related components. The types of operations required to generate imaging primitives include, among others, binding fonts with requested fonts, any image processing on pictorial information, and/or converting line art/graphics (including bitmaps) to lower level primitives.

As disclosed in the above-discussed reference, the decomposer of the exemplary network printing network is designed to receive only one job file at a time. While the system can store a plurality of job files, in anticipation of parsing them, such storage can result in less than desirable machine output, or, more specifically, in reduced printing speeds. That is, the amount of image data contained in a given job file can be relatively large, if not immense, so that storing the job file out, rather than transmitting it directly from the network input to the parsing arrangement, can result in loss of time since, due to the amount of image data in the job file, a significant delay inevitably occurs when the job file is retrieved from storage for decomposing.

Additionally, due to the size of various images in the job file, and the finite resources of the decomposer, a significant amount of time can be expended in parsing the images of the PDL stream. Delays generated by relatively slow parsing can be compounded in a system where multiple jobs are queued up for decomposing. For example, in a situation where n jobs are queued up for decomposing, the time that it takes for the decomposer to finally get to the nth job will be affected by the amount of time that it takes to parse each of the n-1 job files which is ahead of the nth job file in the queue.

It would be desirable to provide an intelligent spooling arrangement which maximizes throughput of the printing system.

SUMMARY OF THE INVENTION

In accordance with the present invention there is provided a printing system for producing prints from a job represented by a stream of image data written in a page description language and having a token expressed as a plurality of bits, the stream of image data being generated and transmitted from an image data source. The printing system comprises: an input section, communicating with the image data source, for receiving the stream of image data, the input section including means for reading a block of image data to determine the presence of the token in the block of image data; means, communicating with the input section, for storing the stream of image data; means, responsive to the reading means determining the presence of the token, for initiating a selected operation in the printing system after the input section receives a portion of the stream of image data; and a parser, communicating with the storage section, for parsing the stream of image data to separate the stream into a plurality of image-related components.

These and other aspects of the invention will become apparent from the following description, the description being used to illustrate a preferred embodiment of the invention when read in conjunction with the accompanying drawings.

DESCRIPTION OF THE PREFERRED EMBODIMENTS

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Figure 1:
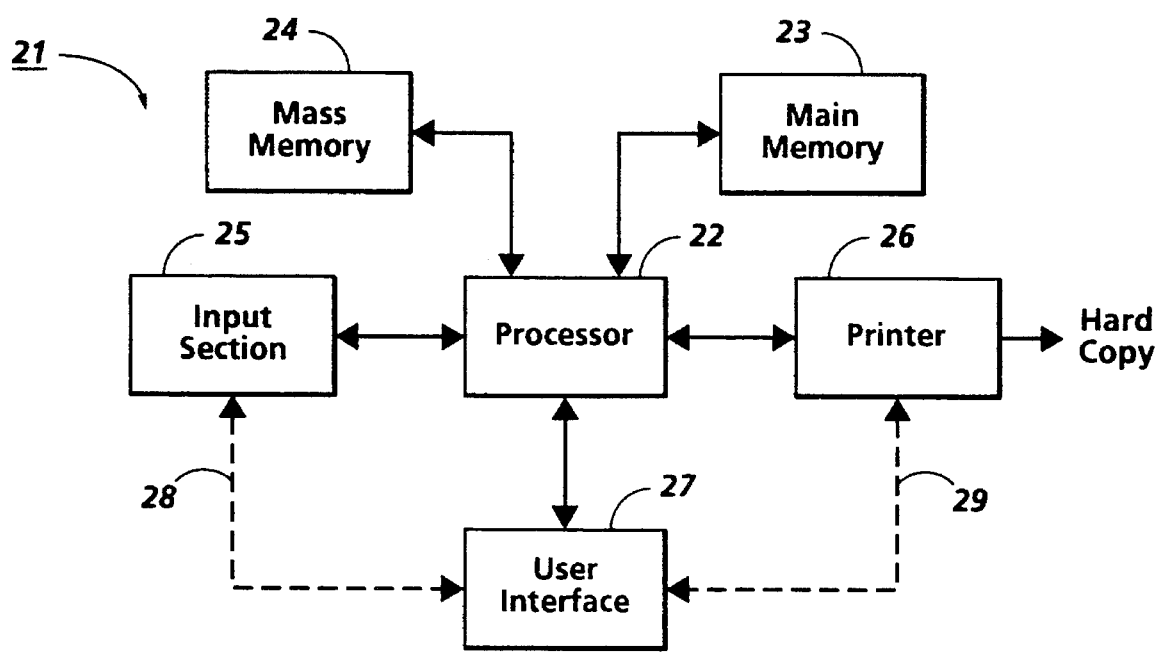
FIG. 1 is a block diagram of a printing system in which the present invention can be carried out.

Turning now to the drawings, and at this point especially to FIG. 1, there is an electronic printing system 21 to illustrate a typical environment for this invention. In keeping with standard practices, the printing system 21 comprises a digital processor 22 having a main memory 23 and a mass memory 24, an input section 25 for providing a job written in a printer page description language (PDL), and a printer 26 for printing hardcopy renderings of selected image components obtained from the PDL. Furthermore, there is a user interface 27 for enabling a user to interact with the processor 22, the input section 25, and the printer 26.

As will be understood, the user interface 27 collectively represents the input devices through which the user enters image editing and manipulation instructions for the processor 22. Additionally, the interface 27 represents the output devices through which the user receives feedback with respect to the actions that are taken in response to the instructions that are entered by the user or otherwise, such as under program control. For example, the user interface 27 generally includes a keyboard or the like for entering use instructions, a monitor for giving the user a view of the process that is being performed by the processor 22, and a cursor controller for enabling the user to move a cursor for making selections from and/or for entering data into a process that is being displayed by the monitor (none of these conventional components is shown).

The illustrated printing system 21 is centralized, so it has been simplified by assuming that all control instructions and all image editing and manipulation instructions are executed by the processor 22 under program control. In practice, however, the execution of these instructions may be handled by several different processors, some or all of which may have their own main memory and even their own mass memory. Likewise, either or both of the input section 25 and the printer 26 may have its own user interface, as indicated by the dashed lines 28 and 29, respectively. Indeed, it will be evident that the printing system 21 could be reconfigured to have a distributed architecture to operate with a remote input section and/or a remote printer (not shown). Data could be transferred from and to such remote input section and printer terminals via dedicated communication links or switched communication networks (also not shown).

Figure 2:
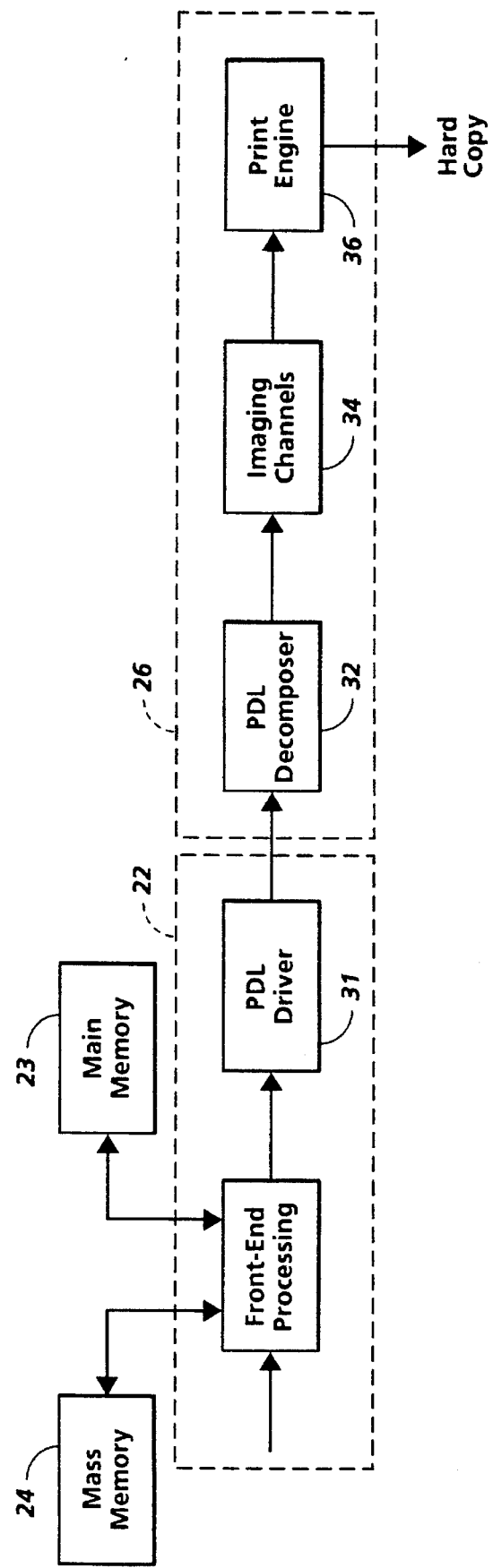
FIG. 2 is a, block diagram of a processor/printer interface for the printing system shown in FIG. 1.

As shown in FIG. 2, the processor 22 preferably includes a PDL driver 31 for transferring to the printer 26 PDL descriptions of the electronic document files that are selected for printing. Thus, the printer 26 is illustrated as having a PDL decomposer 32 for decomposing such PDL descriptions to produce corresponding bitmapped image file. It will be appreciated, particularly in view of the discussion below, that the decomposer 32 is capable of receiving PDL files from mass memory, such as disk, or from off the network "on the fly." Additionally, the printer 26 includes a print engine 36, the print engine 36 including one or more image data buffering devices and being coupled with the decomposer 36 by way of an arrangement of imaging channels 34. The significance of the imaging channels will be discussed in further detail below.

Figure 3:
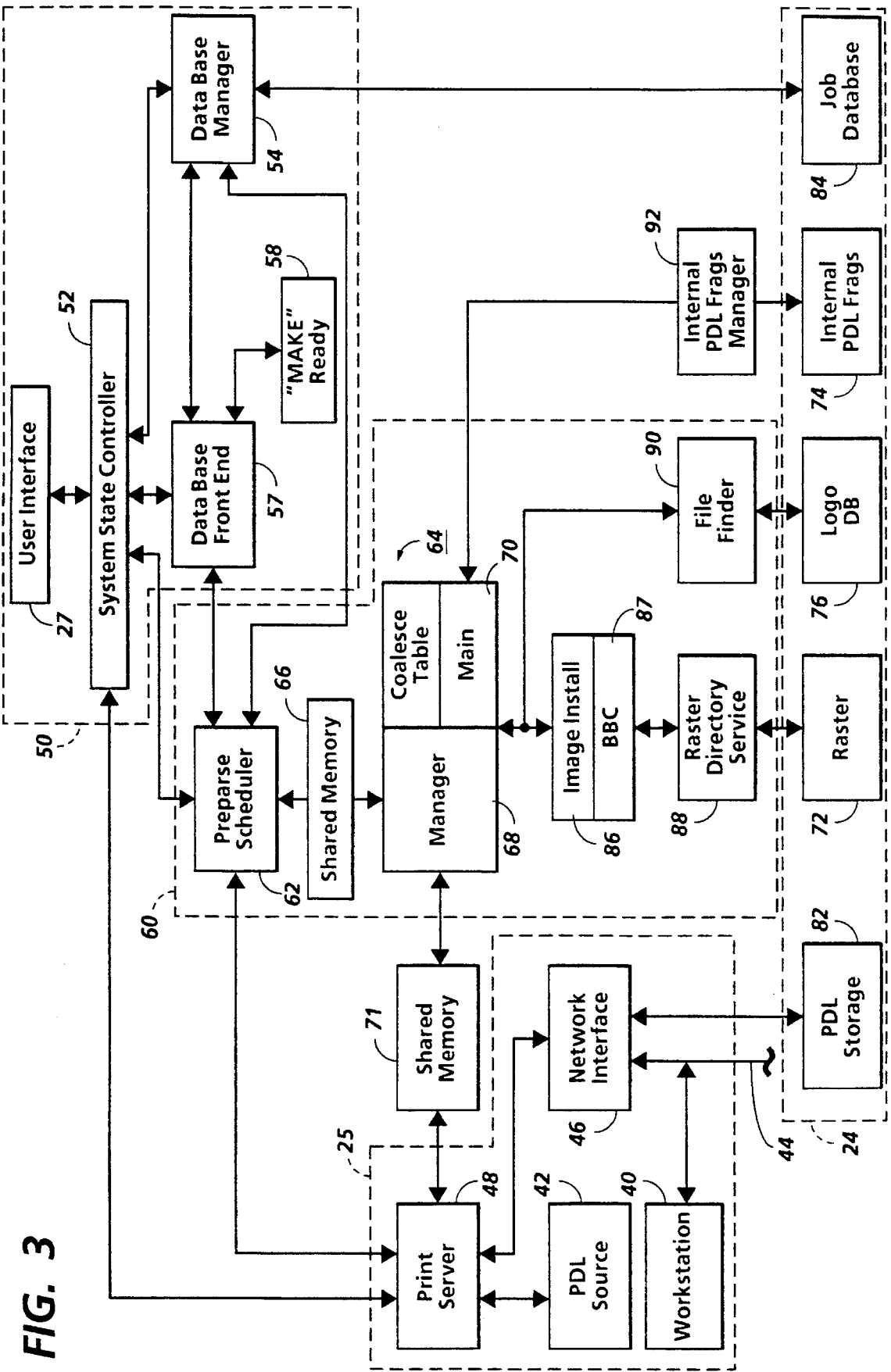
FIG. 3 is a block diagram of selected sections of a decomposer for the printing system of FIG. 1, the selected sections including an input section, a system managing section and a parsing section.

Referring to FIG. 3, an arrangement including the mass memory 24, the input section 25 and a portion of the decomposer 32 is shown. In the illustrated embodiment of FIG. 3, the input section 25 comprises up to two PDL emitters, such as a workstation 40, or any other suitable PDL source 42. In one Example the workstation 40 is Xerox® 6085 (the term "Xerox 6085" is a trademark used by Xerox® Corp.) workstation coupled with a network 44, such as a network sold by Xerox® Corp. under the trademark of EtherNet™. The network is interfaced with the decomposer 32 by way of a suitable network interface 46, which could include one of many known interfaces such as TCP/IP™, AppleTalk™ of Token Ring™. Both of the workstation 40 and the PDL source 42 are interfaced with the decomposer 32 by way of a print server 48, which print server 48 can be a suitable protocol corresponding with the specifications of the PDL Source 42 and/or the network interface 46. The, print server 48 communicates with a system manager 50.

In the preferred embodiment, the system manager 50 comprises a system state controller (SSC) 52 of the type disclosed in U.S. Pat. No. 5,170,340 to Prokop et al., the pertinent portions of which are incorporated herein, the user interface (UI) 27, which, in one example, is of the type disclosed in U.S. Pat. No. 5,083,210, the pertinent portions of which are incorporated herein, a database manager 54 and a database front end processor 57. Additionally, the database manager 54 preferably comprises a database job queue and a database coalescer table. The features of the present invention can be obtained through use of any suitable, commercially available database. Alternatively, one of ordinary skill in the art could, without undue experimentation, construct the database of the present invention by reference to one of several known texts, such as the following text:

Martin, J. Computer Data-Base Organization Prentice Hall, Inc. Englewood Cliffs, N.J. 1975

The database front end processor 57, which serves to define the structure of the PDL job, and the sequence in which image related identifiers stored in the database are operated on, can be constructed by those skilled in the art in view of the type of database manager selected for use. As will appreciated from the discussion below, the database manager 54 is the conduit through which virtually all image related identifiers and all job identifiers ("handles") flow. Moreover, editing of postparsed information is achieved by use of a "make ready" process 58 which is coupled with the front end 57. The "make ready" process, which serves to interpret operator commands for performing bitmap processing, is used in the DocuTech™ electronic printer which is sold by Xerox® Corp.

Referring still to FIG. 3, the print server 48, the SSC 52 and the data base front end processor 57 each communicate with a parsing section 60 by way of a preparse scheduler 62. In the preferred embodiment, the steps of the parsing section 60 are performed on a MESA™ processor of the type manufactured by Xerox® Corp. The preparse scheduler 62 communicates with a preparser 64 by way of a block of shared memory 66. In the preferred embodiment of the present invention, the preparser includes a manager section 68 and a main section 70. In one example, the manager section comprises a MESA™ processor of the type referred to immediately above, and the main section comprises a similar processor and a math coprocessor, the math coprocessor being similar to any one of a number of commercially available math coprocessors. Additionally, the manager 68 communicates with the print server 48 by way of shared memory 71, and the main section 70 is configured to store a coalesce table, the significance of which table will be discussed in further detail below.

The preparser 64, which serves to break up PDL into image related components, is capable of storing those components in mass memory 24, which, in the preferred embodiment is a disk storage device, such as the one used on the DocuTech™ electronic printer manufactured by Xerox® Corp. Preferably, the disc storage device is adapted to receive rasters or bitmaps in raster storage section 72 and internal PDL fragments ("internal PDL frags") in internal PDL frags. section 74. It should be recognized that internal PDL fragments are higher level primitives to be imaged on a substrate. In one example, an internal PDL fragment serves to transform coordinate systems inputted to the decomposer for printing. Employment of other storage sections in the mass memory 24 to receive other image related components is contemplated by the present invention.

In practice, the mass memory 24 is configured to not only receive and store the image related components developed by the preparser 64, but to store, on a long term basis, a relatively large variety of logos (in logo DB storage section 76) and fonts (in a font storage section which is not shown). Employment of other storage sections in the mass memory 24 to store other image related components, on a long term basis, is contemplated by the present invention. Additionally, the disc storage device preferably includes section 82 for storing PDL files to be processed and a section 84 for storing all information communicated to the database manager 54. Preferably, the storage section 82 is used in conjunction with volatile memory, such as cache so that each PDL job need not necessarily be stored out to disk. In one example, the job database 84 is adapted to contain a structure for image related components of a job written in a PDL. It will be appreciated by those skilled in the art that a suitable memory arrangement could be used in place of the job database without affecting the underlying concept of the present invention.

Figures 4, 5:
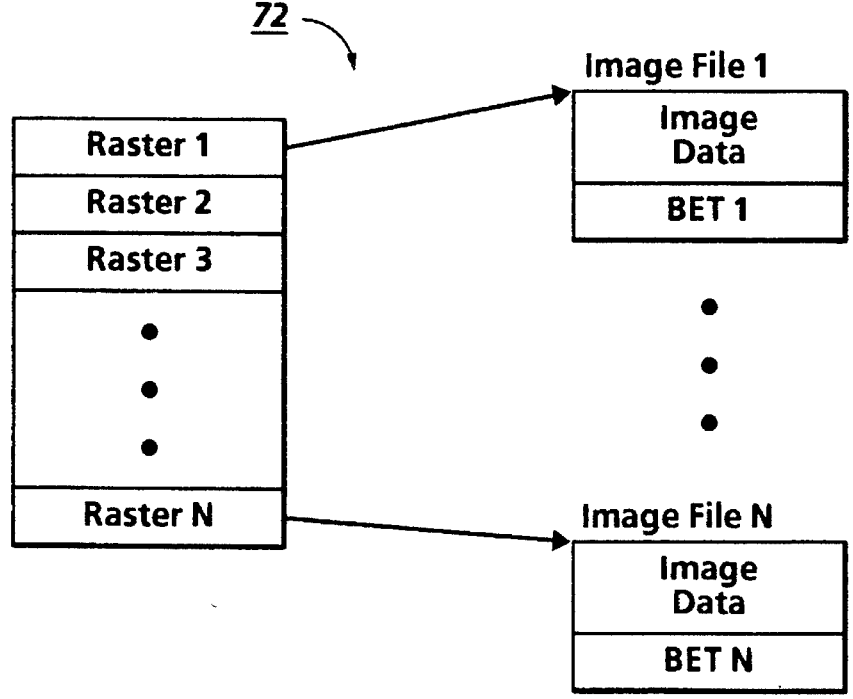
FIG. 4 is a schematic view of a prediction break table used in conjunction with a technique of the present invention.
FIG. 5 is a block diagram illustrating the manner in which bitmaps, processed in accordance with the technique of the present invention, are stored in memory.

In practice, the preparser 64 is interfaced with the raster section 72 by way of an image install process 86, a Boundary Code Catcher ("BCC") 87 and a raster directory service (DS) 88. Preferably, the BCC achieves its intended purpose through use of a plurality of programmable logic arrays programmed with suitable software, the details of the software being discussed in further detail below. In one embodiment of the present invention, each raster or bitmap is stored in the storage section 72 with a corresponding break entry table ("BET") 73, an example of which break entry table is shown in FIG. 4 as an array of break table segments. A detailed discussion of the format used for table 73 is provided in the following reference, the pertinent portions of which are incorporated herein by reference:

Title: Xerox Raster Encoding Standard ("Encoding Standard") Publication No. XNSS 178905 Publication Date: 1990

As explained in further detail below, each bitmap comprises an image, defined by one or more blocks of image data. Each block is divided into a plurality of segments with break entries, each entry designating a scanline count. Preferably, the BCC 87, in accordance with the algorithm discussed below, builds the table 73 by indicating the location of each break entry in the image and relating it with a pointer to corresponding line control code.

In accordance with the above-described embodiment, the preparser 64 is interfaced with the logo DB section 76 (FIG. 3) by way of a file finder process 90 and the internal PDL frags section by way of Internal PDL Frags Manager 92. Referring to FIGS. 3 and 5, one or more supplemented bitmaps are transmitted from the BCC 87 to the raster DS 88. Each supplemented bitmap comprises a bitmap with its corresponding BET. As illustrated specifically in FIG. 5, each supplemented bitmap is assigned an image identifier and the image identifier is stored in the raster DS 88. Moreover, each image identifier points to one of the supplemented bitmaps stored in the storage section 72. Finally, for the illustrated embodiment of FIG. 3, copies of the corresponding image identifiers from the raster DS 88 are passed to the preparser 64.

Referring still to FIG. 3, the internal PDL frags manager 92 is adapted to assign an image identifier to each internal PDL fragment transmitted thereto, and pass each of those identifiers to the preparser 64. On the other hand, the file finder 90 assigns an identifier to calls for logos received at the preparser 64 from the print server 48, and permits the logos to be fetched by the preparser 64 when they are available in the logo DB section 76. When the called for logo is not available in the logo DB section, the file finder 90 is capable of issuing an appropriate fault message for display at the UI 27 or for printing with a hardcopy print.

Figure 6:
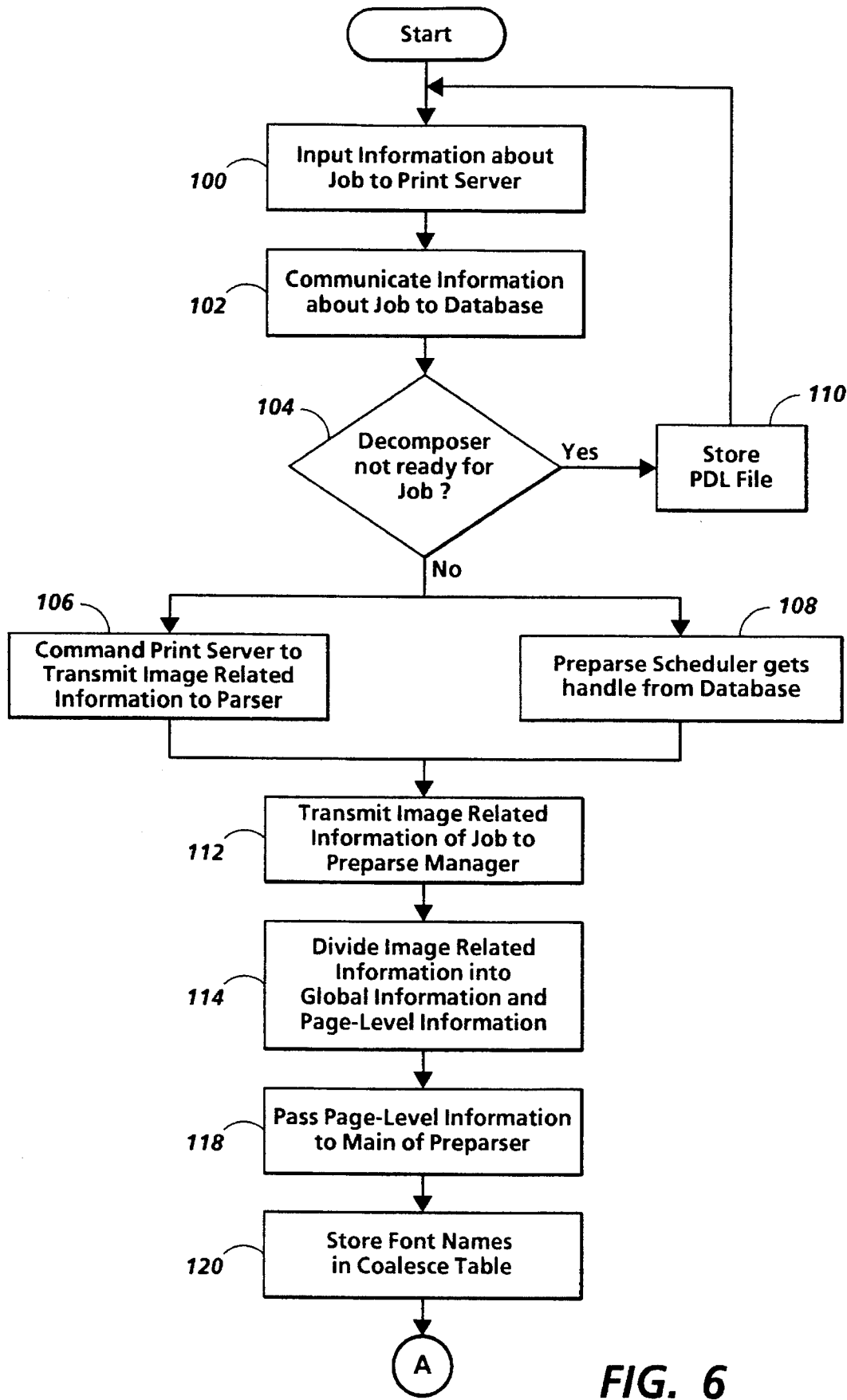
FIGS. 6 and 7 conjunctively represent a flow diagram depicting a preferred mode of operation for the input section, system managing section and/parsing section of FIG. 3.
Figure 7:
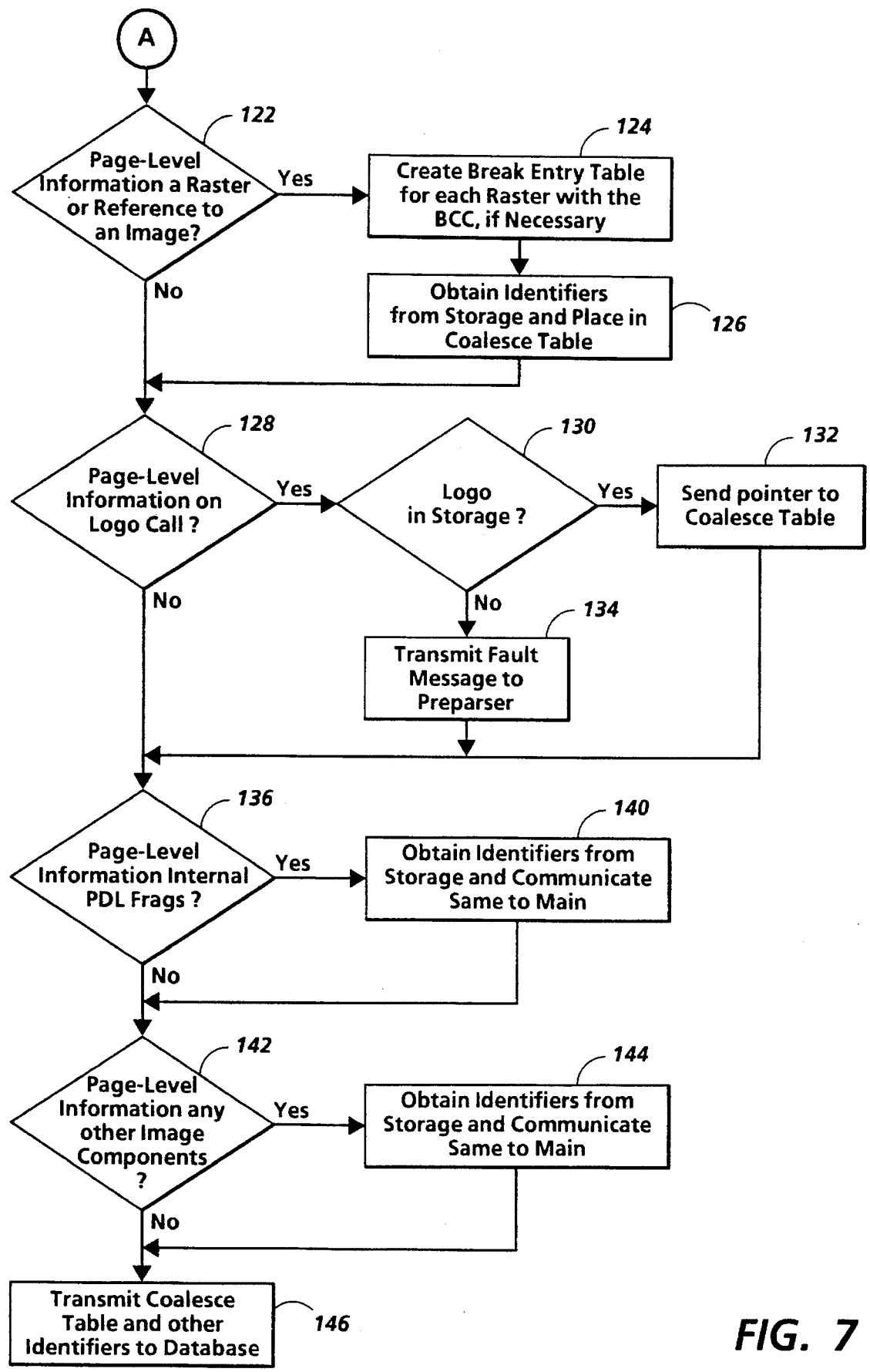

Referring to FIGS. 6 and 7, the inputting and parsing of the PDL file(s) will be discussed in further detail. Referring specifically to FIG. 6, at step 100, a job file written in a particular PDL, such as Interpress used by Xerox® Corp., is provided from either the workstation 40 or the PDL source 42. Upon inputting the PDL job to the print server 48, basic information regarding, for example, the structure of the job and the order in which the job should be processed, is transmitted to the database manager 54 (step 102) by way of the preparse scheduler 62 and the database front end processor 57. The database manager 54 indicates to the SSC 52 that it has a job, and in due course, provided that the decomposer is ready (see step 104), the SSC 52 commands the print server 48 to begin transmitting blocks of the PDL file to the manager section 68 across shared memory block 71 (step 106) and causes the preparse scheduler 62 to obtain a job identifier ("handle") from the database manager 54 (step 108). The handle represents the information that the preparse scheduler 62 will need to pass the image related identifiers resulting from the parsing process on to the database manager 54. Alternatively, as illustrated by steps 104 and 110, if a job is ready to be inputted concurrent with a job being processed, the job that is ready to be inputted can be stored for subsequent processing. In one preferred embodiment of the present invention, as described in further detail below, step 110 is performed in conjunction with a filtering technique.

As the PDL is transmitted to the manager section 68 (step 112), it is, per step 114, broken down into global information, such as a header and a preamble, and page level information. Additionally, the manager 68 finds the beginning of each page within the job file (" master") for setting up the image related components ("data structures") to be received by the main section 70. Essentially, the manager functions as a syntactical analyzer, insuring that the syntax of the encoded PDL master is correct. The manager preferably performs some pre-work for the main 70 and possesses limited interpretative capabilities.

At step 118, page-level information is passed from the manager 68 to the main 70 at which information, or, more specifically, data structures are created. The main looks into a linked list of set up pages and sequentially decomposes them. The manager and the main can work on separate pages or the main can work ahead of the manager within a page. Once the manager has created a data structure for a page, the main executes data structures within the page for storage in the mass memory 24. Per step 120, the main 70 inserts any font names that it gleans from pages in a coalesce table stored in the main.

Referring to FIG. 7, once the page-level data structures are available, identifiers therefore are obtained. If rasters (i.e., bitmaps) or references to rasters ("tokens of interest") are found among the data structures (step 122), the rasters are communicated to the raster storage section 72 by way of the image install 86 and the raster DS 88. For each raster found among the data structures, a break entry table is created, with the BCC 87, at step 124. An approach for processing the rasters referenced by the tokens of interest is described in further detail below. Per step 126, the rasters, with their respective break entry tables, are assigned identifiers by the raster directory service, and the identifiers are passed to the main 70 for placement in the coalesce table.

If logo calls, i.e., calls for a merge item, are found among the data structures (step 128), the file finder 90 checks to see if the logos are in the logo DB section 76 (step 130). For those logos in the logo DB, corresponding pointers for the available logos are communicated to the main (step 132) for placement in the coalesce table. For those logos not in the logo DB, a fault message is, per step 134, returned to the main for eventual display or printing into hardcopy. Per steps 136 and 140, internal PDL fragments are created and communicated to the internal PDL frags storage section 74 by way of the internal PDL frags manager 92. With step 140, the internal PDL fragments are assigned identifiers or "tokens" by the internal PDL frags manager 92, and the identifiers are passed to the main 70. As shown by steps 142 and 144 any other data structures flowing from the main 70 would be handled in a manner similar to that shown for rasters or internal PDL fragments. After all of the identifiers are provided to the main 70, a signal is sent to the preparse scheduler 62, and the identifiers, per step 146, are communicated to the database manager 54.

Figure 8:
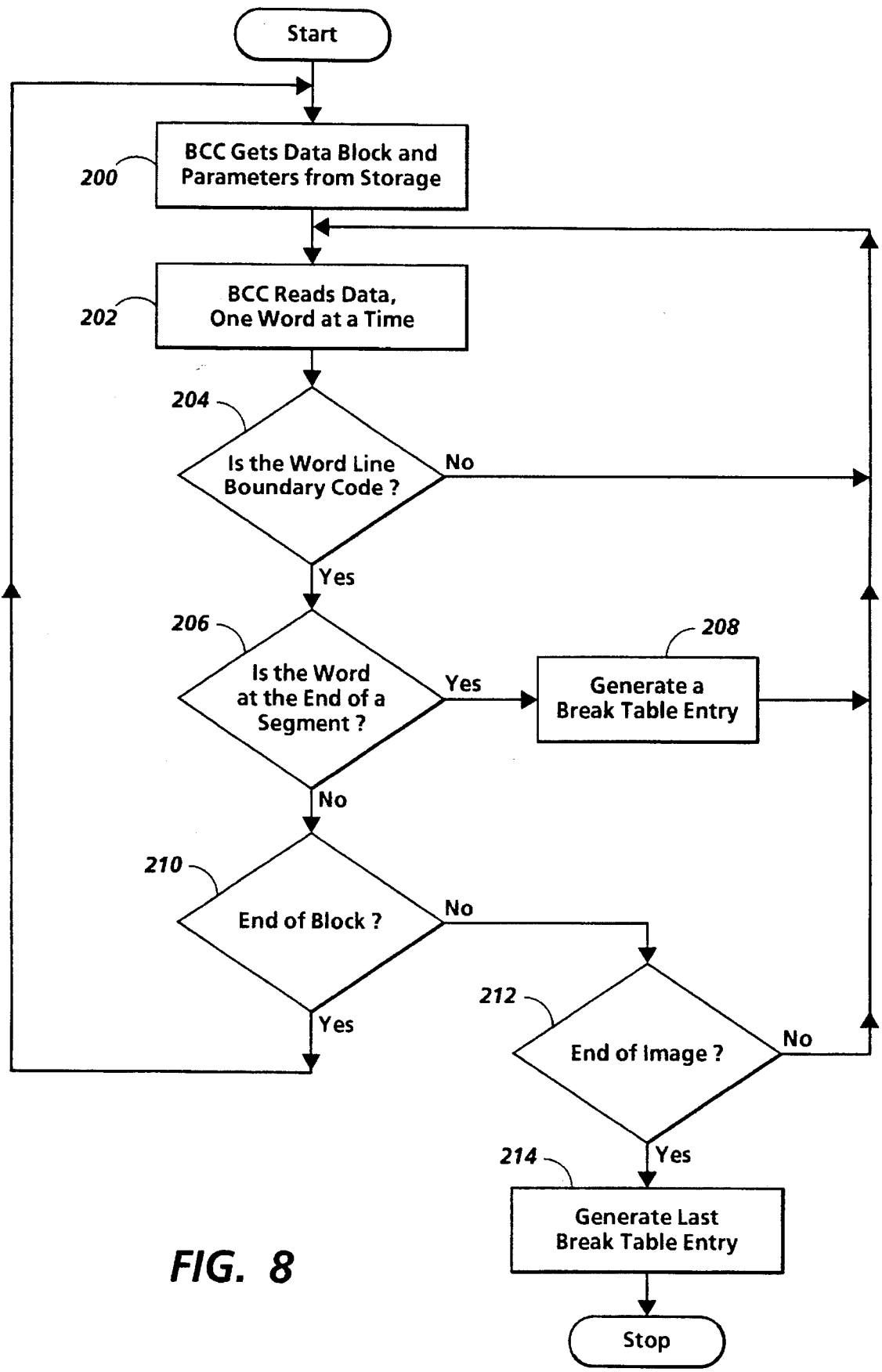
FIG. 8 is a flow diagram demonstrating the operation of a boundary code catcher ("BCC"), the BCC being used, preferably, in conjunction with either the input section or the parser.

Referring to FIG. 8, a technique for creating the break entry table 73 of FIG. 4 is discussed in further detail. In the preferred embodiment of the present invention, one or more data blocks, representing a bitmap, are buffered and, initially, at step 200, the BCC 87 fetches a data block, along with pertinent parameters, such as "image handle", "pixel sequence type", "pixel encoding offset", etc. The BCC 87 then reads one word of image data at-a-time (step 202), from the block of image data, and stores any line boundary code.

If a word is not line boundary code (step 204) then the process returns to step 202. If, on the other hand, the word is line boundary code, then the word is examined, per step 206, and it is determined whether the word is at the end of a segment. If the word marks the end (or, alternatively, the beginning) of a segment, then a break table entry is generated (step 208) and a check is performed, at step 210, to determine if the entire image of the bitmap has been examined. When the end of the image is reached (step 212), the current break table entry is designated as the "Last Break Table Entry". If the word does not mark the end of a segment (step 206), but the word is at the end of the block being examined (step 214), then the process returns to step 200 to fetch another block of image data, provided another block is in the image install 86. When the word is neither the end of a segment nor the end of a block (steps 206, 214), a check is performed to determine if the end of the image has been reached. When the end of the image has been reached, the process ends, as described above, otherwise the process returns to step 202.

Figure 9:
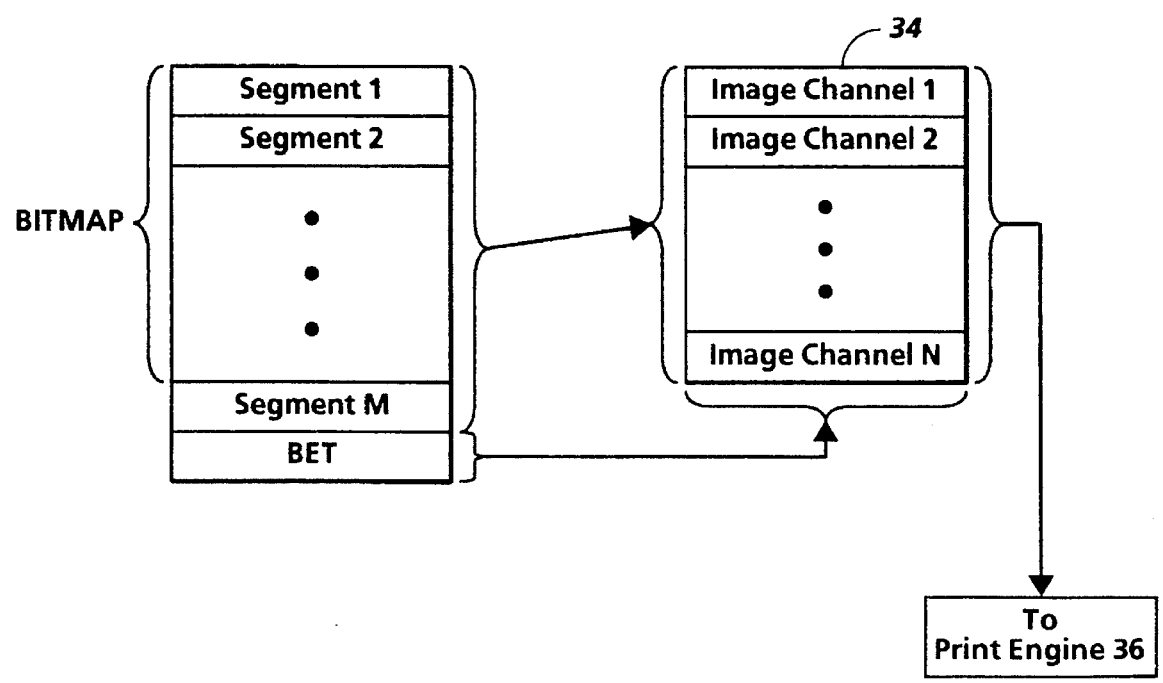
FIG. 9 is a block diagram illustrating the manner in which bitmaps, stored in accordance with the technique of the present invention, are printed with the printer/processor interface of FIG. 2.

Referring to Appendix A, the portions of which are incorporated as part of the present description, the various steps of FIG. 9 are shown as code written in MESA™" language. In particular, support for steps 200 and 202 is provided in Part 1 of Appendix A, while support for steps 202, 204, 06, 208, 210, 212 and 214 are provided in Part 2 of Appendix A.

As described in patent application Ser. No. 07/898,761, the pertinent portions of which are incorporated herein, a postparser (not shown) causes all of the data structures assimilated by the decomposer to be placed in a suitable form for printing and places corresponding raster identifiers, font identifiers and primitive representations of internal PDL fragments into a bandlist for printing. Through employment of the bandlist, image data is delivered to the imaging channel arrangement 34, each of which channels is adapted to process, and, more particularly, decompress segments having up to 256 scanlines of image data.

Referring to FIG. 9, the break entry table is read by the imaging channel arrangement 34 and a suitable number of segments are delivered, in parallel, to the imaging channels for decompression of the compressed scanlines of each segment. In one example, each segment comprises 16 scanlines of image data. As the image data is decompressed, the resulting decompressed image data can be buffered for subsequent consumption by the print engine 36.

It should be recognized that the decompressed image data can be used for purposes other than printing. For example, the decompressed image data could be simply displayed on the UI 27. Additionally, since segments of each bitmap are decompressed in parallel, portions of a bitmap can be displayed, or printed, out of sequence. This sort of selective output can be particularly useful in, among other operations, a cut and paste routine. More particularly, certain editing functions can be performed with selected portions of the bitmap, rather than the entire bitmap itself.

Figure 10:
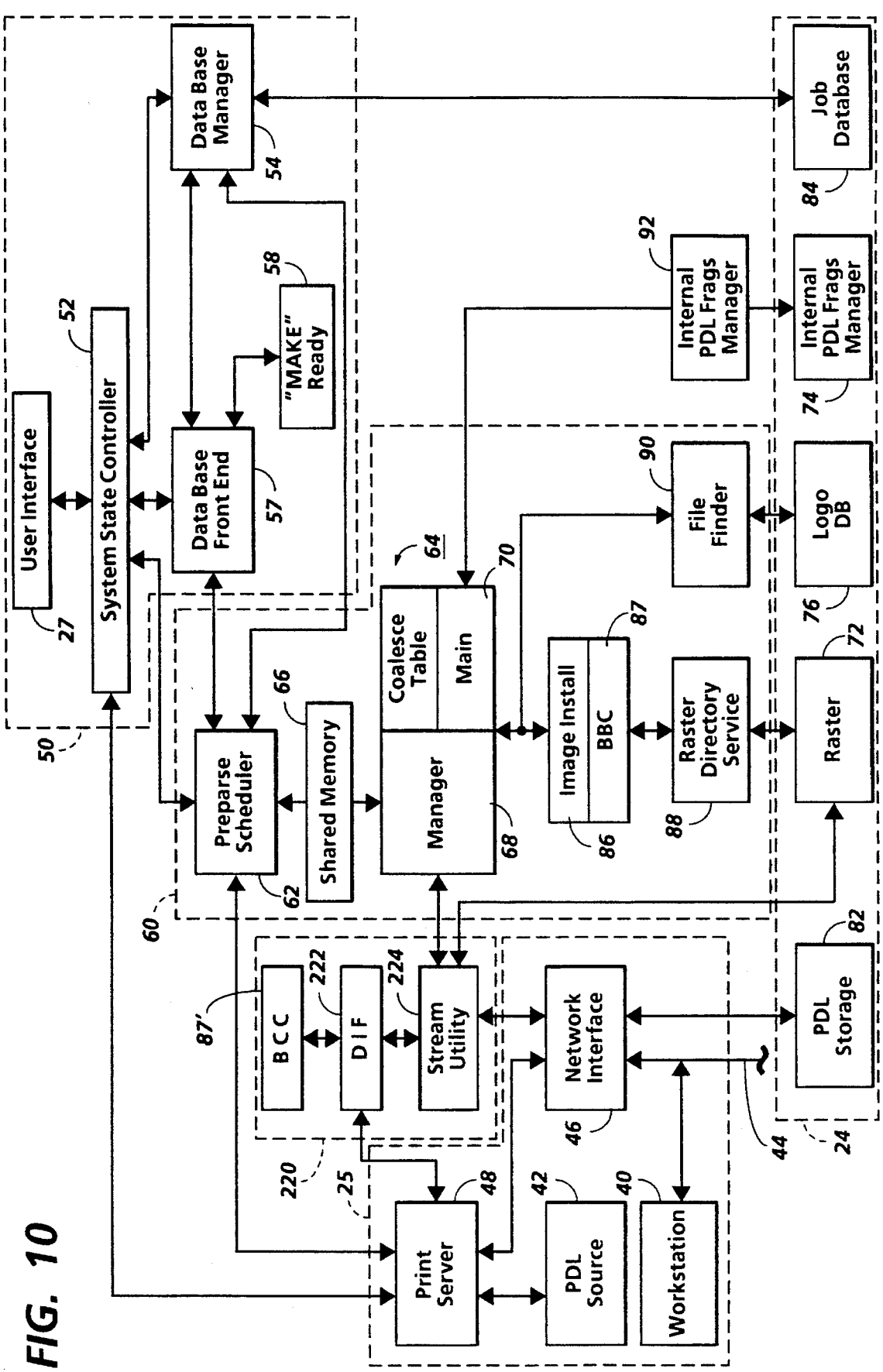
FIG. 10 is a block diagram of selected sections of a decomposer for the printing system of FIG. 1, the selected sections including an input section with a decomposer image filter ("DIF"), a stream utility and the BCC, a system managing section and a parsing section.

Referring to FIG. 10, another embodiment of the input area for the printing system 21 is shown. The illustrated embodiment of FIG. 10 is similar to that of FIG. 3 except that an input filtering arrangement 220 is substituted for the shared memory 71. The input filtering arrangement 220 comprises a decomposer input filter ("DIF") 222 communicating with both a stream utility 224 and a BCC 87'. In practice, the BCC 87 and BCC 87' are structurally and functionally equivalent; however, the two apparatuses are designated with separate numerals for ease of discussion and purposes of clarity.

The functions of DIF 222 and the stream utility 224 can be obtained on a MESA processor of the type designated above. Moreover, it will be appreciated by those skilled in the art that the functions of DIF and the stream utility could be combined without affecting the concept of the present invention. The software used to implement the DIF 222 and the stream utility 224 are included in the present description as APPENDIX B, the entire portion of which is incorporated herein. External interfaces for DIF are appended to the Appendix" B. As illustrated in APPENDIX C, the program used with DIF is "reentrant" so that multiple users can access DIF, in parallel. Additionally, the program for the print server 48, like DIF, is reentrant. Finally, the network interface 46 and the stream utility 224 are both capable of communicating multiple streams to and from DIF 222, in parallel.

Referring still to FIG. 10, the operation of the filtering arrangement 220 is explained in further detail. It should be recognized that while the following description refers to the processing of a single stream of image data, the input section 25, along with the filtering arrangement 220, are, as mentioned immediately above, capable of processing multiple streams, in parallel. Upon receiving a stream of image data, the network interface 46 indicates, to the print server 48 that a connection is desired. In response to such indication, the print server passes suitable parameters to the DIF 222 for processing the incoming input stream. In turn, DIF passes appropriate "handles" to the stream utility 224 for accessing the input stream and passing the by-products of the filtering process to either the raster storage section 72 or the PDL storage section 82. Upon setting up the DIF 222 and the stream utility 224 appropriately, the input stream is inputted to DIF via the network interface 46 through employment of the stream utility 224.

Figure 11:
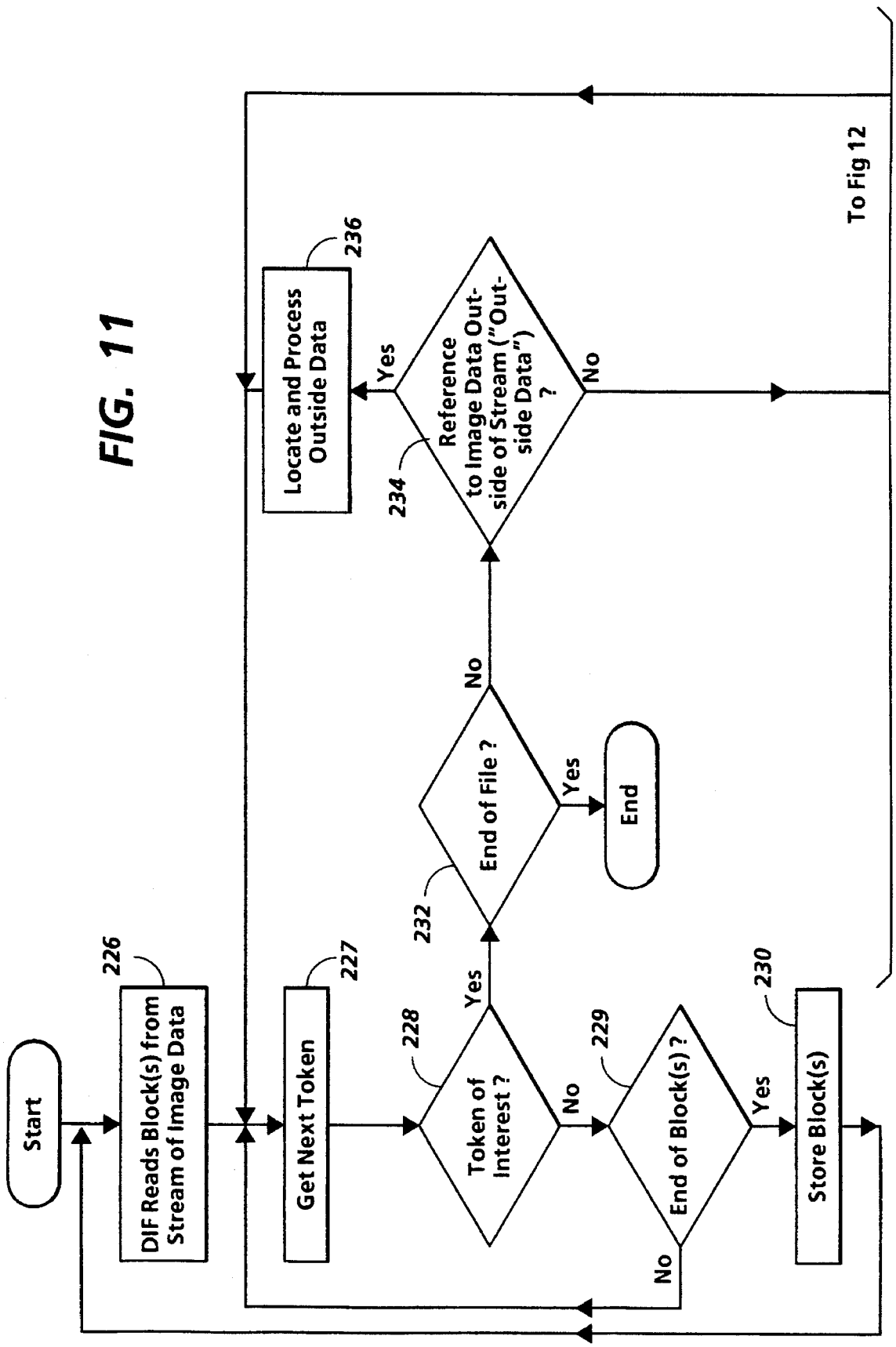
FIG. 11–12 represent, conjunctively, a flow diagram illustrating the manner in which DIF examines and processes a stream of image data communicated from a network to the input section.
Figure 12:
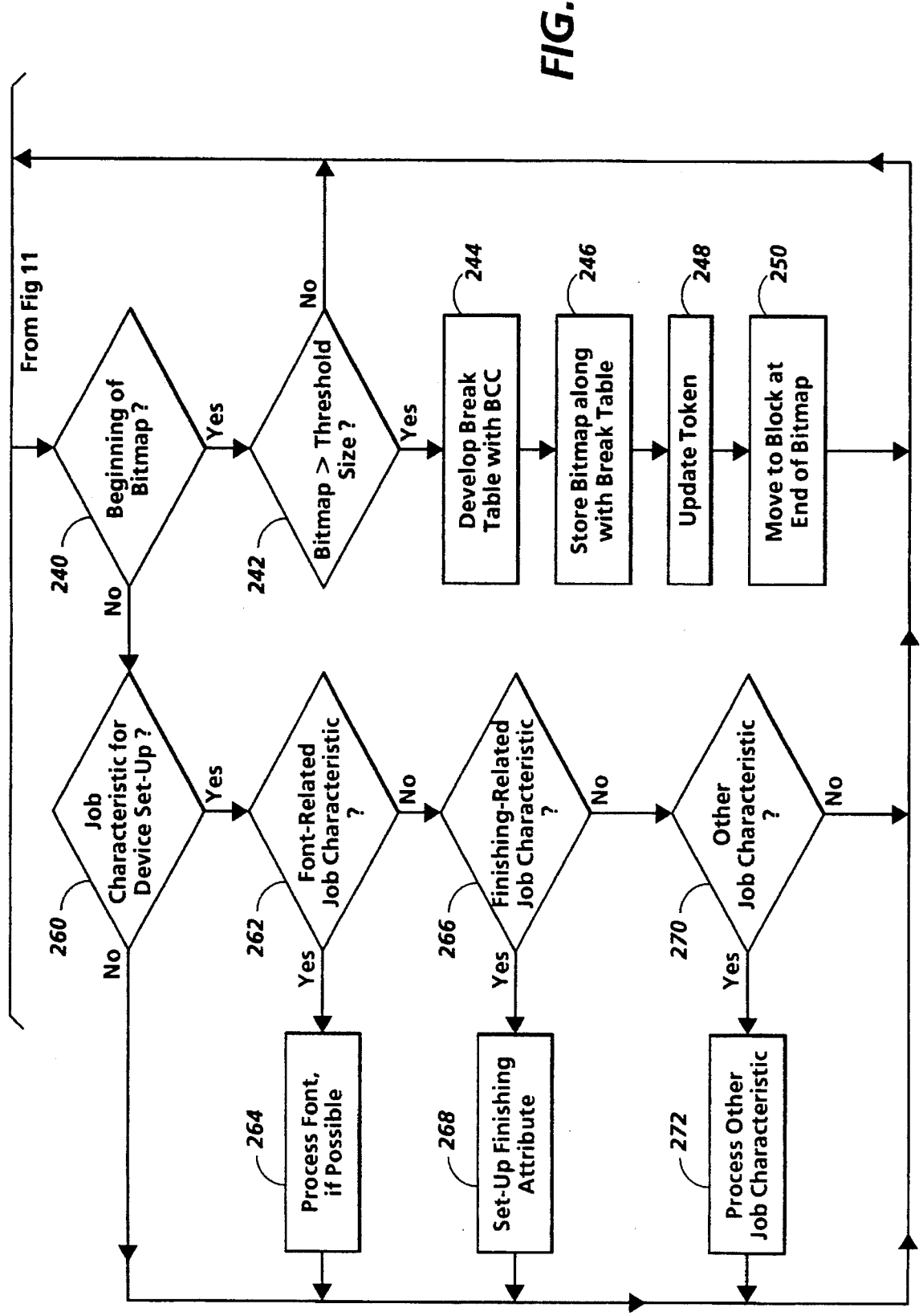

Referring to FIGS. 11 and 12, the processing of the input stream by DIF 222 is discussed in further detail. Preferably, image data is read by DIF (step 226), block-by-block, as it is fed thereto with the stream utility 224. It will be recognized by those skilled in the art that a block could be as small as a single word, or that more than one block could be fed to the DIF at one time. As each block is read, DIF determines, via steps 227, 228, whether the block under examination includes a token of interest. For each new block, the step 227 initially causes the first token found in the new block to be referenced. At step 229, the process checks to see if the end of the block has been reached. It has been found that a counting index scheme can be used to determine the beginning and end of the block. If the end of the block has not been reached, then the processss loops back to step 227 for getting the next token. If, on the other hand, the end of the block has been reached, then, via step 230, that block is handed over to the stream utility 224 for transmission thereby to PDL storage 82, and the process loops back to step 226 for reading another block. As indicated above, the PDL storage section 82 can include cache. Accordingly, the block need not necessarily be stored out to disk.

Once a token of interest is found (step 228), it is determined, at step 232, whether the found token constitutes the end of the input stream. If the token does not constitute the end of the stream, then it is determined, at step 234, whether the token relates to a reference to image data outside of the stream ("outside data "), such as a sequence insert file ("SIF") or a sequence insert master ("SIM"). A detailed discussion of SIFs and SIMs can be found in the following reference, the pertinent portions of which are incorporated herein by reference:

Harrington, S. J. and Buckley, R. R. Interpress: The Source Book Simon & Schuster, Inc. New York, N.Y. 1988

Assuming that the token of interest designates outside data, such outside data is, via step 236, retrieved and processed suitably. In one example, the outside image data would comprise a bitmap stored either locally or remotely of the printing system 21. The referenced bitmap would preferably be processed in accordance with steps 242, 244, 246, 248 and 250 (FIG. 12), as described below. It will be appreciated by those skilled in the art that step 236 contemplates the retrieval and processing of other local and/or remote images other than bitmaps. For example, the outside data could constitute another stream of image data.

When it is determined that the token of interest corresponds to a bitmap (step 240) (FIG. 12), the process proceeds to step 242. If the bitmap is smaller than a predetermined size, then the bitmap is left in the stream for parsing and eventual storage with the image install 86. It has been found that storing bitmaps with the filtering arrangement 220 does not necessarily facilitate the decomposing process unless the bitmap to be separated is above a predetermined threshold size. If the bitmap is below the predetermined threshold, then it is eventually stored at step 230. When the bitmap is greater than the predetermined threshold then, it is examined with the BCC 87' (step 244) in accordance with the procedure described above. Additionally, DIF 222 provides the image data associated with the bitmap to the BCC 87'. Once a break table is formed for the bitmap, the bitmap is stored, along with the break table, by the stream utility 224 (step 246) in the raster storage section 72. Upon storing the bitmap and break table, the token of interest is revised or updated (step 248) to reflect a modification of the input stream. Storing the bitmap removes a plurality of blocks from the stream and these blocks need not be read again at step 226. Accordingly, through use of step 250, the examination is continued at a block which is at the end of the bitmap.

Figures 13A, 13B, 13C:
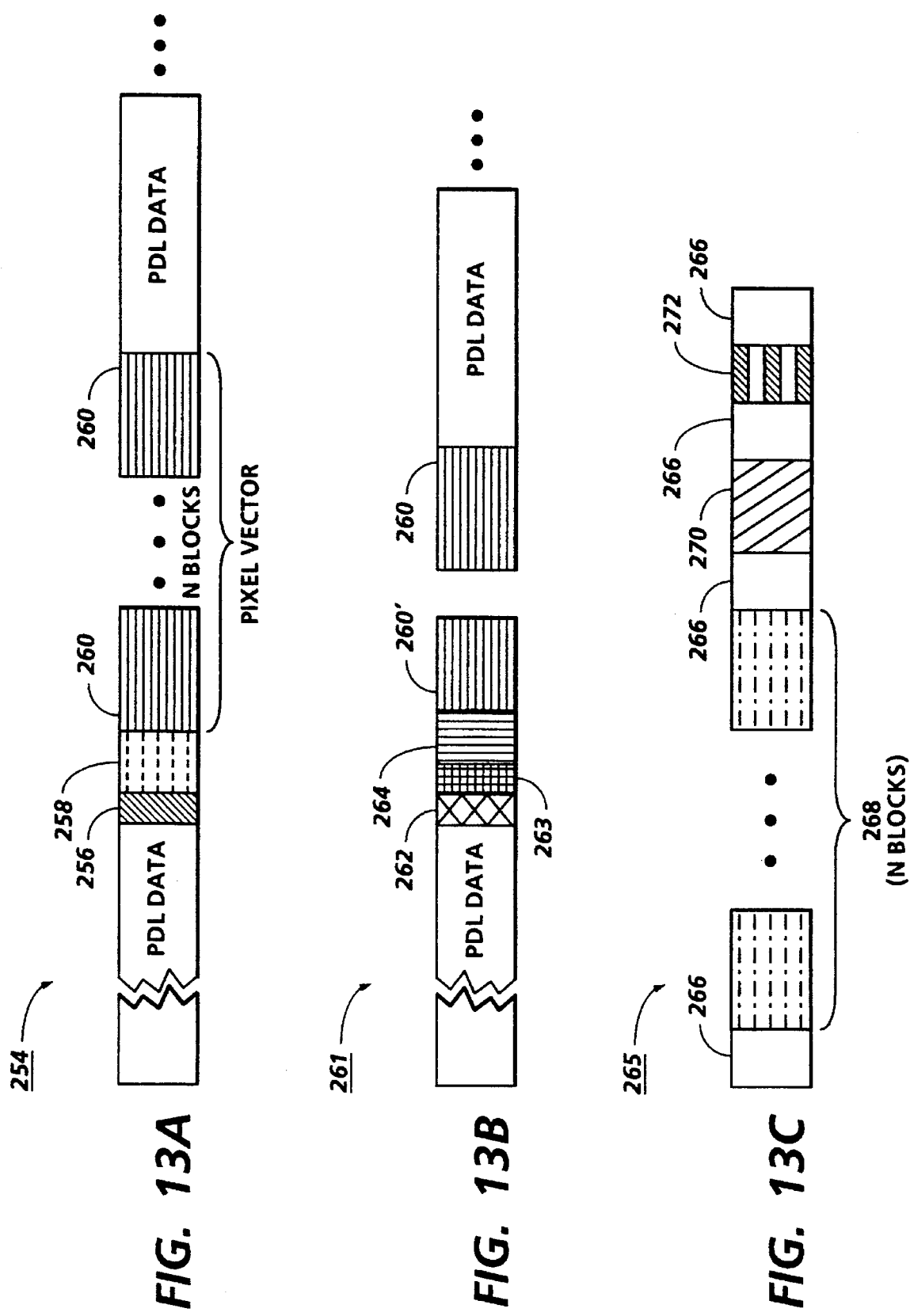
FIGS. 13A–13C are respective schematic views of an unmodified PDL stream, a modified PDL stream, and a bitmap extracted in accordance with another inventive technique.

Referring to FIGS. 13A–13C, the manner in which the input or original PDL stream is modified with the filtering arrangement 220 is discussed in further detail. Referring specifically to FIG. 13A, a stream fragment 254, including PDL data portions and image information, is shown. The image information, which, in one example, comprises pixel vector information (i.e., bitmap information), is designated with the numerals 256, 258 and 260. The section 256, which is commonly referred to as a "token ", indicates a pixel sequence type, i.e., whether the image is a pixel vector, a SIF/SIM, etc. While the illustrated embodiment of FIGS. 13A–113C shows the pixel sequence type as being a bitmap, as mentioned above, the pixel sequence type could comprise one of a variety of image types. Additionally, as described in further detail below the token 256 can serve to initiate a large range of job characteristics. The section 258 preferably is one to three bytes in length and designates the length of the bitmap. It should be appreciated that, in another aspect of the disclosed embodiment, as described below, the section 258 could include a variety of information serving to further define a process indicated by the token. The information regarding length is employed to make an appropriate decision at step 242 of FIG. 11. The portions designated with the numerals 260 represent portions of the stream which are not necessarily stored in the raster storage section 72, while the N blocks between the portions 260 represent portions of the stream which are stored in the raster storage section 72. It will be appreciated by those skilled in the art that the portions 260 could be stored with the N blocks, or deleted altogether, without altering the concept of the present invention.

Referring to FIG. 13B, the input stream of FIG. 13A, as modified in accordance with the procedure of the present invention, is designated by the numeral 261. The image information of the modified stream 261 is designated with the numerals 260, 260', 262, 263 and 264. A modified token, indicating a preinstalled pixel sequence type, is provided in section 262. A length designator 263 serves as an offset indicator to the next valid PDL token. Preferably, an eight byte file identifier, being designated with the numeral 264 and pointing to the location of the pixel vector in the raster storage section 72, is provided. In the modified stream, the file identifier may be written over part of portion 260 to form portion 260'.

Referring to FIG. 13C, a pixel vector file, as stored in raster storage section 72, is designated with the numeral 265. Various portions of the stored pixel vector file 265 are respectively designated with the numerals 266, 268, 270 and 272. Portions 266 represent extraneous material resulting from page boundarizing while portion 268 represents image data corresponding substantially with the stored pixel vector. Additionally, portion 270 represents a break table corresponding with the image data and portion 272 comprises a pixel vector trailer, the trailer preferably being written at the end of the pixel vector file. As indicated in Appendix C, the pixel vector preferably relates to a host of information required by the raster directory service 88 for installing the pixel vector in the raster storage section 72, such information including sequence length, pixel sequence type, compression scheme, etc.

Referring again to FIG. 10, in one example of operation, a plurality of connections are made at the filtering arrangement 220, each stream is processed accordingly and a first stream is fed, with the stream utility 224, to the manager 68 for parsing. The other streams are modified, in accordance with the above-described procedure, and the stream utility 224 directs the modified streams and the separated bitmaps to the PDL storage 24 and raster storage section 72, respectively. As mentioned above, the PDL storage section can include cache memory so that one or more streams need not be stored out to disk. The size of the cache employed is only limited by practical constraints.

While parsing image data, if the manager 68 detects a bitmap identified by sections 262 (FIG. 13B), it causes the identified bitmap in the raster storage section 72 to be registered in the Raster DS 88 by the image install 86. It should be appreciated that in the illustrated embodiment of FIG. 10, the BCC 87 only forms break tables for those bitmaps which are less than a threshold size. For this embodiment, the BCC 87 is relegated to a minor role since a substantial number of the bitmaps fed to the image install 86 are already appended with respective break tables, each of these appended break tables being developed with the BCC 87'. Each bitmap of the first stream, with its corresponding break table, is installed in the raster storage section 72 as described above with respect to the discussions of FIGS. 8 and 13C. Once the first stream is parsed, each modified stream stored in the PDL storage section 82 is, in turn, retrieved with the stream utility 224 and parsed.

Referring to the following table, an example which serves to illustrate a feature of the filtering arrangement 220 is shown.

| Event in msec | With Filtering Arrangement | With Spooling |
| --- | --- | --- |
| Start Capture PDL | 0 | 0 |
| End Capture | 43339 | 39434 |
| PDL Start PreParse | 43394 | 39481 |
| End PreParse | 45255 | 48531 |

The exemplary results demonstrate that capture time of the PDL input stream is shorter for the case in which the stream is spooled directly to the PDL storage section 82 than for the case in which the stream is filtered and spooled. On the other hand, the time required to preparse is greater for the case in which the stream is spooled directly to the PDL storage section 82 than for the case in which the stream is filtered and spooled. Accordingly, despite the additional time required to filter a stream, the time required to both capture and preparse the stream which is filtered and spooled can be less than the time required to both capture and preparse the stream which is spooled directly.

Referring again to FIG. 13A, it should be appreciated that, in another aspect of the disclosed embodiment, the token 256 can serve to initiate an operation other than storing N blocks of image data in the storage section 72. In other words, in the most generalized aspect of the disclosed embodiment, a token and, optionally, corresponding information can be read by the DIF 222 and used to initiate a selected operation in the printing system 21. More particularly, the token, with the optional corresponding information, can define the job, represented by the stream of image data, in that the token can serve to set up a device for a "job characteristic".

Referring again to FIGS. 11–12, the manner in which devices are set up for job characteristics is discussed in further detail. After it is determined that the token of interest is a job characteristic to be used in setting up a device (step 260), such as a font developing arrangement or a finishing arrangement, the process checks, at step 262, to determine if the job characteristic is a "font-related job characteristic".

Provided that the job characteristic is font-related, the stream utility 224 (FIG. 10) initiates a font development procedure. In one example, a known font checking procedure is used to determine if a suitable bitmap is available in a font database, the font database being disposed locally or remotely of the printing system 21 (FIG. 1). An arrangement for implementing such font checking is disclosed by U.S. patent application Ser. No. 07/898,761, U.S. Pat. No. 5,113,355 to Nomura and/or U.S. Pat. No. 5,167,013 to Hube et al., the pertinent portions of which are incorporated herein by reference. The advantage to checking for fonts with the stream utility 224 is that the printing system can indicate to the operator that a font is not available prior to the time of coalescing the job. In another example, the stream utility 224 can initiate a font rendering routine, prior to coalescing. Examples of font rendering can be found in the above-referenced text entitled Interpress: The Source Book.

If the job characteristic is not font-related, then the process determines, at step 266, whether the job characteristic is finishing-related, i.e. whether the job characteristic is a "finishing attribute". When the job characteristic is finishing-related, a finishing arrangement associated with the printer 26 (FIG. 1), is set up for the selected finishing attribute. An exemplary finishing arrangement, suitable for use with the printer 26, can be found in U.S. Pat. No. 5,045,881 to Kinder et al., the pertinent portions of which are incorporated herein. The finishing arrangement could be set up for the selected finishing attribute, with the stream utility 224 (FIG. 10), in a mannner consistent with the scheme disclosed by U.S. Pat. No. 5,129,639 to DeHority, the pertinent portions of which are incorporated herein by reference.

If the job is a job characteristic other than a font related job characteristic or a finishing-related job characteristic (step 270), then the other job characteristic is processed at step 272. Various other job characteristics could include PDL file library references, printing instructions, etc. PDL file library references would be used to fetch remote libraries for use in decomposing. As explained in the following reference, the pertinent portions of which are incorporated by reference, a library is appended to a PDL file to provide macro definitions for various operations:

Adobe Systems Incorporated PostScript® Language Reference Manual Addison-Wesley Co. 1990

Additionally, the token can be used to determine job disposition. For example, the token can provide an indication regarding whether the job is going to a job file or a print queue. An exemplary job file and print queue are disclosed in U.S. Pat. No. 5,164,842 to Gauronski et al., the pertinent portions of which are incorporated herein by reference. Knowledge regarding where the job is to be directed allows for optimization of memory usage, such as optimization of cache usage.

Finally, the token can be used to initiate an operation with respect to a referenced file, the referenced file being disposed locally or remotely of the printing system 21. For example, the token can initiate the fetching of a sequence insert master.

In view of the above description, numerous features of the disclosed embodiment will be appreciated by those skilled in the art.

One feature of the disclosed embodiment is to minimize the amount of time required to parse one or more incoming PDL input streams. In particular, for a significant number of network jobs, overall parsing time is reduced as a result of filtering and preinstalling each bitmap in the raster storage section.

Another feature of the disclosed embodiment is to store a plurality of jobs, based on modified streams, in a PDL storage section. Since the modified streams are devoid of bitmaps exceeding a selected threshold size, the time interval required to read the job from the PDL storage section is minimized. Moreover, by "stripping" a significant number of bitmaps from the input streams, the resulting bandwidth of the PDL storage section is minimized.

Yet another feature of the is to service a plurality of users, in parallel for enabling efficient processing of parallel input streams. For a network printing system managing many jobs in a relatively short time interval, such parallel processing improves overall performance of the system.

Yet another feature of the disclosed embodiment is to redistribute work throughout the printing system, i.e., the "pipeline" More particularly, the work is redistributed from a computationally burdened section, namely the system input area. This sort of redistribution is particularly useful in processing bitmap ladened jobs.

Yet another feature of the disclosed embodiment is to filter a wide variety of images contained in input streams. In particular, the disclosed printing system is capable of locating and processing images referenced in the input streams. In one example, such references can relate to sequence insert files and/or sequence insert masters, each of which can be local or remote. Additionally, the input stream can reference another input stream.

Yet another feature of the disclosed embodiment is to make various operations of the input section, system managing section and parsing section transparent to the DIF. That is the dual burdens of coordinating image data flow and managing control are taken away from DIF and initiated advantageously by the stream utility. Accordingly, the level of complexity residing in DIF is reduced significantly.

Another feature of the disclosed embodiment is to set up various devices associated with the printing system for one or more job characteristics. In one example token(s) can be used to set up a font development scheme,and/or a finishing arrangement. More particularly, when DIF reads a selected token, it initiates one or more devices, with the stream utility, for one or more of the job characteristics.

APPENDIX A

PART 1: Bcc.mesa & BreakTableGenImpl.mesa

-- File: Bcc.mesa - last edit:
-- Kitty Sathi:WBST129:Xerox 15-May-91 15:24:55
-- Hsu:WBST129:Xerox  29-Apr-91 18:25:26
-- lauria.WBST      25-Jan-89 14:01:31

-- Copyright (C) 1988, 1991 by Xerox Corporation. All rights reserved.

DIRECTORY
  RTOSESCAlpha USING [aBCODESCAN],
  RTOSIGStructures USING [ImageBreakTablePtr, TiledImageBreakTablePtr],
  Mopcodes USING [zESC];

Bcc: DEFINITIONS =
BEGIN

-- Types
BccStatus: TYPE = MACHINE DEPENDENT RECORD [
        faultCode        (0:0..7): FaultType,
        unused0                   (0:8..8): BOOLEAN,
        unused1                   (0:9..9): BOOLEAN,
        unused2                   (0:10..10): BOOLEAN,
        unused3                   (0:11..11): BOOLEAN,
        unused4                   (0:12..12): BOOLEAN,
        fault                     (0:13..13): BOOLEAN,
        EOI                       (0:14..14): BOOLEAN,
        underrun         (0:15..15): BOOLEAN ];

FaultType: TYPE = MACHINE DEPENDENT {
  noError (0),
  parseError (1),         -- Not used
  invalidParameter (2),   -- Not used
  noHardware (3)};

ModeType: TYPE = MACHINE DEPENDENT {
  gho (0),
  adaptive (1) };

BccInfo: TYPE = MACHINE DEPENDENT RECORD [
        mode             (0:0..3): ModeType,
        nibbleOffset     (0:4..7): [0..3],       --Starting nibble offset
        minPbkScanlines  (0:8..15): [0..255],    --Not used
        scanlineNibbles (1): CARDINAL];                    --raw scanline length BccInputData: TYPE = RECORD [
        blockPtr: LONG POINTER,
        blockSizeInNibbles: LONG CARDINAL];

PBTEntryInfo: TYPE = RECORD [
        tableIndex: CARDINAL,             --offset into the break table, must
be updated by ucode
        nibbleLastCount: LONG CARDINAL,   --# of nibbles found since last
prediction break, used for underrun

```
          scanlineLastCount: CARDINAL,      --# of scanlines found since last
prediction break, used for underrun
          nibbleCountSoFar: LONG CARDINAL,--# of nibbles found since beginning
of image, must be updated by ucode
          scanlineCountSoFar: CARDINAL,    --# of scanlines found since
beginning of image, must be updated by ucode
          unparsedNibbles: LONG CARDINAL,
          is4WordTable: BOOLEAN ← FALSE,
          bccParamPtr: LONG POINTER,
          tablePtr: LONG POINTER];
          -- tableIndex is the index for next pbt entry
          -- is4WordTable changes to TRUE IM detects there will be a
          -- breakTableOverflow
          -- nibbleLastCount and scanlineLastCount should be 0 except for underrun
          -- nibbleCountSoFar is the accumulated nibbleCount
          -- scanlineCountSoFar is the accumulated scanlineCount
          -- nibbleCountSoFar's initial value for the first pbt entry should be
          --   always 0, nibbleCountSoFar is 2 when data starts at oddByte
          -- The initial value of the scanlineCountSoFar is set by IM.
          -- In case of underrun nibbleCountSoFar is the total number of nibbles
          --   processed until the last valid prediction break, i.e., it does not
          --   include the number of nibbles processed in the current prediction
break.
          --
          -- unparsedNibbles is the nibbles that need to be saved for a underrun
          -- unparsedNibbles may be cross block boundary
          -- bccParamPtr points to 16 words for Bcc uCode to store data at interrupt
     -- tablePtr is "tiled" only if the is4WordTable is TRUE PBTTypes: TYPE = {normal, tiled};

TablePtr: TYPE = RECORD[
          var: SELECT OVERLAID PBTTypes FROM
                  normal = >
                          [imageBreakTablePtr:
RTOSIGStructures.ImageBreakTablePtr],
                  tiled = > [tiledImageBreakTablePtr:
RTOSIGStructures.TiledImageBreakTablePtr],
                  ENDCASE];

-- Procedures
  BCODESCAN: PROCEDURE [inputBlock0: BccInputData, inputBlock1: BccInputData,
                          bccParameters: BccInfo,
                          pbtEntryInfoPtr: LONG POINTER TO PBTEntryInfo]
          RETURNS [status: BccStatus] =
          MACHINE CODE BEGIN Mopcodes.zESC, RTOSESCAlpha.aBCODESCAN
  END;

END.
```

-- File: IMBreakTableGenImpl.mesa - last edit:
-- Lillian Hsu:WBST129:Xerox 31-Jan-92 18:50:22
-- Description: Implements the break table generation for net compressed images.

-- Copyright (C) 1985, 1986, 1987, 1988, 1989, 1990, 1991, 1992 by Xerox Corporation.
All rights reserved.

DIRECTORY
  Bcc USING [BccInfo, BccInputData, BccStatus, BCODESCAN, ModeType],
  ByteBlt USING [ByteBlt],
  Environment USING [Block, bytesPerWord, Word],
  IM USING [Buffer],
  IMObject USING [Image],
  IMBreakTableGen USING [Error, FaultType, Table],
  IMLog USING [EventType, LogEvent, HandleType, ProcID],
  IMManager USING [ConvertToTiledTable, ImageHandle],
  Inline USING [DBITAND, DBITSHIFT, HighHalf, LowByte, LowHalf],
  RasterObjects USING [PixelOverhead, PixelSequence],
  ResMgr USING [Allocate],
  ResMgrHeap USING [Create, Error, FreeNode, MakeNode],
  RTOSIGStructures USING [ImageBreakTablePtr, TiledImageBreakTablePtr];

IMBreakTableGenImpl: MONITOR
  IMPORTS Bcc, ByteBlt, IMBreakTableGen, IMLog, IMManager, Inline, ResMgr,
   ResMgrHeap
  EXPORTS IMBreakTableGen =

BEGIN

-- Types

LongWord: TYPE = MACHINE DEPENDENT RECORD [
  SELECT OVERLAID * FROM
  words = > [x, y: Environment.Word],
  long = > [lc: LONG CARDINAL],
  ENDCASE];

-- Global Variables and Constants directProcessDone: BOOLEAN ← FALSE;
DirectProcessDone: CONDITION;
zone: UNCOUNTED ZONE ← NIL;

-- Signals and Errors

Error: PUBLIC ERROR [
  fault: IMBreakTableGen.FaultType] = CODE;
-- unimplemented error is checked in IMManagerImpl.SavePVInfo BreakTableOverflow: PUBLIC SIGNAL [] = CODE;

-- Procedures

```
-- packed seqType
BreakTableGen: PUBLIC PROCEDURE [
    imageHandle: IMManager.ImageHandle,
    table: LONG POINTER TO IMBreakTableGen.Table,
        pixelsPerScanline: CARDINAL,
        scanLines: CARDINAL,
        scansPerBreak: CARDINAL]
  RETURNS [] =
BEGIN
ENABLE UNWIND = > NULL;

longWord: LongWord;
limitScanLines: CARDINAL ← 10240;
maxNibbleCount: LONG CARDINAL = 16777215; -- FFFFFFH
scansPerBreak: CARDINAL ← 16;
savedIndex: CARDINAL ← 0;
estTableSize: CARDINAL = (scanLines + scansPerBreak - 1) /
  scansPerBreak;
pixelsPerNibble: CARDINAL = 4;
nibblesPerBreak: LONG CARDINAL =
  (LONG[scansPerBreak] * pixelsPerScanline) / pixelsPerNibble;
zero: LONG CARDINAL = 0;
overflow, overLimitScanLines: BOOLEAN ← FALSE;
tablePtr: RTOSIGStructures.ImageBreakTablePtr = LOOPHOLE[
  table.pbtEntryInfoPtr.tablePtr];

IMLog.LogEvent[BufferPointer, table, [procEntered[breakTableGen]]];

SELECT (scanLines < scansPerBreak) FROM
  TRUE = > {
    tablePtr.seq[0] __ [scanLines,
          Inline.LowByte[Inline.HighHalf[table.nextEntryNibbleCount]],
          Inline.LowHalf[table.nextEntryNibbleCount]];
    table.pbtEntryInfoPtr.tableIndex __ 0 };
  ENDCASE = > {
    SELECT (scanLines > limitScanLines) FROM
      TRUE = > {overLimitScanLines ← TRUE};
      ENDCASE = > {
        FOR i: CARDINAL IN [0..estTableSize) DO
          nibble: LONG CARDINAL ←
              table.nextEntryNibbleCount + (nibblesPerBreak * i);
          -- can not handle 17" raw image, break table overflow
          IF nibble > = maxNibbleCount THEN {
              overflow ← TRUE;
              table.pbtEntryInfoPtr.tableIndex ← i;
              EXIT };
          tablePtr.seq[i] __ [scansPerBreak,
              Inline.LowByte[Inline.HighHalf[nibble]],
              Inline.LowHalf[nibble]];
        ENDLOOP;
        IF overflow THEN { -- must use tile table
          tempTablePtr: RTOSIGStructures.TiledImageBreakTablePtr ← NIL;
          IMManager.ConvertToTiledTable[
              imageHandle: imageHandle, scanLength: pixelsPerScanline],
```

```
                    table.pbtEntryInfoPtr.is4WordTable ← TRUE;
                    tempTablePtr ← LOOPHOLE[table.pbtEntryInfoPtr.tablePtr,
                            RTOSIGStructures.TiledImageBreakTablePtr];
                    -- continue to finish the 4W PBT, xyTable is built at GetParsePBTInfo
         proc.
                    FOR i: CARDINAL IN [table.pbtEntryInfoPtr.tableIndex..estTableSize) DO
                            nibble: LONG CARDINAL ←
                              table.nextEntryNibbleCount + (nibblesPerBreak * i);
                            longWord.x ← Inline.HighHalf[nibble];
                            longWord.y ← Inline.LowHalf[nibble];
                            tempTablePtr.seq[i].nibblePtr ← longWord.lc;
                            tempTablePtr.seq[i].scanLength ← pixelsPerScanline;
                            tempTablePtr.seq[i].nScanLines ← scansPerBreak;
                            ENDLOOP;
                    IF (scanLines MOD scansPerBreak) # 0 THEN
                            tempTablePtr.seq[estTableSize - 1].nScanLines ←
                              scanLines MOD scansPerBreak;
                    } -- overflow case
                    ELSE -- for the normal case, last entry update
                    IF (scanLines MOD scansPerBreak) # 0 THEN
                            tablePtr.seq[
                              estTableSize - 1].scanCount ← scanLines MOD scansPerBreak;
                       table.pbtEntryInfoPtr.tableIndex _ estTableSize - 1 } };
         IF overLimitScanLines THEN
            SIGNAL BreakTableOverflow;
         IMLog.LogEvent[BufferPointer, table, [procExited[breakTableGen]]];

END; -- of BreakTableGen

NotifyDirectProcessDone: PUBLIC ENTRY PROCEDURE []
            RETURNS [] =
         BEGIN
         directProcessDone ← TRUE;
         NOTIFY DirectProcessDone;
         END;

WaitDirectProcessDone: ENTRY PROCEDURE []
            RETURNS [] =
         BEGIN
         WHILE ~directProcessDone DO
            WAIT DirectProcessDone;
         ENDLOOP
         END;

-- for compressed or adaptive pixelSequence
         GatherPBTDataFromBcc: PUBLIC PROCEDURE [
            imageHandle: IMManager.ImageHandle,
            buffer0: IM.Buffer,
            buffer1: IM.Buffer,
            pixelEncodingOffset: LONG CARDINAL,
            pixelSequenceType: RasterObjects.PixelSequence,
            pixelV0ThroughV3: RasterObjects.PixelOverhead,
```

```
  priorScansPerBreak: CARDINAL,
  table: LONG POINTER TO IMBreakTableGen.Table,
  firstCall: BOOLEAN,
  needScansPerBreak: BOOLEAN]
  RETURNS [holdThisBuffer: IM.Buffer,
   eoi: BOOLEAN,
   bccFault: IMBreakTableGen.FaultType] =
  BEGIN
  saveBuffer: IM.Buffer ←
   LOOPHOLE[imageHandle, LONG POINTER TO IMObject.Image].pbtBuffer;
  BEGIN
  ENABLE UNWIND = > { IF saveBuffer.pointer # NIL THEN
    ResMgrHeap.FreeNode[z: zone, p: saveBuffer.pointer];
    saveBuffer.pointer ← NIL };
  allocWords: CARDINAL ← 0;
  bccInfo: Bcc.BccInfo;
  bccStatus: Bcc.BccStatus ←
   [noError, FALSE, FALSE, FALSE, FALSE, FALSE, FALSE, FALSE];
  block0: Bcc.BccInputData ← [NIL,0];
  block1: Bcc.BccInputData ← [NIL,0];
  modeType: Bcc.ModeType;
  limitScanLines: CARDINAL ← 10240;
  limitForAllocWords: CARDINAL ← 700;
  overLimitScanLines: BOOLEAN ← FALSE;
  -- microCode needs something - default.
  minPbkScanlines: CARDINAL ← 16;
  nibbleCount: LONG CARDINAL ← 0;
  nibblesPerByte: CARDINAL ← 2;
  nibblesPerWord: CARDINAL ← 4;
  scanlineNibbles: CARDINAL ← 0;
  scanLineCount: CARDINAL ← 0;
  handle: LONG POINTER ← LOOPHOLE[imageHandle, LONG POINTER];

MakeBlockFromBuffer: PROCEDURE [buffer: IM.Buffer]
   RETURNS [block0: Bcc.BccInputData] = INLINE
  BEGIN
  block0 ← [blockPtr: buffer.pointer,
    blockSizeInNibbles: buffer.lengthInBytes * 2];
  RETURN[block0];
  END; -- MakeBlockFromBuffer CheckAndConvertToTiledTable: PROCEDURE [] RETURNS [] =
  BEGIN
   maxNibbleCount: LONG CARDINAL = 16777215; -- FFFFFFH
   IF table.pbtEntryInfoPtr.scanlineCountSoFar > limitScanLines THEN {
     overLimitScanLines ← TRUE;
     SIGNAL BreakTableOverflow };
   IF (table.pbtEntryInfoPtr.nibbleCountSoFar + block0.blockSizeInNibbles +
     block1.blockSizeInNibbles) > = maxNibbleCount THEN { -- BreakTableOverflow
     -- Allocate a 4W pbt table and convert 2W to 4W table
     IMManager.ConvertToTiledTable[imageHandle: imageHandle,
       scanLength: (scanlineNibbles * 4) ];
     table.pbtEntryInfoPtr.is4WordTable ← TRUE;
     };
```

END; -- CheckAndConvertToTiledTable

```
SaveBlocks: PROCEDURE [
    block0: Bcc.BccInputData,
    block1: Bcc.BccInputData]
RETURNS [] =
BEGIN
    remainder: CARDINAL ← 0;
    buffer0, buffer1: Environment.Block ← [NIL,0,0];
    allocWords: LONG CARDINAL ← Inline.DBITSHIFT
    [table.pbtEntryInfoPtr.unparsedNibbles, -2];

buffer0.blockPointer ← block0.blockPtr;
    buffer0.stopIndexPlusOne ← CARDINAL[(table.pbtEntryInfoPtr.unparsedNibbles -
        block1.blockSizeInNibbles) / nibblesPerByte];
    IF buffer0.stopIndexPlusOne MOD Environment.bytesPerWord # 0 THEN {
        buffer0.startIndex ← 1;
            buffer0.stopIndexPlusOne ← buffer0.stopIndexPlusOne + 1 }
    ELSE buffer0.startIndex ← 0;
    buffer1 ← [block1.blockPtr, CARDINAL[(block1.blockSizeInNibbles /
nibblesPerByte)],
        CARDINAL[(block1.blockSizeInNibbles / nibblesPerByte)]];

IF allocWords < = 0 THEN allocWords ← 1;
    remainder ← CARDINAL[Inline.DBITAND[
        table.pbtEntryInfoPtr.unparsedNibbles, (nibblesPerWord - 1)]];
    IF remainder # 0 THEN allocWords ← allocWords + 1;
    IF allocWords > limitForAllocWords
        THEN ERROR IMBreakTableGen.Error[bccParseError];
    saveBuffer.pointer ← ResMgrHeap.MakeNode[z: zone,
            n: CARDINAL[allocWords]];
    saveBuffer.bufferSizeInBytes ← allocWords * Environment.bytesPerWord;
    saveBuffer.lengthInBytes ← saveBuffer.bufferSizeInBytes;
    [] ← ByteBlt.ByteBlt[
            from: [LOOPHOLE[buffer0.blockPointer],
                buffer0.startIndex, CARDINAL[buffer0.stopIndexPlusOne]],
            to: [LOOPHOLE[saveBuffer.pointer],
                0, CARDINAL[buffer0.stopIndexPlusOne - buffer0.startIndex]],
            overLap: move];
    [] ← ByteBlt.ByteBlt[
            from: [LOOPHOLE[buffer1.blockPointer],
                0, CARDINAL[buffer1.stopIndexPlusOne]],
            to: [LOOPHOLE[saveBuffer.pointer],
                CARDINAL[buffer0.stopIndexPlusOne - buffer0.startIndex],
                CARDINAL[buffer1.stopIndexPlusOne]],
            overLap: move];
    -- in two buffer case, the buffer0 should be the previous saveBuffer
    ResMgrHeap.FreeNode[z: zone, p: buffer0.blockPointer];
    buffer0.blockPointer ← NIL;
END; -- SaveBlocks SaveBlockAndBccInfo: PROCEDURE [block: Bcc.BccInputData, inBuffer: IM.Buffer]
RETURNS [] =
BEGIN
```

```
tempBlock: Bcc.BccInputData ← [NIL,0];
tempBuffer: IM.Buffer ← [NIL,0,0];
allocWords, usedNibbles, saveNibbles: LONG CARDINAL ← 0;

IF table.pbtEntryInfoPtr.unparsedNibbles = 0 THEN {
  table.nibbleOffset ← 0;
  saveBuffer ← [NIL,0,0] }
ELSE {
  usedNibbles ← block.blockSizeInNibbles - table.pbtEntryInfoPtr.unparsedNibbles;
  -- tempBlock.blockPtr ← block.blockPtr + (usedNibbles / nibblesPerWord);
  tempBlock.blockPtr ← block.blockPtr + Inline.DBITSHIFT[usedNibbles, -2];
  -- table.nibbleOffset ← CARDINAL[usedNibbles MOD nibblesPerWord];
  table.nibbleOffset ← CARDINAL[
    Inline.DBITAND[usedNibbles, (nibblesPerWord - 1)]];

saveNibbles ← table.nibbleOffset + table.pbtEntryInfoPtr.unparsedNibbles;
  allocWords ← Inline.DBITSHIFT[saveNibbles, -2];
  IF Inline.DBITAND[saveNibbles, (nibblesPerWord - 1)] # 0 THEN
    allocWords ← allocWords + 1;
  IF allocWords < = 0 THEN allocWords ← 1;

IF inBuffer.pointer # NIL THEN {
    ResMgrHeap.FreeNode[z: zone, p: inBuffer.pointer];
         inBuffer.pointer ← NIL };
  IF allocWords > limitForAllocWords THEN
    ERROR IMBreakTableGen.Error[bccParseError];
  saveBuffer.pointer ← ResMgrHeap.MakeNode[z: zone,
         n: CARDINAL[allocWords]];
  saveBuffer.bufferSizeInBytes ← allocWords * Environment.bytesPerWord;
  saveBuffer.lengthInBytes ← saveNibbles / nibblesPerByte;
  IF saveNibbles MOD nibblesPerByte # 0 THEN
    saveBuffer.lengthInBytes ← saveBuffer.lengthInBytes + 1;
  [] ← ByteBlt.ByteBlt[
         from: [LOOPHOLE[tempBlock.blockPtr],
           0, CARDINAL[saveBuffer.bufferSizeInBytes]],
         to: [LOOPHOLE[saveBuffer.pointer],
           0, CARDINAL[saveBuffer.bufferSizeInBytes]],
         overLap: move] }
END; -- SaveBlockAndBccInfo IMLog.LogEvent[ImageHandle, handle,[procEntered[gatherPBTDataFromBcc]]];
bccFault ← noError;
holdThisBuffer ← [NIL,0,0];
eoi ← FALSE;

-- only handles thses two types
IF pixelSequenceType = adaptive THEN
  modeType ← adaptive
ELSE modeType ← gho;

WITH vec: pixelV0ThroughV3 SELECT
  pixelSequenceType FROM
   adaptive = >
        scanlineNibbles ← vec.scanLength / 4; -- v[2]
```

```
    compressed = >
        scanlineNibbles ← vec.scanLength / 4; -- v[2]
    ENDCASE = > ERROR;
bccInfo ← [
 LOOPHOLE[modeType], LOOPHOLE[table.nibbleOffset],
 LOOPHOLE[minPbkScanlines], scanlineNibbles];

WaitDirectProcessDone[];

IF firstCall THEN {
  maxNibbleCount: LONG CARDINAL = 16777215;  -- FFFFFFH
  block0 ← MakeBlockFromBuffer[buffer: buffer0];
  block1 ← [NIL,0];
  IF block0.blockSizeInNibbles > = maxNibbleCount THEN
    table.pbtEntryInfoPtr.is4WordTable ← TRUE;
  bccStatus ← Bcc.BCODESCAN[
    inputBlock0: block0, inputBlock1: block1,
    bccParameters: bccInfo, pbtEntryInfoPtr: table.pbtEntryInfoPtr];
  firstCall ← FALSE }
ELSE {
  block0 ← MakeBlockFromBuffer[buffer: buffer0];
  block1 ← MakeBlockFromBuffer[buffer: buffer1];
  -- check table overflow
  IF ~(table.pbtEntryInfoPtr.is4WordTable) THEN
    CheckAndConvertToTiledTable[! BreakTableOverflow = > bccStatus.EOI ←
TRUE];
  -- check scanlineLastCount
  -- removed the code since Bcc now wants 16 all the time
  « IF table.pbtEntryInfoPtr.scanlineLastCount > = 16 THEN
    bccInfo.minPbkScanlines ← 1
  ELSE
    bccInfo.minPbkScanlines ← LOOPHOLE[
         minPbkScanlines - table.pbtEntryInfoPtr.scanlineLastCount]; »
  bccStatus ← Bcc.BCODESCAN[
    inputBlock0: block0, inputBlock1: block1,
    bccParameters: bccInfo, pbtEntryInfoPtr: table.pbtEntryInfoPtr];
  }; -- IF firstCall ELSE SELECT TRUE FROM
  bccStatus.fault = > {
  IMLog.LogEvent[ImageHandle, handle,[stepEntered[bccFault]]];
  SELECT bccStatus.faultCode FROM
    invalidParameter = > bccFault ← invalidBccParam;
    noHardware = > bccFault ← noBccHardware;
    parseError = > bccFault ← bccParseError;
       ENDCASE;
  eoi ← FALSE;
  directProcessDone ← FALSE;
  IMLog.LogEvent[ImageHandle, handle,[stepExited[bccFault]]];
  };
  bccStatus.EOI = > {
  IMLog.LogEvent[ImageHandle, handle,[stepEntered[bccEOI]]];
  IF saveBuffer.pointer # NIL THEN {
   ResMgrHeap.FreeNode[z: zone, p: saveBuffer.pointer];
```

```
                    saveBuffer.pointer ← NIL };
                holdThisBuffer ← [NIL,0,0];
                directProcessDone ← FALSE;
        IF table.pbtEntryInfoPtr.scanlineCountSoFar > limitScanLines THEN
            overLimitScanLines ← TRUE;
        SELECT overLimitScanLines FROM
            TRUE = > {
                eoi ← FALSE;
                bccFault ← breakTableOverflow };
            ENDCASE = > {
                table.pbtEntryInfoPtr.tableIndex ← table.pbtEntryInfoPtr.tableIndex - 1;
                eoi ← TRUE };
        IMLog.LogEvent[ImageHandle, handle,[stepExited[bccEOI]]];
        };
    bccStatus.underrun = > {
        IMLog.LogEvent[ImageHandle, handle,[stepEntered[bccUnderrun]]];
        directProcessDone ← FALSE;
        IF block1.blockPtr # NIL THEN {
                IF table.pbtEntryInfoPtr.unparsedNibbles > block1.blockSizeInNibbles
THEN
                        -- no scanline found in both blocks when process block0 and block1
                        SaveBlocks[block0: block0, block1: block1 !
                                        ResMgrHeap.Error = > {
                                            bccFault ← noMemSpace;
                                            GOTO exit };
                                        IMBreakTableGen.Error = > {
                                            bccFault ← fault;
                                            GOTO exit } ]
                ELSE -- only block1 has some unparsedNibbles
                        SaveBlockAndBccInfo[block: block1, inBuffer: saveBuffer !
                                        ResMgrHeap.Error = > {
                                            bccFault ← noMemSpace;
                                            GOTO exit };
                                        IMBreakTableGen.Error = > {
                                            bccFault ← fault;
                                            GOTO exit } ] }
        ELSE -- no block1, there are some leftover nibbles from block0
                SaveBlockAndBccInfo[block: block0, inBuffer: saveBuffer !
                                ResMgrHeap.Error = > {
                                    bccFault ← noMemSpace;
                                    GOTO exit };
                                IMBreakTableGen.Error = > {
                                    bccFault ← fault;
                                    GOTO exit } ];
        GOTO exit;
        EXITS
            exit = > {
                -- get next new block
                holdThisBuffer ← saveBuffer;
                eoi ← FALSE;
                IMLog.LogEvent[ImageHandle, handle,[stepExited[bccUnderrun]]] };
        };
    ENDCASE;
    IMLog.LogEvent[ImageHandle, handle,[procExited[gatherPBTDataFromBcc]]];
```

```
END; -- of ENABLE
END; -- of GatherPBTDataFromBcc

FreeSaveBuffer: PUBLIC PROCEDURE[saveBuffer: IM.Buffer] = {
 ResMgrHeap.FreeNode[z: zone, p: saveBuffer.pointer];
 saveBuffer.pointer ← NIL;
 saveBuffer.bufferSizeInBytes ← saveBuffer.lengthInBytes ← 0;
};
-- MAINLINE CODE:

zone ← ResMgrHeap.Create[
  bl: ResMgr.Allocate[id: [background, imageInstall], Pages: 3,
    base: NIL, waitTillAvailable: TRUE],
  heapFull: NIL, maxSize: 3, incrementSize: 0];

END...
```

PART 2: bccdefs.ms, Bcc.ms

```
% File: bccdefs.ms - last edit:
% Berger.WBST    16-Mar-89 16:02:40
% Definition file for Boundary Code Catcher (BCC) driver code % Copyright (C) 1989 by Xerox Corporation. All rights reserved.
!
        Note: initial stack frame is:
                tos -> ptrHi
                       ptrLo
                       bccParametersHi
                       bccParametersLo
                       block1SizeInNibblesHi
                       block1SizeInNibblesLo
                       block1PtrHi
                       block1PtrLo
                       block0SizeInNibblesHi
                       block0SizeInNibblesLo
                       block0PtrHi
                       block0PtrLo Returned Stack Frame is:
                tos -> bccStatus Note that the stack pointer is adjusted to its final position
        on entry to RunBcc. Thus, the stack pointer points to
        block0SizeInNibblesHi when the data is removed from the stack.
!
define
                       % Variables passed in: (See bcc.mesa)
        infoPtrHi              = "tosP4",
        infoPtrLo              = "tosP3",
        scanLineNibbles        = "tosP2",
        bccParameters          = "tosP1",
        block1SizeInNibblesHi  = "tos",
        block1SizeInNibblesLo  = "tosM1",
        block1PtrHi            = "tosM2",
        block1PtrLo            = "tosM3",
        block0SizeInNibblesHi  = "tosM4",
        block0SizeInNibblesLo  = "tosM5",
        block0PtrHi            = "tosM6",
        block0PtrLo            = "tosM7", % Variables returned: (See Bcc.Mesa)
        bccStatus              = "tosP8", % Internal variables nibbleCountHi          = "tosP5",
        nibbleCountLo          = "tosP6",
        scanLineCount          = "tosP7",
```

```
            currentWord           = "r0",   % Word being examined by the
BCC.
            bccStatusImage        = "r1",   % Copy of the Bcc status
register.
            bccType               = "r2",   % XX1X if operating in buf 1,
0XXX if in buf 0.
                                            % XXX1 if 4 word table, XXX0
if not
            tableIndex            = "r3",
            temp                  = "r4",
            totalBlockLenLo       = "r5",   % Total size of the buffers
examined so far
            totalBlockLenHi       = "r6",   %  in nibbbles.
            nibblesLeftLo         = "r7",   % Nibbles left in the current
buffer.
            nibblesLeftHi         = "r8",
            newNibblePtrLo        = "r9",   % Pointer to start of a new line
after a RAW
            newNibblePtrHi        = "r10",  % line.
            newBlockSizeLo        = "r9",
            newBlockSizeHi        = "r10",
            usedBlockSizeLo       = "r11",
            usedBlockSizeHi       = "r12",
            newWordPtrLo          = "r11",  % Address of first word in the
new line
            newWordPtrHi          = "r12",
            nibbleOffset          = "r13",  % Starting nibble Offset from
Mesa
            tablePtrHi            = "r14",
            tablePtrLo            = "r15",
            scanlineCountSoFar    = "r16",
            nibbleCountThisBreakHi = "r17",
            nibbleCountThisBreakLo = "r18",
            unparsedNibbleCountHi = "r17",
            unparsedNibbleCountLo = "r18",
            tableNibbleCountHi = "r19",
            tableNibbleCountLo    = "r20",
            blockNibbleOffset  = "tosP8";

% Constants:
constant
            Block1Flag            = 10H,
            Is4WordTableFlag  = 1H,
            BccCmdReg             = 10H,    % Address of the Bcc Command
Register
            BccDataReg            = 400H,   % Address of the Bcc Data
Register
            BccStatusReg          = 14H,    % Address of the Bcc Status
Register
            FaultStatusRegister = 6H,       % Cache Fault Status Register
```

| | | | |
|---|---|---|---|
| | InputStreamStatusRegister = 15H, | | % Cache Stream Fault Status Register |
| | InputStreamDestroy | = 14H, | % Stream Destroy Register |
| | InputStreamRegister0 | = 10H, | % Stream start address lo |
| | InputStreamRegister3 | = 13H, | % Stream start address hi |
| | PtrMask | = 0FFH, | % Mask off hi byte of hi address word |
| | StreamInput | = 80H, | % Stream input register |
| | ValidPbkFlag | = 08H, | % bccStatus flag indicating valid Pred Break |
| | EOIFlag | = 02H, | % bccStatus flag indicating EOI |
| | SOI | = 70H, | % SOI bit pattern |
| | SOIFlag | = 04H, | % bccStatus flag indicating SOI |
| | NoBccFlag | = 310H, | % bccStatus flag indicating no Bcc hardware |
| | UnderRunFlag | = 01H; | % bccStatus flag indicating an under-run |

```
% File: bcc.ms - last edit:
% Sathi:WBST129      15-Dec-90 13:35:42
% Berger.WBST        1-Feb-90 17:43:31
% Lauria.WBST        14-Aug-89 17:20:30
% Boundary Code Catcher (BCC) driver code % Copyright (C) 1989, 1990 by Xerox Corporation. All rights reserved.

@opBCC, goto RunBcc;
RunBcc:
          stackPtr ← 8;
          output (zero, BccCmdReg) ← zero;      % Initialize the BCC
                                                % Check to see if the
BCC is
                                                % attatched to this
channel.
                                                % First input has a
prediction
                                                % break.

output (zero, BccDataReg) ← zero;
          noOp;
          noOp;
          if test then goto * + 2;
          goto NoBcc;

output (zero, BccCmdReg) ← zero;      % This input does not have a
          output (zero, BccDataReg) ← ones;     % prediction break.
          noOp;
          noOp;
          if test then goto NoBcc;

% If we made it this far, we can assume that the BCC exists and works,
          % so start feeding the BCC nibbleOffset ← loadField (bccParameters, 4:4);   % Get the nibble offset
          blockNibbleOffset ← nibbleOffset;
          nil ← block0SizeInNibblesLo or block0SizeInNibblesHi;
          bccType ← 0,
                    if z then goto StartBuf1;              % Block 0 has
0 length % Initialize the Stream Registers to read block 0

%         nil ← cacheInput (zero, FaultStatusRegister);
          nil ← cacheInput (zero, InputStreamStatusRegister);
          cacheOutput (zero, InputStreamRegister0) ← block0PtrLo;
          temp ← block0PtrHi and PtrMask;
          cacheOutput (zero, InputStreamRegister3) ← temp;
          nibblesLeftLo ← block0SizeInNibblesLo;
          nibblesLeftHi ← block0SizeInNibblesHi,
                    goto PrepareFirstWord;

StartBuf1:
```

```
                    % Start up with buffer 1 if buffer 0 is empty
            bccType ← Block1Flag;
%           nil ← cacheInput (zero, FaultStatusRegister);
            nil ← cacheInput (zero, InputStreamStatusRegister);
            cacheOutput (zero, InputStreamRegister0) ← block1PtrLo;
            temp ← block1PtrHi and PtrMask;
            cacheOutput (zero, InputStreamRegister3) ← temp;
            nibblesLeftLo ← block1SizeInNibblesLo;
            nibblesLeftHi ← block1SizeInNibblesHi;

PrepareFirstWord:
            tableIndex ← read (infoPtrHi, infoPtrLo);        % tableIndex
(passed back)
            nibbleCountThisBreakLo ← read (savedAddressP1);        %
nibbleLastCountLo (passed in for use in current line)
            nibbleCountThisBreakHi ← read (savedAddressP1);        %
nibbleLastCountHi (passed in for use in current line)
            scanLineCount ← read (savedAddressP1);           %
scanlineLastCount (passed in for use in current line)
            tableNibbleCountLo ← read (savedAddressP1);      % nibbleCountSoFarLo
            tableNibbleCountHi ← read (savedAddressP1);      % nibbleCountSoFarHi
            scanlineCountSoFar ← read (savedAddressP1);      % scanlineCountSoFar
            temp ← read (savedAddressP1);                    %
unparsedNibbleCountLo (current nibble count passed back due to underrun)
            temp ← read (savedAddressP1);                    %
unparsedNibbleCountHi (current nibble count passed back due to underrun)
            temp ← read (savedAddressP1);                    %
is4WordTable       (unused at this time)
%           temp ← temp and Is4WordTableFlag;
            bccType ← bccType or temp;
            temp ← read (savedAddressP1);                    %
bccParamPtrLo      (unused at this time)
            temp ← read (savedAddressP1);                    %
bccParamPtrHi      (unused at this time)
            tablePtrLo ← read (savedAddressP1);              % tablePtrLo
            tablePtrHi ← read (savedAddressP1);              % tablePtrHi tableIndex ← shiftField (tableIndex, 1);   % mult by 2 for # of words
instead of # of table entries.
            nil ← bccType and Is4WordTableFlag;
            if z then goto TableIndexCont;
            tableIndex ← shiftField (tableIndex, 1);   % mult by 2 again for # of words
instead of # of table entries.

TableIndexCont:
            tablePtrLo ← tablePtrLo + tableIndex;
            tablePtrHi ← tablePtrHi + carry;

nibbleCountThisBreakLo ← zero - nibbleCountThisBreakLo;
            nibbleCountThisBreakHi ← zero - nibbleCountThisBreakHi - borrow;
            nibbleCountLo ← 4H;
            nibbleCountHi ← 0H;        % initializes the nibble count to one word totalBlockLenLo ← nibblesLeftLo;
``` totalBlockLenHi ← nibblesLeftHi;

% Handle the special case of the first word:
% First, look to see if it contains an SOI:

currentWord ← cacheInput (zero, StreamInput);
nil ← nibbleOffset xor zero;         % SOI allowed only in position 0 or 2
nil ← nibbleOffset xor 02H,
        if eq then goto CheckFirstSOI;
if ne then goto InitBcc;
temp ← loadField (currentWord, 8:8);

nil ← temp - SOI;
if ne then goto InitBcc;
%       bccStatus ← bccStatus or SOIFlag;        % SOI found
        tableNibbleCountLo ← tableNibbleCountLo + 2;
        nibbleCountThisBreakLo ← tableNibbleCountLo;
        nibbleOffset ← 0;
        blockNibbleOffset ← nibbleOffset;                         % Point to the nibble of interest
        nibblesLeftLo ← nibblesLeftLo - 4;
        nibblesLeftHi ← nibblesLeftHi - borrow;
        nil ← nibblesLeftLo or nibblesLeftHi;     % check to see if block was only 1 word long
        if z then goto UnderRun;
        output (zero, BccCmdReg) ← nibbleOffset;  % Initialize the BCC with
        scanLineCount ← scanLineCount -1, goto ProcessBlock;
% the starting nibble position CheckFirstSOI:
        temp ← loadField (currentWord, 0:8);
CheckSOI:
        nil ← temp - SOI;
        if ne then goto InitBcc;
%       bccStatus ← bccStatus or SOIFlag;        % SOI found
        nibbleOffset ← nibbleOffset + 2;          % Point to the nibble of interest
        blockNibbleOffset ← nibbleOffset;
        tableNibbleCountLo ← tableNibbleCountLo + 2;
%       nibbleCountThisBreakLo ← tableNibbleCountLo;

InitBcc:
        output (zero, BccCmdReg) ← nibbleOffset;  % Initialize the BCC with
        scanLineCount ← scanLineCount -1, goto BCCFeed;
          % the starting nibble position % Main processing code. General scheme is to keep on sending data to the
% bcc until it finds a line break. Then the break is checked to see if it
% qualifies as a Prediction Break.

ProcessBlock:
        currentWord ← cacheInput (zero, StreamInput);
```

```
BCCFeed:
        output (zero, BccDataReg) ← currentWord;
        noOp;                                           % Wait at least 3 alu ops
        nibblesLeftLo ← nibblesLeftLo - 4;              % for the bcc
    freezeFlags;
        nibblesLeftHi ← nibblesLeftHi - borrow,
                if test then goto CheckBoundaryCode;    % Check if Bcc found a break
        nil ← nibblesLeftLo or nibblesLeftHi,
                if mi then goto NewBuf;                 % loop until nibblesLeft < = 0
        if nz then goto ProcessBlock;

% The following code handles the switching between buffer 0 and 1
NewBuf:
        cacheOutput (zero, InputStreamDestroy) ← zero;

% Check to see which buffer is currently being used
        nil ← bccType and Block1Flag;
        if nz then goto UnderRun;                       % If its buffer1, we're done
                                                        % Otherwise, switch to buffer 1

% Check to see if buffer 1 has 0 length.
        nil ← block1SizeInNibblesLo or block1SizeInNibblesHi;
        nibblesLeftLo ← block1SizeInNibblesLo,
                if z then goto UnderRun;
        nibblesLeftHi ← block1SizeInNibblesHi;

% Set the stream up for buffer 1
%       nil ← cacheInput (zero, FaultStatusRegister);
        nil ← cacheInput (zero, InputStreamStatusRegister);
        cacheOutput (zero, InputStreamRegister0) ← block1PtrLo;
        temp ← block1PtrHi and PtrMask;
        cacheOutput (zero, InputStreamRegister3) ← temp;

% Update counters
        totalBlockLenLo ← totalBlockLenLo + block1SizeInNibblesLo;
        totalBlockLenHi ← totalBlockLenHi + block1SizeInNibblesHi + carry;
        bccType ← bccType or Block1Flag,
                goto ProcessBlock;                      % Start sending data to the bcc % There is a line break of some type, check it out:
CheckBoundaryCode:
        % Read the LCC and nibble count
        bccStatusImage ← input (zero, BccStatusReg);

% Set the nibble pointers up:
        nibbleCountLo ← totalBlockLenLo - nibblesLeftLo;
        nibbleCountHi ← totalBlockLenHi - nibblesLeftHi - borrow;
        temp ← loadField (bccStatusImage, 14:2) - nibbleOffset;     % Get the nibble offset
```

```
        % If the line break is in the third nibble, it is the third nibble
        % of the PREVIOUS word.
        nil ← maskField (bccStatusImage, 14:2) - 03H;
        if eq then goto BreakInPrevWord;
        temp ← temp - 4,    % Count is 1 word ahead
                goto * + 2;
BreakInPrevWord:
        temp ← temp - 8;              % nibble 3 of the previous word
        nibbleCountLo ← nibbleCountLo + temp;
        nibbleCountHi ← nibbleCountHi + ones + carry;  % temp is a negative
number % Now, check to see if we found an EOI
        nil ← bccStatusImage and 10H;
        if z then goto EOI;

scanLineCount ← scanLineCount + 1;

% Check to see if we have found more than minPbkScanLines scan lines nil ← loadField (bccParameters, 8:8) - scanLineCount;
        if gt then goto AdvanceLine;            % If not, continue processing nil ← bccParameters and 1000H;                  % Set up flags to
determine the mode
        if nz then goto Adaptive;

% We are in gho mode, check line condition codes for this mode to see if
we
        % have a valid Prediction Break
        % 01 is the only invalid mode
        nil ← loadField (bccStatusImage, 12:2) - 01H;
        if z then goto AdvanceLine;
%       bccStatus ← bccStatus or ValidPbkFlag;
                call WriteBreakTable;
                goto CheckInterrupt;

%Adaptive Mode
Adaptive:
        nil ← maskField (bccStatusImage, 13:1);
        if nz then goto AdvanceLine;
%       bccStatus ← bccStatus or ValidPbkFlag;
                call WriteBreakTable;
                goto CheckInterrupt;

ReFeed:
        % Restarts the bcc at the correct word and nibble position.
        % if at nibble position 2, we will be restarting in the next word.
        % nibble positions 0, 1, and 3 start in the current word. ( 3 starts
        % in the current word because the 3 refers to the previous word)
        nil ← maskField (bccStatusImage, 14:2) - 2;
        if ne then goto restartThisWord;
```

```
        output (zero, BccCmdReg) ← zero;
        nil ← nibblesLeftHi;
        nil ← nibblesLeftHi or nibblesLeftLo,
                if mi then goto NewBuf;
        if z then goto NewBuf;
        goto ProcessBlock;

restartThisWord:
        temp ← maskField (bccStatusImage, 14:2) + 2;
        temp ← temp and 3;
        output (zero, BccCmdReg) ← temp;
        nibblesLeftLo ← nibblesLeftLo + 4;              % Fix up the counter
        nibblesLeftHi ← nibblesLeftHi + carry;
        goto BCCFeed;

AdvanceLine:
        % Check to see if the line code is RAW. If so, we need to skip over
        % this line. Otherwise, the bcc is restarted where it left off.

nil ← loadField (bccStatusImage, 12:2);
        temp ← scanLineNibbles + 2,                     % Compensate for line code
                if nz then goto ReFeed;                 % Look for RAW
line temp ← temp + nibbleOffset;
                % Compute the new index into the buffers in nibbles
        newNibblePtrLo ← nibbleCountLo + temp;
        newNibblePtrHi ← nibbleCountHi + carry;
                % Check to see which buffer we are in now
        nil ← bccType and Block1Flag;
        if nz then goto AdvanceB1;

% We are in buffer 0, check to see if the new position is within
                % this buffer.
        temp    maskField (newNibblePtrLo, 0:14);                 % Truncate
off the lower 2 bits
        nibblesLeftLo ← totalBlockLenLo - temp;
        nibblesLeftHi ← totalBlockLenHi - newNibblePtrHi - borrow;
        nil ← nibblesLeftLo or nibblesLeftHi,
                if mi then goto AdvanceToBuf1;          % New pos is not in this
buffer
        if z then goto AdvanceToBuf1;

% If we made it this far, we are in buffer 0 and the end of the
        % line is within this buffer. So, restart the stream at the
        % correct place, and reset the nibblesLeft counter
        cacheOutput (zero, InputStreamDestroy) ← zero;
        nil ← cacheInput (zero, InputStreamStatusRegister);

% The newWordPtr is the new starting address
        temp ← loadField (newNibblePtrLo, 0:14);
        newWordPtrLo ← shiftField (newNibblePtrHi, 14) or temp;
        newWordPtrLo ← newWordPtrLo + block0PtrLo;
```

```
                newWordPtrHi ← loadField (newNibblePtrHi, 0:14) + block0PtrHi +
carry;
                cacheOutput (zero, InputStreamRegister0) ← newWordPtrLo;
                temp ← newWordPtrHi and PtrMask;    % Calculate number of nibbles
into the word and set up
                cacheOutput (zero, InputStreamRegister3) ← temp;
                        % the bcc.
                temp ← loadField (newNibblePtrLo, 14:2);
                output (zero, BccCmdReg) ← temp;
                goto ProcessBlock;

AdvanceB1:
        % We are all ready in buffer1. Hopefully, the end of the line is within
        % this buffer. If not, we have an underrun.
                temp     maskField (newNibblePtrLo, 0:14);                % Truncate
off the lower 2 bits
                nibblesLeftLo ← totalBlockLenLo - temp;
                nibblesLeftHi ← totalBlockLenHi - newNibblePtrHi - borrow;
                nil ← nibblesLeftLo or nibblesLeftHi,
                        if mi then goto UnderRun;
                if z then goto UnderRun;

% we are in buffer 1 and the end of the line is within this buffer
        % So, compute a new starting position and restart the stream.
        cacheOutput (zero, InputStreamDestroy) ← zero;
        nil ← cacheInput (zero, InputStreamStatusRegister);

% Compute distance into buffer 1
        newNibblePtrLo ← newNibblePtrLo - block0SizeInNibblesLo;
        newNibblePtrHi ← newNibblePtrHi - block0SizeInNibblesHi - borrow;

% Compute starting address
        temp ← loadField (newNibblePtrLo, 0:14);
        newWordPtrLo ← shiftField (newNibblePtrHi, 14) or temp;
        newWordPtrLo ← newWordPtrLo + block1PtrLo;
        newWordPtrHi ← loadField (newNibblePtrHi, 0:14) + block1PtrHi +
carry;
                cacheOutput (zero, InputStreamRegister0) ← newWordPtrLo;
                temp ← newWordPtrHi and PtrMask;    % Calculate number of nibbles
into the word and set up
                cacheOutput (zero, InputStreamRegister3) ← temp;
                        % Calculate number of nibbles into the word and set up
                        % the bcc.
                temp ← loadField (newNibblePtrLo, 14:2);
                output (zero, BccCmdReg) ← temp;
                goto ProcessBlock;

AdvanceToBuf1:
        % RAW line stretches across the two buffers. So, switch to buffer 1
        % and proceed with the restart code for buffer 1.

nil ← block1SizeInNibblesLo or block1SizeInNibblesHi;
                bccType ← bccType or Block1Flag,
```

```
                if z then goto UnderRun;        % Check to see if buffer
1 has 0 length.
                totalBlockLenLo ← totalBlockLenLo + block1SizeInNibblesLo;
                totalBlockLenHi ← totalBlockLenHi + block1SizeInNibblesHi + carry,
                        goto AdvanceB1;

% End of Image
EOI:    scanLineCount ← scanLineCount + 1;
        call WriteBreakTable;
        call PrepareToReturn;

bccStatus ← EOIFlag,
                goto bccDone;

UnderRun:
        nibbleCountThisBreakLo ← nibbleCountLo - nibbleCountThisBreakLo;
        nibbleCountThisBreakHi ← nibbleCountHi - nibbleCountThisBreakHi -
borrow;

call PrepareToReturn;

unparsedNibbleCountLo ← totalBlockLenLo - nibbleCountLo;
        unparsedNibbleCountHi ← totalBlockLenHi - nibbleCountHi - borrow;

unparsedNibbleCountLo ← unparsedNibbleCountLo - blockNibbleOffset;
        unparsedNibbleCountHi ← unparsedNibbleCountHi - borrow;
        write (savedAddressP1) ← unparsedNibbleCountLo;
        write (savedAddressP1) ← unparsedNibbleCountHi;
        bccStatus ← UnderRunFlag,
                goto bccDone;

NoBcc:
        bccStatus ← NoBccFlag;

bccDone:
        tosM7 ← bccStatus;
        stackPtr ← 1;
        cacheOutput (zero, InputStreamDestroy) ← zero;
        endEmulation;

PrepareToReturn:
        tableIndex ← shiftField (tableIndex, -1);% divide by 2 for # of table entries
instead of # of words
        nil ← bccType and Is4WordTableFlag;
        if z then goto WriteIndex;
        tableIndex ← shiftField (tableIndex, -1);
        % divide by 2 again because it is a 4 word break table;
WriteIndex:
        write (infoPtrHi, infoPtrLo) ← tableIndex;        % tableIndex to return
to mesa
        write (savedAddressP1) ← nibbleCountThisBreakLo;
```

```
        write (savedAddressP1) ← nibbleCountThisBreakHi;
        write (savedAddressP1) ← scanLineCount;
        write (savedAddressP1) ← tableNibbleCountLo;
        write (savedAddressP1) ← tableNibbleCountHi;
        write (savedAddressP1) ← scanlineCountSoFar;
        return;

WriteBreakTable:
        scanlineCountSoFar ← scanlineCountSoFar + scanLineCount; %Write
scanLineCount & tableNibbleCounts to memory
        nibbleCountThisBreakLo ← nibbleCountLo - nibbleCountThisBreakLo;
        nibbleCountThisBreakHi ← nibbleCountHi - nibbleCountThisBreakHi -
borrow;
        nil ← bccType and Is4WordTableFlag;
        if z then goto Write2WordTable;
Write4WordTable:
        write (tablePtrHi, tablePtrLo) ← tableNibbleCountHi;
        write (savedAddressP1) ← tableNibbleCountLo;
        temp ← shiftField (scanLineNibbles, 2);
        write (savedAddressP1) ← temp;
        write (savedAddressP1) ← scanLineCount;
        temp ← 4, goto TableWritten;
Write2WordTable:
        temp ← shiftField (scanLineCount, 8);
        temp ← temp or tableNibbleCountHi;
        write (tablePtrHi, tablePtrLo) ← temp;
        write (savedAddressP1) ← tableNibbleCountLo;
        temp ← 2;
TableWritten:
        tablePtrLo ← tablePtrLo + temp;
        tablePtrHi ← tablePtrHi + carry;
        tableIndex ← tableIndex + temp;

tableNibbleCountLo ← tableNibbleCountLo + nibbleCountThisBreakLo;
        tableNibbleCountHi ← tableNibbleCountHi + nibbleCountThisBreakHi +
carry;
        nibbleCountThisBreakLo ← nibbleCountLo;
        nibbleCountThisBreakHi ← nibbleCountHi;
        scanLineCount ← 0, return;

CheckInterrupt:
        temp ← cacheInput(zero, c1InterruptStatus);
        temp ← loadField(temp, interruptLevelField);
        nil ← temp xor 1FH;
        if z then goto AdvanceLine; % if no interrupt continue processing
        level ← temp; % level is defined in mesachannel.ms tableIndex ← shiftField (tableIndex, -1);% divide by 2 for # of table entries
instead of # of words
        nil ← bccType and Is4WordTableFlag;
        if z then goto IntCont;
        tableIndex ← shiftField (tableIndex, -1);
          % divide by 2 again because it is a 4 word break table;
IntCont:
```

```
                write (infoPtrHi, infoPtrLo) ← tableIndex;         % tableIndex to return
to mesa
                write (savedAddressP1) ← zero; % nibbleCountThisBreak = 0 because we
are
                write (savedAddressP1) ← zero; % at a break boundry when we interrupt
                write (savedAddressP1) ← zero; % scanLineCount = 0 also
                write (savedAddressP1) ← tableNibbleCountLo;
                write (savedAddressP1) ← tableNibbleCountHi;
                write (savedAddressP1) ← scanlineCountSoFar;

unparsedNibbleCountLo ← totalBlockLenLo - nibbleCountLo;
                unparsedNibbleCountHi ← totalBlockLenHi - nibbleCountHi - borrow;
                unparsedNibbleCountLo ← unparsedNibbleCountLo - blockNibbleOffset;
                unparsedNibbleCountHi ← unparsedNibbleCountHi - borrow;
                nibbleOffset ← loadField (bccStatusImage, 14:2);     % Get the nibble
offset
                bccParameters ← insertField (nibbleOffset, 4:4) or bccParameters;
                newBlockSizeLo ← unparsedNibbleCountLo + nibbleOffset;
                newBlockSizeHi ← unparsedNibbleCountHi + carry;

nil ← bccType and Block1Flag;
                if nz then goto SetBlock1;

usedBlockSizeLo ← block0SizeInNibblesLo - unparsedNibbleCountLo;
                usedBlockSizeHi ← block0SizeInNibblesHi - unparsedNibbleCountHi -
borrow;
                usedBlockSizeLo ← shiftField(usedBlockSizeLo, -2);
                usedBlockSizeLo ← insertField (usedBlockSizeHi, 0:2) or usedBlockSizeLo;
                usedBlockSizeHi ← shiftField(usedBlockSizeHi, -2);
                block0PtrLo ← block0PtrLo + usedBlockSizeLo;
                block0PtrHi ← block0PtrHi + usedBlockSizeHi + carry;
                block0SizeInNibblesLo ← newBlockSizeLo;
                block0SizeInNibblesHi ← newBlockSizeHi;
                goto StreamDestroy;

SetBlock1:
                usedBlockSizeLo ← block1SizeInNibblesLo - unparsedNibbleCountLo;
                usedBlockSizeHi ← block1SizeInNibblesHi - unparsedNibbleCountHi -
borrow;
                usedBlockSizeLo ← shiftField(usedBlockSizeLo, -2);
                usedBlockSizeLo ← insertField (usedBlockSizeHi, 0:2) or usedBlockSizeLo;
                usedBlockSizeHi ← shiftField(usedBlockSizeHi, -2);
                block1PtrLo ← block1PtrLo + usedBlockSizeLo;
                block1PtrHi ← block1PtrHi + usedBlockSizeHi + carry;
                block1SizeInNibblesLo ← newBlockSizeLo;
                block1SizeInNibblesHi ← newBlockSizeHi;
                block0PtrLo ← zero;
                block0PtrHi ← zero;
                block0SizeInNibblesLo ← zero;
                block0SizeInNibblesHi ← zero;

StreamDestroy:
                cacheOutput (zero, InputStreamDestroy) ← zero;
``` stackPtr ← 0CH, goto BccInt;

APPENDIX 21 
-- File: DIFConstants.mesa - last edit:
DIRECTORY
  ResMgrIDs USING [ID],
  ResMgrStorage USING [Pages];
DIFConstants: DEFINITIONS =
BEGIN
-- ResMgrIDs ID used in NetStream and MIPStream
ResMgrID: ResMgrIDs.ID = [captureIP, netServe];
-- Size of MIP file segments
MIPSegmentSize: ResMgrStorage.Pages = 180;
END.

```
-- File: DIFPixelData.mesa - last edit:

DIRECTORY
  RasterObjects USING [PixelSequence, PixelOverhead],
  RTOSFile USING [FileID, nullID];

DIFPixelData: DEFINITIONS =
BEGIN

UndefinedSeqencePixelData: TYPE = RECORD [
    breakTableIndex: CARDINAL ← 0,
    breakTableOffset: LONG CARDINAL ← 0,
    breakTableLengthInWords: CARDINAL ← 0,
    fileId: RTOSFile.FileID ← RTOSFile.nullID,
    oddByte: BOOLEAN ← FALSE,
    numberOfBreakTableEntries: LONG CARDINAL ← 0,
    pixelEncodingOffset: LONG CARDINAL ← 0,
    pixelLengthInWords: LONG CARDINAL ← 0,
    pixelSequenceType: RasterObjects.PixelSequence ← spare1,
    pixelV0ThroughV3: RasterObjects.PixelOverhead ← TRASH,
    unusedInLastBlock: LONG CARDINAL ← 0,
    scanlineCountFromBcc: CARDINAL ← 0,
    scansPerBreak: CARDINAL ← 16];

END.
```

```
-- File: FENetServ.mesa - last edit:

DIRECTORY
  JobID USING [ID],
  JobQ USING [Priority],
  PublicPrinting USING [Finishing, InternalMedia,
    PagesToPrint, Plex],
  RTOSFile USING [FileID, nullID],
  ServPreParse USING [DefaultRecord],
  System USING [GreenwichMeanTime],
  UserProfile USING [DefaultJobAccess];

FENetServ: DEFINITIONS =

BEGIN

-- TYPES --

JobParms: TYPE = RECORD [
  access: UserProfile.DefaultJobAccess ← [[all[]], [all[]]],
  accountNum: LONG STRING ← NIL,
  copyCount: CARDINAL ← 1,
  createDate: System.GreenwichMeanTime,
  finishing: PublicPrinting.Finishing ← sampleTray,
  jobName: LONG STRING ← NIL,
  media: PublicPrinting.InternalMedia ← DESCRIPTOR[NIL,0],
  message: LONG STRING ← NIL,
  owner: LONG STRING ← NIL,
  priority: JobQ.Priority ← medium,
  recipientName: LONG STRING ← NIL,
  senderName: LONG STRING ← NIL,
  sigJob: BOOLEAN ← FALSE];
JobParmsPtr: TYPE = LONG POINTER TO JobParms;

PreParseStepParms: TYPE = RECORD [
  defaulted: ServPreParse.DefaultRecord ← [
    copyCount: TRUE,
    jobCreateDate: TRUE,
    jobName: TRUE,
    medium: TRUE,
    message: TRUE,
    pagesToPrint: TRUE,
    plex: TRUE,
    priority: TRUE,
    recipientName: TRUE,
    senderName: TRUE,
    staple: TRUE],
  ipFileID: RTOSFile.FileID ← RTOSFile.nullID,
  media: PublicPrinting.InternalMedia ← DESCRIPTOR[NIL,0],
  plex: PublicPrinting.Plex ← simplex,
  pagesToPrint: PublicPrinting.PagesToPrint ← [var: range[[1, LAST[CARDINAL]]]],
```

```
    topOfQueue: BOOLEAN ← FALSE];

Error: SIGNAL [code: ErrorCode];

ErrorCode: TYPE = {
 mediumUnavailable,
 invalidPrintParameters,
 systemError,
 spare1,
 spare2};

FirstBlockComplete: PROCEDURE [
 preParseStepParms: PreParseStepParms,
 jobID: JobID.ID];

Print: PROCEDURE [jobParms: JobParmsPtr]
 RETURNS [printRequestID: JobID.ID];

END. «FENetServ»
```

```
-- File: FENetSupport.mesa - last edit:

DIRECTORY
 DirectoryType USING [OperatorAccess],
 JobBackUp USING [LockID],
 JobQ USING [CreateDateOption, Disposition, JobReference, Priority],
 MRSignature USING [defaultTrimOffset, defaultTrimSizeX, defaultTrimSizeY,
  TrimOffset, TrimSizeX, TrimSizeY],
 PublicPrinting USING [Finishing, MediumDimensions];

FENetSupport: DEFINITIONS =

BEGIN

OtherOption: TYPE = RECORD [
 name: LONG STRING,
 data: LONG DESCRIPTOR FOR ARRAY CARDINAL OF CARDINAL]; -- Variable data PreParseOptionsType: TYPE = {copyCount, collated, docComment, docCreateDate,
 docCreator, docEndMessage, docName, docStartMessage, finishing,
 finishingMessage, jobAccount, jobAcquireAccess, jobComment, jobEndMessage,
 jobModifyAccess, jobName, jobOwner, jobPriority, jobStartMessage,
 recipientName, senderName, signature, slipSheet, other};

PreParseOptions: TYPE = LONG DESCRIPTOR FOR ARRAY CARDINAL OF
PreParseOptionsChoice;

PreParseOptionsChoice: TYPE = RECORD[
 SELECT tag: PreParseOptionsType FROM
  copyCount = > [copyCount: CARDINAL ← 1],
  collated = > [collated: BOOLEAN ← TRUE],
  docComment = > [docComment: LONG STRING ← NIL],
  docCreateDate = > [docCreateDate: JobQ.CreateDateOption],
  docCreator = > [docCreator: LONG STRING ← NIL],
  docEndMessage = > [docEndMessage: LONG STRING ← NIL],
  docName = > [docName: LONG STRING ← NIL],
  docStartMessage = > [docStartMessage: LONG STRING ← NIL],
  finishing = > [
    finishing: PublicPrinting.Finishing ← none,
          stitchA: CARDINAL ← 0,
          stitchB: CARDINAL ← 0,
      stitchNormal: BOOLEAN ← TRUE],
  finishingMessage = > [finishingMessage: LONG STRING ← NIL],
  jobAccount = > [jobAccount: LONG STRING ← NIL],
  jobAcquireAccess = > [jobAcquireAccess: DirectoryType.OperatorAccess],
  jobComment = > [jobComment: LONG STRING ← NIL],
  jobEndMessage = > [jobEndMessage: LONG STRING ← NIL],
  jobModifyAccess = > [jobModifyAccess: DirectoryType.OperatorAccess],
  jobName = > [jobName: LONG STRING ← NIL],
  jobOwner = > [jobOwner: LONG STRING ← NIL],
```

```
jobPriority = > [priority: JobQ.Priority ← medium],
jobStartMessage = > [jobStartMessage: LONG STRING ← NIL],
recipientName = > [recipientName: LONG STRING ← NIL],
senderName = > [senderName: LONG STRING ← NIL],
signature = > [
  trimOffset: MRSignature.TrimOffset ← MRSignature.defaultTrimOffset,
  trimSizeX: MRSignature.TrimSizeX ← MRSignature.defaultTrimSizeX,
  trimSizeY: MRSignature.TrimSizeY ← MRSignature.defaultTrimSizeY],
slipSheet = > [
  on: BOOLEAN ← FALSE,
        dimensions: PublicPrinting.MediumDimensions ← [0,0]],
other = > [otherOption: OtherOption],
ENDCASE];

PreParseParmsReady: PROCEDURE [
  disposition: JobQ.Disposition, preParseOptions: PreParseOptions,
  jobReference: JobQ.JobReference, lockID: JobBackUp.LockID];

END.

-- File: IPDIF.mesa - last edit:

DIRECTORY
  BlockStream USING [StreamHandle];

IPDIF: DEFINITIONS =
BEGIN

Handle: TYPE = LONG POINTER TO HandleRep ← NIL;
HandleRep: TYPE;

Command: TYPE = {continue, suspend, abort};
Status: TYPE = {ok, done, error};

StatusProc: TYPE = PROC [handle: Handle, status: Status]
  RETURNS [command: Command];

CleanUpStream: PROC [inStream: BlockStream.StreamHandle];

FilterStream: PROC [
  handle: Handle, inStream, outStream: BlockStream.StreamHandle,
  statusProc: StatusProc];

Init: PROCEDURE [];

END.
```

-- File: IPDIFScanner.mesa - last edit:

DIRECTORY
 BlockStream USING [Block, StreamHandle];

IPDIFScanner: DEFINITIONS =
 BEGIN

Error: ERROR [code: errorType];
 errorType: TYPE = {unexpectedEOF,InvalidStreamOp, spare1, spare2};

InstallPixelVector: PROC [inStream, outStream: BlockStream.StreamHandle,
  startBlock: BlockStream.Block, index: LONG CARDINAL, zone: UNCOUNTED ZONE,
  prevPVEnd: LONG CARDINAL]
  RETURNS[endBlock: BlockStream.Block, start: CARDINAL,
   endOfStream: BOOLEAN, installed: BOOLEAN,
    newBlock: BOOLEAN];

END.

```
-- File: IPDIFScannerPrivate.mesa - last edit:

DIRECTORY
 BlockStream USING [StreamHandle],
 DIFPixelData USING [UndefinedSeqencePixelData],
 IMBcc USING [BCCInfo],
 ResMgr USING [TransferID, nullTransferID],
 ResMgrIDs USING [ID],
 ResMgrStorage USING [Pages];

IPDIFScannerPrivate: DEFINITIONS =

BEGIN

Handle: TYPE = LONG POINTER TO HandleRep ← NIL;
HandleRep: TYPE = RECORD [
  bccInfo: IMBcc.BCCInfo ← [],
  clientId: ResMgrIDs.ID ← [captureIP, netServe],
  inStream: BlockStream.StreamHandle ← NIL,
  undefinedSeqData: DIFPixelData.UndefinedSeqencePixelData ← [],
  xferId: ResMgr.TransferID ← ResMgr.nullTransferID];

-- Procedures

InitPBTTable: PROCEDURE [handle: Handle, xPixels: CARDINAL];

StorePBT: PROCEDURE [handle: Handle];

VerifyAndCachePBT: PROCEDURE [
  handle: Handle, fileOffsetInPages: ResMgrStorage.Pages];

END.
```

```
-- File: MIPStreamMgr.mesa - last edit:

DIRECTORY
 BlockStream USING [StreamHandle],
 Courier USING [ErrorCode],
 FaultLogger USING [ID],
 JobID USING [ID],
 ResMgr USING [Status],
 RMDirectory USING [ErrorCode],
 RTOSFile USING [FileID],
 Stream USING [CompletionCode];

MIPStreamMgr: DEFINITIONS =
BEGIN

-- Types

StatusProc: TYPE = PROCEDURE [clientID: JobID.ID, problem: Problem];

ProblemType: TYPE = {
 aborted, badStreamHandle, courierError, directoryError, invalidIPBuffer,
 resMgrError, streamTimeOut, unknownNetResponce, spare};

Problem: TYPE = RECORD [
 SELECT type: ProblemType FROM
 aborted = > [],
 badStreamHandle = > [],
 courierError = > [code: Courier.ErrorCode],
 directoryError = > [code: RMDirectory.ErrorCode, faultID: FaultLogger.ID],
 invalidIPBuffer = > [code: CARDINAL],
 resMgrError = > [code: ResMgr.Status, faultID: FaultLogger.ID],
 streamTimeOut = > [],
 unknownNetResponce = > [code: Stream.CompletionCode],
 spare = > [code: CARDINAL],
 ENDCASE];

Source: TYPE = {disk, net, spare};

StreamStatus: TYPE = {nthBlockTransmitted, spare};
StreamStatusProc: TYPE = PROC [
 bsH: BlockStream.StreamHandle, streamStatus: StreamStatus];

CreateCacheOutputStream: PROC [
 streamStatusProc: StreamStatusProc, statusOnBlockNumber: CARDINAL ← 1,
 zone: UNCOUNTED ZONE] RETURNS [bsH: BlockStream.StreamHandle, fileId:
RTOSFile.FileID];

CreateDiskOutputStream: PROC [
 streamStatusProc: StreamStatusProc, statusOnBlockNumber: CARDINAL ← 1,
 zone: UNCOUNTED ZONE] RETURNS [bsH: BlockStream.StreamHandle, fileId:
RTOSFile.FileID];
```

```
DeleteStream: PROC [bsH: BlockStream.StreamHandle];

OpenMIPInputStream: PROCEDURE [
  streamHandle: BlockStream.StreamHandle, fileID: RTOSFile.FileID,
  statusProc: StatusProc, zone: UNCOUNTED ZONE];

CloseStream: PROC [streamHandle: BlockStream.StreamHandle];

GetPrintIDStatus: PROCEDURE [clientID: JobID.ID] RETURNS [ok: BOOLEAN];

SetPrintIDStatus: PROCEDURE [clientID: JobID.ID, ok: BOOLEAN];

END.
```

```
-- File: NetLog.mesa - last edit:
DIRECTORY
 ResMgrStorage USING [Pages];

NetLog: DEFINITIONS =

BEGIN

-- Types
Entry: TYPE = RECORD [
 var: SELECT eventType: EventType FROM
   null = > [],
         filterStream = > [],
         scanForPV = > [],
         cleanUpDIF = > [],
         createStream = > [],
         createDiskStream = > [],
         getOffset = > [],
         putFileToStream = > [numberOfBlocks: CARDINAL],
         syncStream = > [offset: ResMgrStorage.Pages],
         aFreeList = > [blockPointer: LONG POINTER],
         aInUseList = > [blockPointer: LONG POINTER],
         aReadyList = > [blockPointer: LONG POINTER],
         delete = > [],
         getBufferList = > [],
         gFreeList = > [blockPointer: LONG POINTER],
         gInUseList = > [blockPointer: LONG POINTER],
         gReadyList = > [blockPointer: LONG POINTER],
         receive = > [blockPointer: LONG POINTER],
         acquire = > [blockPointer: LONG POINTER],
         return = > [blockPointer: LONG POINTER],
         setAbort = > [],
         setEOF = > [],
         transmit = > [blockPointer: LONG POINTER],
         installPV = > [index: CARDINAL, prevPVEnd: LONG CARDINAL],
         cleanUp = > [],
         open = > [seqLength: LONG CARDINAL],
         close = > [],
         genXYTable = > [],
         storeTrailer = > [offset: ResMgrStorage.Pages],
         ENDCASE];

EventType: TYPE = {null, filterStream, scanForPV, cleanUpDIF, createStream,
createDiskStream, getOffset, putFileToStream, syncStream, aFreeList, aInUseList,
aReadyList, delete, getBufferList, gFreeList, gInUseList, gReadyList, receive, acquire,
return, setAbort, setEOF, transmit, installPV, cleanUp, open, close, genXYTable,
storeTrailer};

NetStreamType: TYPE = EventType[createStream..transmit];

ScannerAType: TYPE = EventType[installPV..storeTrailer];

IPType: TYPE = EventType[filterStream..cleanUpDIF];
```

-- Procs

CreateLog: PROCEDURE[zone: UNCOUNTED ZONE, nEntries: CARDINAL];

DestroyLog: PROCEDURE[zone: UNCOUNTED ZONE];

Log: PROCEDURE[entry: Entry];

END...

```
-- File: Print3Sched.mesa - last edit:

DIRECTORY
  Print3 USING [PrintAttributes, PrintOptions, RequestID],
  Stream USING [Handle];

Print3Sched: DEFINITIONS =
  BEGIN

PrintJob: PROCEDURE [
    master: Stream.Handle,
    printAttributes: Print3.PrintAttributes,
    printOptions: Print3.PrintOptions]
    RETURNS [printRequestID: Print3.RequestID];

END. <<Print3Sched>>

-- File: Print3SchedExtra.mesa - Last Edit:

DIRECTORY
  RTOSFile USING [FileID];

Print3SchedExtra: DEFINITIONS =
  BEGIN

-- Procs
  GetMIPFile: PROC[] RETURNS[mipFile: RTOSFile.FileID];
  END.
```

```
-- File: Print3SchedInternal.mesa - Last Edit:

DIRECTORY
  BlockStream USING [StreamHandle],
  JobID USING [ID, nullID],
  JobStep USING [RootStep],
  JobQ USING [JobReference, nullJobReference],
  FENetServ USING [PreParseStepParms];

Print3SchedInternal: DEFINITIONS =
BEGIN

-- Types
PrintJobHandle: TYPE = LONG POINTER TO PrintJobObject;

PrintJobObject: TYPE = RECORD [
  next: PrintJobHandle ← NIL,
  jobID: JobID.ID ← JobID.nullID,
  jobReference: JobQ.JobReference ← JobQ.nullJobReference,
  inStream: BlockStream.StreamHandle ← NIL,
  outStream: BlockStream.StreamHandle ← NIL,
  preParseStepParms: LONG POINTER TO FENetServ.PreParseStepParms ← NIL,
  rootStep: JobStep.RootStep,
  sH: PrintStateHandle ← NIL];

PrintStateHandle: TYPE = LONG POINTER TO PrintStateObject;

PrintStateObject: TYPE = MONITORED RECORD [state: State ← idle];

State: TYPE = {aborting, completing, idle, running};

-- Constants

-- Procs

AddInstance: PROC[pH: PrintJobHandle];
FindInstanceByStream: PROC[bsH: BlockStream.StreamHandle] RETURNS [pH: PrintJobHandle];
FindInstanceByJob: PROC[jobID: JobID.ID] RETURNS [pH: PrintJobHandle];
RemoveInstance: PROC[pH: PrintJobHandle];

END.
```

```
-- File: Print3Status.mesa - last edit:

DIRECTORY
  PublicPrinting USING [Spooler],
  ResMgrStorage USING [Pages];

Print3Status: DEFINITIONS =
BEGIN << Print3Status >> heap: UNCOUNTED ZONE;
pagesInBuffer: CARDINAL;
bytesInBuffer: CARDINAL;
extendFileBy: ResMgrStorage.Pages;
defaultFileSize: ResMgrStorage.Pages;
maxFileSize: ResMgrStorage.Pages;

-- Procedures

CheckDiskUsage: PROCEDURE [masterSize: ResMgrStorage.Pages,
                          completed: BOOLEAN];

CheckServiceEnabled: PROCEDURE [];

CloseConnection: PROCEDURE [error: BOOLEAN];

CloseDiskConnection: PROCEDURE [size: ResMgrStorage.Pages];

CloseStreamConnection: PROCEDURE [];

OpenConnection: PROCEDURE [];

GetSpoolingStatus: PROCEDURE []
  RETURNS [status: PublicPrinting.Spooler];

CheckStatus: PROCEDURE []
  RETURNS [disabled: BOOLEAN];
END.
```

-- File: SMNetServSSC.mesa - last edit:

DIRECTORY
 EventHandler USING [MemoryActionCompleteProcType],
 JobID USING [ID],
 ResMgrIDs USING [TransactionID],
 ResMgrStorage USING [Pages];

SMNetServSSC: DEFINITIONS =
 BEGIN << NetServSM >>

-- Procedures

Abort: PROCEDURE [jobID: JobID.ID];

AbortAll: PROCEDURE [];

ClearFault: PROCEDURE [bucket: CARDINAL];

Init: PROCEDURE [];

PurgeCompleted: PROCEDURE [];

Resume: PROCEDURE [id: ResMgrIDs.TransactionID];

SetServiceSwitch: PROCEDURE [onLine: BOOLEAN];

SetPrint3ServerSwitch: PROCEDURE [enable: BOOLEAN];

SetSpoolingSwitch: PROCEDURE [enable: BOOLEAN];

SetMaxPrintConnections: PROCEDURE [newLimit: CARDINAL]
   RETURNS [ok: BOOLEAN];

SetMaxDiskUsage: PROCEDURE [pages: ResMgrStorage.Pages];

Shutdown: PROCEDURE [id: ResMgrIDs.TransactionID,
                     proc:
EventHandler.MemoryActionCompleteProcType];

END.

```
-- File: IPDIFImpl.mesa - last edit:

DIRECTORY
  BlockStream USING [Block, EOF, nullBlock, StreamHandle],
  Environment USING [Byte, bytesPerPage],
  EventLogger USING [Log],
  Heap USING [systemZone],
  IMBcc USING [BccProcess],
  IMExtra USING [GetBccMesaChannel],
  IPDIF USING [Handle, StatusProc],
  IPDIFScanner USING [InstallPixelVector],
  NetLog USING [Log],
  Process USING [Detach],
  RTOSMP2Process USING [DirectProcess],
  RTOSFile USING [Delete, Error, FileID, nullID];

IPDIFImpl: PROGRAM
  IMPORTS
    BlockStream, EventLogger, Heap, IMExtra, IMBcc, IPDIFScanner, NetLog, Process,
    RTOSFile, RTOSMP2Process
  EXPORTS IPDIF =
  BEGIN workingZone: UNCOUNTED ZONE = Heap.systemZone;

headerOffset: CARDINAL = 21;
  bytesPerPage: CARDINAL = Environment.bytesPerPage;

ShortNumberULimit: Environment.Byte = 80H;
  ShortOperatorULimit: Environment.Byte = 0A0H;
  LongOperatorULimit: Environment.Byte = 0C0H;
  ShortSequenceULimit: Environment.Byte = 0E0H;

LongAdaptiveSeq: Environment.Byte = 0ECH;
  LongCCITT4Seq: Environment.Byte = 0EDH;
  LongCompressedSeq: Environment.Byte = 0EAH;
  LongPackedSeq: Environment.Byte = 0E9H;

DIFLongAdaptiveSeq: Environment.Byte = 0FCH;
  DIFLongCCITT4Seq: Environment.Byte = 0FDH;
  DIFLongCompressedSeq: Environment.Byte = 0FAH;
  DIFLongPackedSeq: Environment.Byte = 0F9H;

ScanState: TYPE = {normal, NeedShortLength, NeedLongLength, NeedFileID};
  BlockGenerator: TYPE = PROC [blockAction: BlockAction];
  BlockAction: TYPE = PROC [block: BlockStream.Block, start: LONG CARDINAL]
    RETURNS [found: BOOLEAN ← FALSE, index: CARDINAL ← 0, next: LONG
  CARDINAL ← 0];

FileID: TYPE = MACHINE DEPENDENT RECORD [
    SELECT OVERLAID * FROM
    id = > [id: RTOSFile.FileID],
    bytes = > [
      b0: Environment.Byte,
```

```
    b1: Environment.Byte,
    b2: Environment.Byte,
    b3: Environment.Byte,
    b4: Environment.Byte,
    b5: Environment.Byte,
    b6: Environment.Byte,
    b7: Environment.Byte],
ENDCASE];

LongNumber: TYPE = MACHINE DEPENDENT RECORD [
SELECT OVERLAID * FROM
real = > [real: REAL],
lp = > [lp: LONG POINTER],
lc = > [lc: LONG CARDINAL],
li = > [li: LONG INTEGER],
pair = > [lo: CARDINAL, hi: CARDINAL],
bytes = > [
  lh: Environment.Byte,
  ll: Environment.Byte,
  hh: Environment.Byte,
  hl: Environment.Byte],
bits = > [bits: PACKED ARRAY INTEGER [0..31] OF BOOL],
ENDCASE];

FilterStream: PUBLIC PROC [
  handle: IPDIF.Handle, inStream, outStream: BlockStream.StreamHandle,
  statusProc: IPDIF.StatusProc] = {
  ENABLE UNWIND = > outStream.setEOF[outStream];
  blockGenerator: BlockGenerator = {
    index: CARDINAL ← 0;
    found, endOfStream: BOOLEAN ← FALSE;
    installed: BOOLEAN ← FALSE;
    newBlock: BOOLEAN ← FALSE;
    block: BlockStream.Block ← BlockStream.nullBlock;
    prevPVEnd, start: LONG CARDINAL ← 0;  -- prevPVEnd is trim index for MIP left
side of block
    GetBlock: PROC [] = INLINE {
     IF statusProc[handle, ok] = abort THEN ERROR ABORTED;
     block ← inStream.receive[
      inStream ! BlockStream.EOF = > {endOfStream ← TRUE; CONTINUE}]};
    GetBlock[];
    start ← headerOffset;  -- Compensate for Interpress Header
    WHILE NOT endOfStream DO
     [found, index, start] ← blockAction[block, start];
     IF found THEN {
      EventLogger.Log[581];  -- startFiling for now means start InstallPixelVector
      [block, start, endOfStream, installed, newBlock] ←
       IPDIFScanner.InstallPixelVector[
        inStream, outStream, block, index, workingZone, prevPVEnd];
      EventLogger.Log[582];  -- endFiling for now means end InstallPixelVector
      IF installed THEN prevPVEnd ← start ELSE IF newBlock THEN prevPVEnd ← 0;
      }
     ELSE {
      block.startIndex ← (prevPVEnd / bytesPerPage) * bytesPerPage;
```

```
            outStream.transmit[outStream, block];
            GetBlock[];
            prevPVEnd ← 0};
          ENDLOOP;
          IF found THEN outStream.transmit[outStream, block];
          outStream.setEOF[outStream];
          };
      EventLogger.Log[451];
      NetLog.Log[[filterStream[]]];
      ScanForPixelVectors[blockGenerator ! ABORTED = > CONTINUE];
      [] ← statusProc[handle, done];
      EventLogger.Log[452];
      };

ScanForPixelVectors: PROC [blockGenerator: BlockGenerator] = {
      scanningState: ScanState ← normal;
      len: LongNumber ← [li[0]];
      longNumberIndex: CARDINAL ← 0;
      blockAction: BlockAction = {
        i: LONG CARDINAL ← start;
        SetSeqLength: PROC = {
          SELECT longNumberIndex FROM
            0 = > len.hl ← block.blockPointer[CARDINAL[i]];
            1 = > len.lh ← block.blockPointer[CARDINAL[i]];
            2 = > len.ll ← block.blockPointer[CARDINAL[i]];
            ENDCASE = > ERROR;
          };
        NetLog.Log[[scanForPV[]]];
        SELECT scanningState FROM
          NeedShortLength = > i ← i + block.blockPointer[CARDINAL[i]] + 1;
          NeedLongLength = > {
            WHILE longNumberIndex < 3 DO
              SetSeqLength[];
              i ← i + 1;
              longNumberIndex ← longNumberIndex + 1;
              ENDLOOP;
            i ← i + len.li;
            };
          ENDCASE = > NULL;
        scanningState ← normal;
        WHILE i < block.stopIndexPlusOne DO
          SELECT block.blockPointer[CARDINAL[i]] FROM
            < ShortNumberULimit = > i ← i + 2;
            < ShortOperatorULimit = > i ← i + 1;
            < LongOperatorULimit = > i ← i + 2;
            < ShortSequenceULimit = >
            IF (i + 1) = block.stopIndexPlusOne THEN {
              scanningState ← NeedShortLength; RETURN[FALSE, 0, 0]; }
            ELSE i ← i + block.blockPointer[CARDINAL[(i ← i + 1)]] + 1;
            ENDCASE = > { -- SequenceLong
              SELECT block.blockPointer[CARDINAL[i]] FROM
                LongAdaptiveSeq, LongCCITT4Seq, LongCompressedSeq, LongPackedSeq
= >
                  RETURN[TRUE, CARDINAL[i], next];
```

```
      ENDCASE = > { -- Something other than Long Pixel Vector Sequence
       len.li ← longNumberIndex ← 0;
       WHILE (i ← i + 1) < block.stopIndexPlusOne AND longNumberIndex < 3
        DO
        SetSeqLength[]; longNumberIndex ← longNumberIndex + 1; ENDLOOP;
       IF longNumberIndex # 3 THEN { -- Length is in next block
         scanningState ← NeedLongLength; RETURN[FALSE, 0, 0]; };
       i ← i + len.li;
       };
      };
   ENDLOOP;
   next ← i - block.stopIndexPlusOne;
   };
  blockGenerator[blockAction];
  };

Init: PUBLIC PROCEDURE [] = {
 mesaChannel: CARDINAL ← IMExtra.GetBccMesaChannel[];
 bccProcess: PROCESS ← FORK IMBcc.BccProcess[];
 Process.Detach[bccProcess];
 RTOSMP2Process.DirectProcess[process: bccProcess, channel: mesaChannel];
 };

CleanUpStream: PUBLIC PROC [inStream: BlockStream.StreamHandle] = {
 blockGenerator: BlockGenerator = {
  index: CARDINAL ← 0;
  start: LONG CARDINAL ← 0;
  found, endOfStream: BOOLEAN ← FALSE;
  block: BlockStream.Block ← BlockStream.nullBlock;
  GetBlock: PROC [] = INLINE {
   block ← inStream.receive[
    inStream ! BlockStream.EOF = > {endOfStream ← TRUE; CONTINUE}]};
  GetBlock[];
  start ← headerOffset;
  WHILE NOT endOfStream DO
   [found, index, start] ← blockAction[block, start];
   inStream.return[inStream, block];
   GetBlock[];
   ENDLOOP;
  };
 ScanForFileIDs[blockGenerator];
 };

ScanForFileIDs: PROC [blockGenerator: BlockGenerator] = {
 scanningState: ScanState ← normal;
 longNumberIndex: CARDINAL ← 0;
 sequence: Environment.Byte ← 0;
 len: LongNumber ← [li[0]];
 fileID: FileID ← [id[RTOSFile.nullID]];
 fileIDIndex: CARDINAL ← 0;
 blockAction: BlockAction = {
  i: LONG CARDINAL ← start;
  SetSeqLength: PROC = {
   SELECT longNumberIndex FROM
```

```
      0 => len.hl ← block.blockPointer[CARDINAL[i]];
      1 => len.lh ← block.blockPointer[CARDINAL[i]];
      2 => len.ll ← block.blockPointer[CARDINAL[i]];
      ENDCASE => ERROR;
     };
   SetFileID: PROC = {
    SELECT fileIDIndex FROM
      0 => fileID.b0 ← block.blockPointer[CARDINAL[i]];
      1 => fileID.b1 ← block.blockPointer[CARDINAL[i]];
      2 => fileID.b2 ← block.blockPointer[CARDINAL[i]];
      3 => fileID.b3 ← block.blockPointer[CARDINAL[i]];
      4 => fileID.b4 ← block.blockPointer[CARDINAL[i]];
      5 => fileID.b5 ← block.blockPointer[CARDINAL[i]];
      6 => fileID.b6 ← block.blockPointer[CARDINAL[i]];
      ENDCASE => ERROR;
     };
   SELECT scanningState FROM
    NeedShortLength => i ← i + block.blockPointer[CARDINAL[i]] + 1;
    NeedLongLength => {
     WHILE longNumberIndex < 3 DO
      SetSeqLength[];
      i ← i + 1;
      longNumberIndex ← longNumberIndex + 1;
      ENDLOOP;
     i ← i + len.li;
     SELECT sequence FROM
      DIFLongAdaptiveSeq, DIFLongCCITT4Seq, DIFLongCompressedSeq,
       DIFLongPackedSeq => {
       fileID ← [id[RTOSFile.nullID]];
       fileIDIndex ← 0;
       WHILE (i ← i + 1) < block.stopIndexPlusOne AND fileIDIndex < 7 DO
        SetFileID[]; fileIDIndex ← fileIDIndex + 1; ENDLOOP;
       i ← i + len.li - 8;
       RTOSFile.Delete[fileID.id ! RTOSFile.Error => CONTINUE]};
      ENDCASE => i ← i + len.li;
     };
    NeedFileID => {
     WHILE fileIDIndex < 7 DO
      SetFileID[]; i ← i + 1; fileIDIndex ← fileIDIndex + 1; ENDLOOP;
     i ← i + len.li - 8;
     RTOSFile.Delete[fileID.id ! RTOSFile.Error => CONTINUE]};
    ENDCASE => NULL;

scanningState ← normal;
   WHILE i < block.stopIndexPlusOne DO
    SELECT block.blockPointer[CARDINAL[i]] FROM
      < ShortNumberULimit => i ← i + 2;
      < ShortOperatorULimit => i ← i + 1;
      < LongOperatorULimit => i ← i + 2;
      < ShortSequenceULimit =>
       IF (i + 1) = block.stopIndexPlusOne THEN { -- Length is in next block
        scanningState ← NeedShortLength; RETURN[FALSE, 0, 0]; }
       ELSE i ← i + block.blockPointer[(i ← i + 1)] + 1;
      ENDCASE => { -- SequenceLong
```

```
      sequence ← block.blockPointer[CARDINAL[i]];
      len.li ← longNumberIndex ← 0;
      WHILE (i ← i + 1) < block.stopIndexPlusOne AND longNumberIndex < 3 DO
        SetSeqLength[]; longNumberIndex ← longNumberIndex + 1; ENDLOOP;
      IF longNumberIndex # 3 THEN { -- Length and FileID is in next block
        scanningState ← NeedLongLength; RETURN[FALSE, 0, 0]};
      SELECT sequence FROM
        DIFLongAdaptiveSeq, DIFLongCCITT4Seq, DIFLongCompressedSeq,
          DIFLongPackedSeq = > {
          fileIDIndex ← 0;
          fileID ← [id[RTOSFile.nullID]];
          WHILE (i ← i + 1) < block.stopIndexPlusOne AND fileIDIndex < 7 DO
            SetFileID[]; fileIDIndex ← fileIDIndex + 1; ENDLOOP;
          IF fileIDIndex # 7 THEN { -- fileID is in next block
            scanningState ← NeedFileID; RETURN[FALSE, 0, 0]};
          i ← i + len.li - 8;
          RTOSFile.Delete[fileID.id ! RTOSFile.Error = > CONTINUE]};
        ENDCASE = > i ← i + len.li;
      };
    ENDLOOP;
    next ← i - block.stopIndexPlusOne;
    };
  blockGenerator[blockAction];
  };

END.
```

-- File: IPDlFScannerImplA.mesa - last edit:

DIRECTORY
 ASWFileTypes USING [rasterJob],
 BlockStream USING [Block, EOF, nullBlock, StreamHandle],
 ByteBlt USING [ByteBlt],
 DIFPixelData USING [UndefinedSeqencePixelData],
 Environment USING [Byte, bytesPerPage, bytesPerWord],
 EventLogger USING [Log],
 IMBcc USING [GatherPBTDataFromBcc],
 Inline USING [BITOR, LongMult],
 IPDIFScanner USING [errorType],
 IPDIFScannerPrivate USING [
  Handle, HandleRep, InitPBTTable, StorePBT, VerifyAndCachePBT],
 NetLog USING [Log],
 RasterObjects USING [PixelOverhead],
 ResMgr USING [
  Abort, Allocate, AllocateBufferDescriptor, ChainedWrite, FreeBufferList,
  nullTransferID, TransferID, WaitForCompletion, WriteAsync, WriteSync],
 ResMgrStorage USING [
  BufferList, BufferDescriptor, bytesPerPage, Pages, PagesFromBytes,
  PagesFromWords, wordsPerPage],
 Print3 USING [SystemError],
 RTOSFile USING [Create, Delete, Error, FileID, GetFileInfo, nullID, Truncate],
 RTOSIGStructures USING [
  TiledImageXYEntry, TiledImageXYTablePtr, TiledImageBreakTablePtr,
  TiledImageBreakEntry],
 Stream USING [InvalidOperation, TimeOut];

IPDIFScannerImplANew: PROGRAM
 IMPORTS
  ByteBlt, BlockStream, EventLogger, IMBcc, Inline, IPDIFScannerPrivate, NetLog,
  ResMgr, ResMgrStorage, Print3, RTOSFile, Stream
 EXPORTS IPDIFScanner =
 BEGIN -- TYPEs BYTE: TYPE = Environment.Byte;
 ByteSeq: TYPE = LONG POINTER TO ByteSeqRep;
 ByteSeqRep: TYPE = RECORD [PACKED SEQUENCE COMPUTED CARDINAL OF BYTE];
 Error: PUBLIC ERROR [code: IPDIFScanner.errorType] = CODE;

Handle: TYPE = IPDIFScannerPrivate.Handle;
 HandleRep: TYPE = IPDIFScannerPrivate.HandleRep;

LongNumber: TYPE = MACHINE DEPENDENT RECORD [
  SELECT OVERLAID * FROM
  real = > [real: REAL],
  lp = > [lp: LONG POINTER],
  lc = > [lc: LONG CARDINAL],
  li = > [li: LONG INTEGER],

```
pair = > [lo: CARDINAL, hi: CARDINAL],
bytes = > [
 lh: Environment.Byte,
 ll: Environment.Byte,
 hh: Environment.Byte,
 hl: Environment.Byte],
bits = > [bits: PACKED ARRAY INTEGER [0..31] OF BOOL],
ENDCASE];

SequenceType: TYPE = MACHINE DEPENDENT{
  nil, sequenceString, sequenceInteger, sequenceInsertMaster, sequenceRational,
  sequenceIdentifier, sequenceComment, sequenceContinued,
sequenceLargeVector,
  sequencePackedPixelVector, sequenceCompressedPixelVector, sequenceInsertFile,
  sequenceAdaptivePixelVector, sequenceCCITT4PixelVector,
  undefinedPackedPixelVector(25), undefinedCompressedPixelVector,
  undefinedAdaptivePixelVector(28), (31)};

ShortNumber: TYPE = MACHINE DEPENDENT RECORD [
SELECT OVERLAID * FROM
sc = > [sc: CARDINAL],
si = > [si: INTEGER],
bytes = > [hi: Environment.Byte, lo: Environment.Byte],
bits = > [bits: PACKED ARRAY INTEGER [0..15] OF BOOL],
ENDCASE];

XYTableRecord: TYPE = RECORD [
 xyTableOffSet: CARDINAL ← 0,
 xyTableLength: CARDINAL ← 0];

-- Variables and Constants bytesPerPage: CARDINAL = Environment.bytesPerPage;

noBcc: BOOLEAN ← FALSE;
numberOfBytesForToken: CARDINAL = 1;
numberOfBytesForSeqLength: CARDINAL = 3;
trailerPage: ResMgrStorage.Pages = 1;
numberOfBytesForAdaptiveOverhead: CARDINAL =
 SIZE[adaptive RasterObjects.PixelOverhead] * Environment.bytesPerWord;
numberOfBytesForCompressedOverhead: CARDINAL =
 SIZE[compressed RasterObjects.PixelOverhead] * Environment.bytesPerWord;
numberOfBytesForPackedOverhead: CARDINAL =
 SIZE[packed RasterObjects.PixelOverhead] * Environment.bytesPerWord;
numberOfBytesForFileRep: CARDINAL =
 SIZE[RTOSFile.FileID] * Environment.bytesPerWord;
SequenceContinuedSeq: Environment.Byte = 0E7H;

-- PROCs

CleanUp: PROC [pvHandle: IPDIFScannerPrivate.Handle, zone: UNCOUNTED ZONE]
= {
 NetLog.Log[[cleanUp[]]];
 IF pvHandle # NIL THEN {
```

```
IF pvHandle.xferId # ResMgr.nullTransferID THEN {
  ResMgr.Abort[pvHandle.xferId]; pvHandle.xferId ← ResMgr.nullTransferID};
IF pvHandle.bccInfo.pbtBufferList # NIL THEN
  ResMgr.FreeBufferList[
    id: pvHandle.bccInfo.pbtID, buffer: pvHandle.bccInfo.pbtBufferList];
IF pvHandle.undefinedSeqData.fileId # RTOSFile.nullID THEN
  RTOSFile.Delete[
    pvHandle.undefinedSeqData.fileId ! RTOSFile.Error = > CONTINUE];
IF pvHandle.bccInfo.buffer0.blockPtr # NIL THEN
  zone.FREE[@pvHandle.bccInfo.buffer0.blockPtr];
zone.FREE[@pvHandle];
};
};

InstallPixelVector: PUBLIC PROC [
inStream, outStream: BlockStream.StreamHandle, startBlock: BlockStream.Block,
index: LONG CARDINAL, zone: UNCOUNTED ZONE, prevPVEnd: LONG CARDINAL]
RETURNS [
  endBlock: BlockStream.Block, start: CARDINAL ← 0,
  endOfStream: BOOLEAN ← FALSE, installed: BOOLEAN ← FALSE,
  newBlock: BOOLEAN ← FALSE] = {
pvHandle: IPDIFScannerPrivate.Handle ← NIL;
{
ENABLE UNWIND = > CleanUp[pvHandle, zone];

blockSize: LONG CARDINAL = CARDINAL[startBlock.stopIndexPlusOne];
dataAddedToMip: CARDINAL ← numberOfBytesForFileRep;
fileID: RTOSFile.FileID ← RTOSFile.nullID;
mIPBlock: BlockStream.Block ← BlockStream.nullBlock;
newSequenceType: BYTE ← Inline.BITOR[startBlock.blockPointer[index], 10H];
pixelOverheadSize: CARDINAL ← 0;
readIndex: LONG CARDINAL ← index + 1;
readBlock, writeBlock: BlockStream.Block ← startBlock;
sequenceLength, newLength: LongNumber ← [li[0]];
sequenceType: SequenceType ← VAL[startBlock.blockPointer[index] MOD 40B];
writeIndex: LONG CARDINAL ← index;

PutBlock: PROC [block: BlockStream.Block] = INLINE {
  outStream.transmit[outStream, block]};

GetBlock: PROC [] = INLINE {
  readBlock ← inStream.receive[
    inStream ! BlockStream.EOF = > {endOfStream ← TRUE; CONTINUE}];
  newBlock ← TRUE};

Read: PROC [dest: ByteSeq, size: CARDINAL] = {
  destIndex: CARDINAL ← 0;
  WHILE readIndex < readBlock.stopIndexPlusOne AND destIndex < size DO
    IF dest # NIL THEN dest[destIndex] ← readBlock.blockPointer[readIndex];
    destIndex ← destIndex + 1;
    readIndex ← readIndex + 1;
  ENDLOOP;
  IF readIndex = readBlock.stopIndexPlusOne THEN {
```

```
    writeBlock ← readBlock;
    GetBlock[];
    readIndex ← 0;
    WHILE destIndex < size DO
      IF dest # NIL THEN dest[destIndex] ← readBlock.blockPointer[readIndex];
      destIndex ← destIndex + 1;
      readIndex ← readIndex + 1;
      ENDLOOP};
   };
 Write: PROC [src: ByteSeq, size: CARDINAL] = {
    srcIndex: CARDINAL ← 0;
    WHILE writeIndex < writeBlock.stopIndexPlusOne AND srcIndex < size DO
      writeBlock.blockPointer[writeIndex] ← src[srcIndex];
      srcIndex ← srcIndex + 1;
      writeIndex ← writeIndex + 1;
      ENDLOOP;
    IF writeIndex = writeBlock.stopIndexPlusOne THEN {
      PutBlock[writeBlock];
      writeBlock ← readBlock;
      writeIndex ← 0;
      WHILE srcIndex < size DO
        writeBlock.blockPointer[writeIndex] ← src[srcIndex];
        srcIndex ← srcIndex + 1;
        writeIndex ← writeIndex + 1;
        ENDLOOP};
   };

GetLength: PROC [] RETURNS [len: LongNumber ← [li[0]]] = {
    tmpLen: LongNumber ← [li[0]];
    lenPtr: LONG POINTER ← @tmpLen;
    Read[lenPtr, numberOfBytesForSeqLength];
    len.hl ← tmpLen.lh;
    len.lh ← tmpLen.ll;
    len.ll ← tmpLen.hh};

GetPixelOverHead: PROC [sequenceType: SequenceType]
    RETURNS [pixelOverhead: RasterObjects.PixelOverhead] = {
    pixelOverheadPtr: LONG POINTER ← @pixelOverhead;
    pixelOverheadSize ←
     SELECT sequenceType FROM
      sequenceAdaptivePixelVector = > numberOfBytesForAdaptiveOverhead,
      sequenceCompressedPixelVector = >
 numberOfBytesForCompressedOverhead,
      sequencePackedPixelVector = > numberOfBytesForPackedOverhead,
      ENDCASE = > 0;
    Read[pixelOverheadPtr, pixelOverheadSize]};

PutTokenAndLength: PROC [newSequence: BYTE, len: LongNumber] = {
    word: ShortNumber ← [bytes[hi: newSequence, lo: 0]];
    newLength: LongNumber ← [bytes[lh: len.hl, ll: len.lh, hh: len.ll, hl: 0]];
    sequencePtr: LONG POINTER ← @word;
    lengthPtr: LONG POINTER ← @newLength;
    Write[sequencePtr, numberOfBytesForToken];
    Write[lengthPtr, numberOfBytesForSeqLength]};
```

```
PutFileID: PROC [fileID: RTOSFile.FileID] = {
 ptr: LONG POINTER ← @fileID;
 IF pixelOverheadSize < numberOfBytesForFileRep THEN
   Read[NIL, (dataAddedToMip - pixelOverheadSize)];
 Write[ptr, dataAddedToMip]};

NetLog.Log[[installPV[index]]];

sequenceLength ← GetLength[];

IF (sequenceLength.lc + readIndex) > blockSize THEN {
  pixelOverhead: RasterObjects.PixelOverhead ←
GetPixelOverHead[sequenceType];
   dataInBlock: CARDINAL = blockSize - readIndex;
   -- dataInBlock will be data excluding pixelOverHead
   numberOfPVBlocks: CARDINAL = CARDINAL[
     ((sequenceLength.li - pixelOverheadSize - dataInBlock) / blockSize)];
   dataTruncated: LONG CARDINAL = Inline.LongMult[numberOfPVBlocks,
blockSize];
   lastBlockGarbage: CARDINAL ← 0;
   dataAddedToMip: CARDINAL ← numberOfBytesForFileRep;

firstBlockGarbage: CARDINAL ← bytesPerPage - readIndex MOD bytesPerPage;

EventLogger.Log[581];
  installed ← TRUE;

start ←
   IF sequenceLength.lc < dataInBlock THEN CARDINAL[
    readIndex + (sequenceLength.lc - pixelOverheadSize)]
   ELSE CARDINAL[ -- IP Offset in last block
     sequenceLength.li - pixelOverheadSize - dataTruncated - dataInBlock];

lastBlockGarbage ← start MOD bytesPerPage;

newLength.li ← lastBlockGarbage + firstBlockGarbage + pixelOverheadSize;

IF (firstBlockGarbage + pixelOverheadSize) < dataAddedToMip THEN
    newLength.li ←
     newLength.li +
      ResMgrStorage.PagesFromBytes[
       (dataAddedToMip - (firstBlockGarbage + pixelOverheadSize))] *
       bytesPerPage;

PutTokenAndLength[newSequenceType, newLength];
  [pvHandle, fileID] ← Open[
   inStream, sequenceType, (sequenceLength.li - pixelOverheadSize),
   pixelOverhead, zone];

Copy[pvHandle, readBlock, readIndex, MIN[dataInBlock, sequenceLength.lc]];
  PutFileID[fileID];

mIPBlock.blockPointer ← readBlock.blockPointer;
```

```
mIPBlock.startIndex ← ((prevPVEnd / bytesPerPage) * bytesPerPage);
mIPBlock.stopIndexPlusOne ←
 ((writeIndex + bytesPerPage - 1) / bytesPerPage) * bytesPerPage;
PutBlock[mIPBlock];

Transfer[pvHandle, numberOfPVBlocks];
GetBlock[];
IF start > 0 THEN Copy[pvHandle, readBlock, 0, start];
Close[pvHandle];

IF readBlock.blockPointer[start] = SequenceContinuedSeq THEN {
  };
  EventLogger.Log[582];
  }
ELSE {
 skipTo: CARDINAL = (CARDINAL[sequenceLength.li] + readIndex);
 IF (readBlock # writeBlock) OR skipTo > = blockSize THEN {
   PutBlock[writeBlock]; GetBlock[]; };
 start ← skipTo MOD blockSize;
 };
RETURN[readBlock, start, endOfStream, installed, newBlock];
}};

Open: PROC [
 inStream: BlockStream.StreamHandle, seqType: SequenceType,
 seqLength: LONG CARDINAL, pixelOverhead: RasterObjects.PixelOverhead,
 zone: UNCOUNTED ZONE] RETURNS [handle: Handle, fileId: RTOSFile.FileID] = {
 fileSizeInDiskPages: ResMgrStorage.Pages ← 0;

NetLog.Log[[open[seqLength]]];
handle ← zone.NEW[HandleRep ← []];
handle.bccInfo.zone ← zone;
handle.inStream ← inStream;
handle.undefinedSeqData.pixelV0ThroughV3 ← pixelOverhead;
SELECT seqType FROM
 sequenceAdaptivePixelVector = > {
   handle.undefinedSeqData.pixelSequenceType ← adaptive;
   IF ~noBcc THEN IPDIFScannerPrivate.InitPBTTable[
     handle: handle,
     xPixels: handle.undefinedSeqData.pixelV0ThroughV3.nScanLines];
   };
 sequenceCompressedPixelVector = > {
   handle.undefinedSeqData.pixelSequenceType ← compressed;
   IF ~noBcc THEN IPDIFScannerPrivate.InitPBTTable[handle: handle, xPixels: 0];
   };
 sequencePackedPixelVector = > {
   handle.bccInfo.pbtID ← [captureIP, rasterDB];
   handle.undefinedSeqData.pixelSequenceType ← packed;
   };
 ENDCASE;
handle.undefinedSeqData.pixelLengthInWords ←
 ((seqLength + 1) / Environment.bytesPerWord);
fileSizeInDiskPages ←
 ResMgrStorage.PagesFromBytes[seqLength] + 2 + trailerPage + 20;
```

```
handle.undefinedSeqData.fileId ← RTOSFile.Create[
    fileType: ASWFileTypes.rasterJob, size: fileSizeInDiskPages,
    replicated: FALSE, contiguous: TRUE, « TRUE for now, not for
SequenceContinued case !!! »
    threshold: threshold2];
RETURN[handle, handle.undefinedSeqData.fileId];
};

Close: PROC [handle: Handle] = {
    zone: UNCOUNTED ZONE = handle.bccInfo.zone;
    fileOffsetInPages, fileSizeInDiskPages, physicalFileSizeInPages:
        ResMgrStorage.Pages ← 0;
    NetLog.Log[[close[]]];
    fileOffsetInPages ← ResMgrStorage.PagesFromWords[
        handle.undefinedSeqData.pixelLengthInWords +
        handle.undefinedSeqData.pixelEncodingOffset];
    SELECT handle.undefinedSeqData.pixelSequenceType FROM
        adaptive, compressed = > {
            IF~noBcc THEN {
            IF handle.bccInfo.pbtEntryInfo.is4WordTable THEN GenerateXYTable[handle];
            IPDlFScannerPrivate.StorePBT[handle: handle];
            IPDlFScannerPrivate.VerifyAndCachePBT[
                handle: handle, fileOffsetInPages: fileOffsetInPages];
            handle.undefinedSeqData.breakTableOffset ←
                (fileOffsetInPages * ResMgrStorage.wordsPerPage) -
                handle.undefinedSeqData.pixelEncodingOffset;
            fileSizeInDiskPages ←
                trailerPage + fileOffsetInPages + ResMgrStorage.PagesFromWords[
                handle.undefinedSeqData.breakTableLengthInWords];
                    IF handle.bccInfo.buffer0.blockPtr # NIL
            AND handle.bccInfo.bccStatus.EOI = FALSE THEN
                zone.FREE[@handle.bccInfo.buffer0.blockPtr];
                    RTOSFile.Truncate[
                fileID: handle.undefinedSeqData.fileId, size: fileSizeInDiskPages]; };
                    IF handle.xferId # ResMgr.nullTransferID THEN
                        ResMgr.WaitForCompletion[xferId: handle.xferId];
            IF handle.bccInfo.pbtEntryInfo.bccParamPtr # NIL THEN
                zone.FREE[@handle.bccInfo.pbtEntryInfo.bccParamPtr];

};
        packed = > {
            handle.undefinedSeqData.numberOfBreakTableEntries ← 0;
            handle.undefinedSeqData.breakTableLengthInWords ← 0;
            ResMgr.WaitForCompletion[xferId: handle.xferId];
        };
    ENDCASE = > ERROR;
    physicalFileSizeInPages ← RTOSFile.GetFileInfo[
        fileID: handle.undefinedSeqData.fileId, volumeName: NIL].size;
    StoreTrailerPage[handle: handle, fileOffset: (physicalFileSizeInPages - 1)];
    zone.FREE[@handle];
};

GenerateXYTable: PROC [handle: Handle] = {
-- at this point, tableIndex = entry number - 1
```

```
xyTablePtr: RTOSIGStructures.TiledImageXYTablePtr ←
  LOOPHOLE[(handle.bccInfo.pbtEntryInfo.tablePtr +
      ((handle.bccInfo.pbtEntryInfo.tableIndex + 1) * SIZE[
         RTOSIGStructures.TiledImageBreakEntry])),
   RTOSIGStructures.TiledImageXYTablePtr];
tablePtr: RTOSIGStructures.TiledImageBreakTablePtr ←
  LOOPHOLE[handle.bccInfo.pbtEntryInfo.tablePtr];
tempPtr: LONG POINTER TO XYTableRecord ←
  LOOPHOLE[(xyTablePtr +
      ((handle.bccInfo.pbtEntryInfo.tableIndex + 1) * SIZE[
         RTOSIGStructures.TiledImageXYEntry])), LONG POINTER];
nScanLines: CARDINAL ← tablePtr.seq[0].nScanLines;

NetLog.Log[[genXYTable[]]];
xyTablePtr.seq[0].xOffset ← 0;
xyTablePtr.seq[0].yOffset ← 0;
FOR i: CARDINAL IN [1..handle.bccInfo.pbtEntryInfo.tableIndex] DO
  -- firstTile is always at (0,0), yOffset is also always 0 in this case
  xyTablePtr.seq[i].xOffset ← nScanLines;
  xyTablePtr.seq[i].yOffset ← 0;
  nScanLines ← nScanLines + tablePtr.seq[i].nScanLines;
  ENDLOOP;
tempPtr.xyTableOffset ←
  (handle.bccInfo.pbtEntryInfo.tableIndex + 1) * SIZE[
    RTOSIGStructures.TiledImageBreakEntry];
tempPtr.xyTableLength ←
  (handle.bccInfo.pbtEntryInfo.tableIndex + 1) * SIZE[
    RTOSIGStructures.TiledImageXYEntry];
};

Copy: PROC [
  handle: Handle, block: BlockStream.Block, start, size: LONG CARDINAL] = {
  bufferList: ResMgrStorage.BufferList ← NIL;
{
ENABLE
  UNWIND = >
   IF bufferList # NIL THEN
     ResMgr.FreeBufferList[id: handle.clientId, buffer: bufferList];
transferSize: ResMgrStorage.Pages ← 0;
newBlock: BlockStream.Block ← [NIL, 0, 0];
nibblesPerByte: CARDINAL = 2;
tempBufferList: ResMgrStorage.BufferList ← NIL;
bufferList ← CopyData[handle: handle, block: block, start: start, size: size];
tempBufferList ← bufferList.next;

IF handle.undefinedSeqData.pixelSequenceType # packed THEN {
  IF handle.xferId = ResMgr.nullTransferID THEN {
   handle.bccInfo.buffer0.blockPtr ←
    LOOPHOLE[bufferList.base + handle.undefinedSeqData.pixelEncodingOffset];
   IF bufferList.allocateSize * ResMgrStorage.bytesPerPage < size THEN {
    handle.bccInfo.buffer0.blockSizeInNibbles ←
     (ResMgrStorage.wordsPerPage -
       handle.undefinedSeqData.pixelEncodingOffset) *
       Environment.bytesPerWord * nibblesPerByte;
```

```
IF handle.undefinedSeqData.oddByte THEN {
  handle.bccInfo.bccParameters.nibbleOffset ← nibblesPerByte;
  handle.bccInfo.pbtEntryInfo.nibbleCountSoFar ← nibblesPerByte;
  }
ELSE {
  handle.bccInfo.bccParameters.nibbleOffset ← 0;
  handle.bccInfo.pbtEntryInfo.nibbleCountSoFar ← 0;
  };
}
ELSE {
 handle.bccInfo.buffer0.blockSizeInNibbles ← size * nibblesPerByte;
 IF handle.undefinedSeqData.oddByte THEN {
   handle.bccInfo.buffer0.blockSizeInNibbles ←
     handle.bccInfo.buffer0.blockSizeInNibbles + nibblesPerByte;
   handle.bccInfo.bccParameters.nibbleOffset ← nibblesPerByte;
   handle.bccInfo.pbtEntryInfo.nibbleCountSoFar ← nibblesPerByte;
   }
 ELSE {
   handle.bccInfo.bccParameters.nibbleOffset ← 0;
   handle.bccInfo.pbtEntryInfo.nibbleCountSoFar ← 0;
   };
 };
handle.bccInfo.bccParameters.minPbkScanlines ← 16;
WITH vec: handle.undefinedSeqData.pixelV0ThroughV3 SELECT
handle.undefinedSeqData.pixelSequenceType FROM
  adaptive = >
    handle.bccInfo.bccParameters.scanlineNibbles ← vec.scanLength / 4;
  compressed = >
    handle.bccInfo.bccParameters.scanlineNibbles ← vec.scanLength / 4;
  ENDCASE = > ERROR;
}
ELSE
 IF handle.bccInfo.buffer0.blockPtr = NIL THEN {
  handle.bccInfo.buffer0.blockPtr ← LOOPHOLE[bufferList.base];
  handle.bccInfo.buffer0.blockSizeInNibbles ←
    MIN[size, bufferList.allocateSize * ResMgrStorage.bytesPerPage] *
    nibblesPerByte;
  }
 ELSE {
  handle.bccInfo.buffer1.blockPtr ← LOOPHOLE[bufferList.base];
  handle.bccInfo.buffer1.blockSizeInNibbles ←
    MIN[size, bufferList.allocateSize * ResMgrStorage.bytesPerPage] *
    nibblesPerByte;
  };

IMBcc.GatherPBTDataFromBcc[bccInfoPtr: @handle.bccInfo];

IF tempBufferList # NIL THEN {
 UNTIL tempBufferList = NIL DO
  IF handle.bccInfo.buffer0.blockPtr = NIL THEN {
   handle.bccInfo.buffer0.blockPtr ← LOOPHOLE[tempBufferList.base];
   handle.bccInfo.buffer0.blockSizeInNibbles ←
     tempBufferList.allocateSize * ResMgrStorage.bytesPerPage *
     nibblesPerByte;
```

```
      }
    ELSE {
      handle.bccInfo.buffer1.blockPtr ← LOOPHOLE[tempBufferList.base];
      handle.bccInfo.buffer1.blockSizeInNibbles ←
        tempBufferList.allocateSize * ResMgrStorage.bytesPerPage *
        nibblesPerByte;
      };
      tempBufferList ← tempBufferList.next;
      IMBcc.GatherPBTDataFromBcc[bccInfoPtr: @handle.bccInfo];
      ENDLOOP;
    };

};

IF bufferList # NIL THEN {
  transferSize ← bufferList.allocateSize;
  IF bufferList.next # NIL THEN
    transferSize ← transferSize + bufferList.next.allocateSize;
  };

IF handle.xferId = ResMgr.nullTransferID THEN
  handle.xferId ← ResMgr.WriteAsync[
    id: handle.clientId, freeWhenComplete: TRUE,
    fileID: handle.undefinedSeqData.fileId, fileOffset: 0,
    buffer: bufferList, transferSize: transferSize]
ELSE
  ResMgr.ChainedWrite[
    xferId: handle.xferId, id: handle.clientId, buffer: bufferList,
    transferSize: transferSize, freeWhenComplete: TRUE];
  bufferList ← NIL;
  };
};

CopyData: PROC [
  handle: Handle, block: BlockStream.Block, start, size: LONG CARDINAL]
  RETURNS [bufferList: ResMgrStorage.BufferList ← NIL] = {
  ENABLE
    UNWIND = >
      IF bufferList # NIL THEN
        ResMgr.FreeBufferList[id: handle.clientId, buffer: bufferList];

offset: CARDINAL ← 0;
  blockBufferList: ResMgrStorage.BufferList ← NIL;
  startPageOffsetInWords: LONG CARDINAL ←
    ResMgrStorage.PagesFromBytes[start] * ResMgrStorage.wordsPerPage;
  sizePageAlignedToStart: LONG CARDINAL ←
    size - (startPageOffsetInWords * Environment.bytesPerWord - start);

IF handle.xferId = ResMgr.nullTransferID THEN {
    offset ← start MOD ResMgrStorage.bytesPerPage;
    handle.undefinedSeqData.pixelEncodingOffset ←
      offset / Environment.bytesPerWord;
```

```
    IF offset MOD 2 # 0 THEN handle.undefinedSeqData.oddByte ← TRUE;
    };
IF offset # 0 THEN {
  bufferList ← ResMgr.Allocate[
    id: handle.clientId, Pages: 1, base: NIL, waitTillAvailable: TRUE];
  IF bufferList = NIL THEN Print3.SystemError;
  [] ← ByteBlt.ByteBlt[
    from: [
    blockPointer: LOOPHOLE[block.blockPointer], startIndex: CARDINAL[start],
    stopIndexPlusOne: CARDINAL[
    (startPageOffsetInWords * Environment.bytesPerWord)]],
    to: [
    blockPointer: LOOPHOLE[bufferList.base], startIndex: offset,
    stopIndexPlusOne: ResMgrStorage.bytesPerPage], overLap: move];
  bufferList.next ← NIL;

IF sizePageAlignedToStart / ResMgrStorage.bytesPerPage # 0 THEN {
    blockBufferList ← ResMgr.AllocateBufferDescriptor[];

IF blockBufferList = NIL THEN {
      ResMgr.FreeBufferList[handle.clientId, bufferList];
      Print3.SystemError;
      };

blockBufferList.base ← block.blockPointer + startPageOffsetInWords;

IF
      LOOPHOLE[blockBufferList.base, LONG CARDINAL] MOD
       ResMgrStorage.wordsPerPage # 0 THEN ERROR;
    blockBufferList.allocateSize ←
     sizePageAlignedToStart / ResMgrStorage.bytesPerPage;
    blockBufferList.next ← NIL;
    bufferList.next ← blockBufferList;
    };
  }
ELSE {
  IF sizePageAlignedToStart / ResMgrStorage.bytesPerPage # 0 THEN {
    bufferList ← ResMgr.AllocateBufferDescriptor[];
    IF bufferList = NIL THEN Print3.SystemError;
    bufferList.base ← block.blockPointer;
    IF LOOPHOLE[bufferList.base, LONG CARDINAL] MOD
ResMgrStorage.wordsPerPage
      # 0 THEN ERROR;
    bufferList.allocateSize ←
     sizePageAlignedToStart / ResMgrStorage.bytesPerPage;
    };

IF sizePageAlignedToStart MOD ResMgrStorage.bytesPerPage # 0 THEN {
    blockBufferList ← ResMgr.Allocate[
     id: handle.clientId, Pages: 1, base: NIL, waitTillAvailable: TRUE];
    IF blockBufferList = NIL THEN Print3.SystemError;
    [] ← ByteBlt.ByteBlt[
     from: [
```

```
    blockPointer: LOOPHOLE[block.blockPointer],
    startIndex: CARDINAL[
      (((start + size) / ResMgrStorage.bytesPerPage) *
        ResMgrStorage.bytesPerPage)],
    stopIndexPlusOne: CARDINAL[(start + size)]],
    to: [
    blockPointer: LOOPHOLE[blockBufferList.base], startIndex: 0,
      stopIndexPlusOne: ResMgrStorage.bytesPerPage], overLap: move];
    blockBufferList.next ← NIL;

IF bufferList = NIL THEN bufferList ← blockBufferList
    ELSE bufferList.next ← blockBufferList;
    }};

RETURN[bufferList];
  };

Transfer: PROC [handle: Handle, numberOfBlocks: CARDINAL] = {
  block: BlockStream.Block ← BlockStream.nullBlock;
  transferSizeInPages: ResMgrStorage.Pages ← 0;
  bufferList: ResMgrStorage.BufferList ← NIL;

GetBlock: PROC [] = INLINE {
    block ← handle.inStream.receive[
      sH: handle.inStream ! BlockStream.EOF = > Error[unexpectedEOF];
      Stream.TimeOut = > REJECT; -- handled upstream
      Stream.InvalidOperation = > Error[InvalidStreamOp]]};

UNTIL numberOfBlocks = 0 DO
    GetBlock[];
    -- Do not generate break table for packed sequences
    IF handle.undefinedSeqData.pixelSequenceType # packed THEN {
      IF handle.bccInfo.buffer0.blockPtr = NIL THEN {
        handle.bccInfo.buffer0.blockPtr ← LOOPHOLE[block.blockPointer];
        handle.bccInfo.buffer0.blockSizeInNibbles ← block.stopIndexPlusOne * 2;
      }
      ELSE {
        handle.bccInfo.buffer1.blockPtr ← LOOPHOLE[block.blockPointer];
        handle.bccInfo.buffer1.blockSizeInNibbles ← block.stopIndexPlusOne * 2;
      };
      IMBcc.GatherPBTDataFromBcc[bccInfoPtr: @handle.bccInfo];
    };

bufferList ← ResMgr.AllocateBufferDescriptor[];

transferSizeInPages ← ResMgrStorage.PagesFromBytes[block.stopIndexPlusOne];

IF bufferList # NIL THEN {
      bufferList.base ← block.blockPointer;
      bufferList.allocateSize ← transferSizeInPages;
      bufferList.next ← NIL;
    }
    ELSE ERROR;
```

```
ResMgr.ChainedWrite[
  xferId: handle.xferId, id: handle.clientId, buffer: bufferList,
  transferSize: transferSizeInPages, freeWhenComplete: TRUE];

numberOfBlocks ← numberOfBlocks - 1;
ENDLOOP;
};

StoreTrailerPage: PROC [handle: Handle, fileOffset: ResMgrStorage.Pages] = {
  tempPVBufferList: ResMgrStorage.BufferList ← ResMgr.Allocate[
    id: handle.bccInfo.pbtID, Pages: trailerPage, base: NIL,
    waitTillAvailable: TRUE];
  size: CARDINAL =
    SIZE[DIFPixelData.UndefinedSeqencePixelData] * Environment.bytesPerWord;
  IF tempPVBufferList = NIL THEN Print3.SystemError;
  [] ← ByteBlt.ByteBlt[
    from: [
    blockPointer: LOOPHOLE[@handle.undefinedSeqData], startIndex: 0,
    stopIndexPlusOne: size],
    to: [
    blockPointer: LOOPHOLE[tempPVBufferList.base], startIndex: 0,
    stopIndexPlusOne: size], overLap: move];
  ResMgr.WriteSync[
    id: handle.bccInfo.pbtID, freeWhenComplete: TRUE,
    fileID: handle.undefinedSeqData.fileId, fileOffset: fileOffset,
    buffer: tempPVBufferList, transferSize: trailerPage];
}; -- of StoreTrailerPage

END.
```

-- File: IPDlFScannerImplB.mesa - last edit:

DIRECTORY
 Bcc USING [PBTEntryInfo],
 IPDIFScannerPrivate USING [Handle],
 Print3 USING [SystemError],
 ResMgr USING [Allocate, ChainedWrite, nullTransferID, WaitForCompletion],
 ResMgrStorage USING [
  BufferDescriptor, BufferList, Pages, PagesFromWords],
 RMCache USING [BackFillSegment, «Error,» SegmentDescriptor],
 RTOSIGStructures USING [ImageBreakEntry, ImageBreakTablePtr,
  TiledImageBreakEntry, TiledImageXYEntry];

IPDIFScannerImplB: PROGRAM
 IMPORTS Print3, ResMgr, ResMgrStorage, RMCache
 EXPORTS IPDIFScannerPrivate =

BEGIN

-- TYPEs
Handle: TYPE = IPDIFScannerPrivate.Handle;
WordSeq: TYPE = RECORD [SEQUENCE COMPUTED CARDINAL OF WORD];

-- Procedures

InitPBTTable: PUBLIC PROC [handle: Handle, xPixels: CARDINAL] = {
 defaultXPixels: CARDINAL = 5280; -- only for 8 1/2 X 11 size
 defaultScansPerBreak: CARDINAL = 16;
 pbtTableSize: CARDINAL ← 0;

handle.bccInfo.pbtID ← [captureIP, rasterDB];
 IF xPixels = 0 THEN xPixels ← defaultXPixels;
 pbtTableSize ← CARDINAL[ResMgrStorage.PagesFromWords[
  (((xPixels + defaultScansPerBreak - 1) / defaultScansPerBreak) *
    SIZE[RTOSIGStructures.ImageBreakEntry])]];
 pbtTableSize ← pbtTableSize * 2; -- doubled size just to be sure
 handle.bccInfo.pbtBufferList ← ResMgr.Allocate[Pages: pbtTableSize,
  id: handle.bccInfo.pbtID, base: NIL, waitTillAvailable: TRUE];
 IF handle.bccInfo.pbtBufferList = NIL THEN Print3.SystemError;
 handle.bccInfo.pbtEntryInfo.tablePtr ← handle.bccInfo.pbtBufferList.base;
 };

StorePBT: PUBLIC PROC [handle: Handle] = {
 transferSizeInPages: ResMgrStorage.Pages ← 0;
 handle.undefinedSeqData.numberOfBreakTableEntries ← IF
handle.bccInfo.bccStatus.EOI
  THEN (CARDINAL[handle.bccInfo.pbtEntryInfo.tableIndex] + 1)
  ELSE CARDINAL[handle.bccInfo.pbtEntryInfo.tableIndex];
 handle.undefinedSeqData.breakTableLengthInWords ←
 IF ~handle.bccInfo.pbtEntryInfo.is4WordTable
  THEN CARDINAL[handle.undefinedSeqData.numberOfBreakTableEntries *
    SIZE[RTOSIGStructures.ImageBreakEntry]]
  ELSE CARDINAL[(handle.undefinedSeqData.numberOfBreakTableEntries *

```
            (SIZE[RTOSIGStructures.TiledImageBreakEntry] +
                SIZE[RTOSIGStructures.TiledImageXYEntry])) + 2]; --
xyTableOffSetAndLength
   transferSizeInPages ←

ResMgrStorage.PagesFromWords[handle.undefinedSeqData.breakTableLengthInW
ords];
   handle.undefinedSeqData.scansPerBreak ←
   CheckScansPerBreak[handle.bccInfo.pbtEntryInfo];
   ResMgr.ChainedWrite[xferId: handle.xferId, id: handle.bccInfo.pbtID,
     buffer: handle.bccInfo.pbtBufferList, transferSize: transferSizeInPages,
     freeWhenComplete: TRUE];
   ResMgr.WaitForCompletion[xferId: handle.xferId];
   handle.xferId ← ResMgr.nullTransferID;
   handle.bccInfo.pbtBufferList ← NIL;
   handle.bccInfo.pbtEntryInfo.tablePtr ← NIL;
   };

VerifyAndCachePBT: PUBLIC PROC [
   handle: Handle, fileOffsetInPages: ResMgrStorage.Pages] = {
   transferSizeInPages: CARDINAL ← CARDINAL[

ResMgrStorage.PagesFromWords[handle.undefinedSeqData.breakTableLengthInW
ords]];
   IF handle.undefinedSeqData.scansPerBreak = 0 THEN {
     cacheSegmentDescriptor: RMCache.SegmentDescriptor ← [
       backingFile: handle.undefinedSeqData.fileId, filePage: fileOffsetInPages,
       length: transferSizeInPages];
     RMCache.BackFillSegment[id: handle.clientId, segment:
cacheSegmentDescriptor,
       priority: [keepMostRecent[]]]};
   };

CheckScansPerBreak: PROCEDURE [pbtEntryInfo: Bcc.PBTEntryInfo]
     RETURNS [scansPerBreak: CARDINAL] = {
   tablePtr: RTOSIGStructures.ImageBreakTablePtr ←
LOOPHOLE[pbtEntryInfo.tablePtr];
   scansPerBreak ← tablePtr.seq[0].scanCount;
   FOR i: CARDINAL IN [1..pbtEntryInfo.tableIndex) DO
        IF tablePtr.seq[i].scanCount # scansPerBreak THEN
           RETURN [scansPerBreak: 0];
   ENDLOOP;
   RETURN [scansPerBreak];
   };

END...
```

```
-- File: NetLogImpl.mesa

DIRECTORY
  NetLog USING [Entry],
  Process USING [GetCurrent];

NetLogImpl: MONITOR
  IMPORTS Process
  EXPORTS NetLog =
  BEGIN

-- TYPES
  DatabaseObject: TYPE = ARRAY [0..0) OF Entry;
  Entry: TYPE = RECORD [
    event: NetLog.Entry ← [null[]],
    procID: PROCESS];

W: TYPE = RECORD[SEQUENCE COMPUTED CARDINAL OF WORD];

entriesAllocated: CARDINAL ← 0;
  entriesInUse: CARDINAL ← 0;
  logCalls: CARDINAL ← 0;
  logDB: LONG POINTER TO DatabaseObject ← NIL;
  next: CARDINAL ← 0;
  logOn: BOOLEAN ← TRUE;

CreateLog: PUBLIC PROCEDURE[zone: UNCOUNTED ZONE, nEntries: CARDINAL] =
    BEGIN
    IF logDB = NIL THEN {
      logDB ← LOOPHOLE[zone.NEW[W[SIZE[Entry]*nEntries]]];
      entriesAllocated ← nEntries;
      entriesInUse ← 0;
      logCalls ← 0;
      next ← 0};
    END;

DestroyEventLog: PUBLIC ENTRY PROCEDURE[zone: UNCOUNTED ZONE] =
    BEGIN
    IF logDB = NIL THEN RETURN;
    zone.FREE[@logDB];
    END;

Log: PUBLIC ENTRY PROC[entry: NetLog.Entry] =
    BEGIN
    ENABLE UNWIND = > NULL;
    IF (logDB = NIL) OR (NOT logOn) THEN RETURN;
    logDB[next] ← [entry, Process.GetCurrent[]];
    IF entriesInUse < entriesAllocated THEN entriesInUse ← SUCC[entriesInUse];
    next ← IF next = entriesAllocated-1 THEN 0 ELSE SUCC[next];
    logCalls ← SUCC[logCalls];
    END;

END...
```

-- File: MIPStreamMgrImpl.mesa - last edit:

DIRECTORY
 ASWFileTypes USING [interpress],
 BlockStream USING [
  AcquireBlockProcedure, Block, BufferPointer, DeleteProcedure, Object,
  ReceiveBlockProcedure, ReturnBlockProcedure, SetAbortProcedure,
  SetEOFProcedure, StreamHandle, TransmitBlockProcedure],
 DIFConstants USING [ResMgrID, MIPSegmentSize],
 Environment USING [bytesPerWord, bytesPerPage, wordsPerPage],
 JobID USING [ID],
 MIPStreamMgr,
 Process USING [Abort, EnableAborts],
 ResMgr USING [
  Allocate, AllocateBufferDescriptor, nullTransferID, FreeBufferDescriptor,
  FreeBufferList, TransferID, SwapBuffers],
 ResMgrIDs USING [ID],
 ResMgrStorage USING [BufferList, Pages, PagesFromBytes],
 RMCache USING [
  DeleteAllForFile, ForceOut, MakeStatic, SegmentDescriptor, SegmentPriority,
 SwapToCache],
 RTOSFile USING [Create, Delete, FileID, nullID, Truncate];

NewMIPStreamMgrImpl: MONITOR
 IMPORTS Process, ResMgr, ResMgrStorage, RMCache, RTOSFile EXPORTS
MIPStreamMgr =
 BEGIN OPEN MIPStreamMgr;

-- Constants
FileIDsPerSegment: CARDINAL ←
 (Environment.wordsPerPage / (SIZE[RTOSFile.FileID])) - 1;

-- Types

DirectoryEntry: TYPE = LONG POINTER TO DirectoryEntryRep ← NIL;
DirectoryEntryRep: TYPE = RECORD [
 next, prev: DirectoryEntry ← NIL, segment: DirectorySegment ← NIL];

DirectorySegment: TYPE = LONG POINTER TO DirectorySegmentRep ← NIL;
DirectorySegmentRep: TYPE = RECORD [
 fileID: SEQUENCE size: CARDINAL OF RTOSFile.FileID];

WriterInfo: TYPE = LONG POINTER TO WriterInfoRep ← NIL;
WriterInfoRep: TYPE = RECORD [
 state: StreamState ← init,
 streamStatusProc: StreamStatusProc ← NIL,
 statusOnBlockNumber: CARDINAL ← 0,
 currentSizeInPages: ResMgrStorage.Pages ← 0,
 dIndex: CARDINAL ← 0,
 fileID: RTOSFile.FileID ← RTOSFile.nullID,
 holdingBuffer: ResMgrStorage.BufferList ← NIL,

```
xferId: ResMgr.TransferID ← ResMgr.nullTransferID];

ReaderInfo: TYPE = LONG POINTER TO ReaderInfoRep ← NIL;
ReaderInfoRep: TYPE = RECORD [
  state: StreamState ← init,
  abortStream: BOOLEAN ← FALSE,
  statusProc: StatusProc ← NIL,
  streamHandle: BlockStream.StreamHandle ← NIL,
  fileAvailable: CONDITION,
  spooler: PROCESS,
  directorySize, dIndex: CARDINAL ← 0,
  directoryHead, directoryTail: DirectoryEntry ← NIL];

StreamState: TYPE = {init, read, write, closed};

StreamList: TYPE = LONG POINTER TO StreamListRep ← NIL;
StreamListRep: TYPE = RECORD [
  next, prev: StreamList ← NIL,
  fileHandle: RTOSFile.FileID ← RTOSFile.nullID,
  resMgrID: ResMgrIDs.ID ← DIFConstants.ResMgrID,
  writerInfo: WriterInfoRep,
  readerInfo: ReaderInfoRep,
  zone: UNCOUNTED ZONE ← NIL];

-- Globals
streamListHead: StreamList ← NIL;

-- Public Procs

CreateCacheOutputStream: PUBLIC PROC [
  streamStatusProc: StreamStatusProc, statusOnBlockNumber: CARDINAL ← 1,
  zone: UNCOUNTED ZONE] RETURNS [bsH: BlockStream.StreamHandle, fileId:
RTOSFile.FileID] = {
  nsH: StreamList ← zone.NEW[
    StreamListRep ← [
    writerInfo: [
    streamStatusProc: streamStatusProc,
    statusOnBlockNumber: statusOnBlockNumber], zone: zone]];
  bsH ← zone.NEW[
    BlockStream.Object ← [
    bufPtr: LOOPHOLE[nsH], delete: Delete, acquire: Acquire, receive: Receive,
    return: Return, transmit: Transmit, setAbort: SetAbort, setEOF: SetEOF,
    setTimeout: NIL]];
  nsH.fileHandle ← RTOSFile.Create[
    fileType: ASWFileTypes.interpress, size: 2, replicated: FALSE,
    contiguous: FALSE];
  AppendToStreamList[nsH];
  RETURN[bsH, nsH.fileHandle]};

CreateDiskOutputStream: PUBLIC PROC [
  streamStatusProc: StreamStatusProc, statusOnBlockNumber: CARDINAL ← 1,
  zone: UNCOUNTED ZONE] RETURNS [bsH: BlockStream.StreamHandle, fileId:
RTOSFile.FileID] = {
  bsH ← NIL; fileId ← RTOSFile.nullID};
```

```
OpenMIPInputStream: PUBLIC PROC [
  streamHandle: BlockStream.StreamHandle, fileID: RTOSFile.FileID,
  statusProc: StatusProc, zone: UNCOUNTED ZONE] = {
  streamList: StreamList ← OpenForRead[fileID];
  bsHBufPtr: LONG POINTER TO StreamList ← LOOPHOLE[@streamHandle.bufPtr];
  head, tail: DirectoryEntry ← NIL;
  size: CARDINAL ← 0;
  IF streamList = NIL THEN {
    [head, tail, size] ← DirectoryFromFileID[
      fileID, DIFConstants.ResMgrID, zone];
    streamList ← zone.NEW[
      StreamListRep ← [
      fileHandle: fileID,
      writerInfo: [state: closed],
      readerInfo: [
      state: read, directorySize: size, directoryHead: head,
      directoryTail: tail], zone: zone]];
    AppendToStreamList[streamList]};
  bsHBufPtr↑ ← streamList; -- Stores streamList in streamHandle.bufPtr
  streamList.readerInfo.statusProc ← statusProc;
  streamList.readerInfo.streamHandle ← streamHandle;
  Process.EnableAborts[@streamList.readerInfo.fileAvailable];
  streamList.readerInfo.spooler ← FORK SpoolToOutStream[streamList]};

CloseStream: PUBLIC PROC [streamHandle: BlockStream.StreamHandle] = {
  streamList: StreamList ← LOOPHOLE[streamHandle.bufPtr];
  JOIN streamList.readerInfo.spooler;
  streamList.readerInfo.state ← closed;
  DeleteFromStreamList[streamList]};

GetPrintIDStatus: PUBLIC PROC [clientID: JobID.ID] RETURNS [ok: BOOLEAN ←
TRUE] =
  {};

SetPrintIDStatus: PUBLIC PROC [clientID: JobID.ID, ok: BOOLEAN] = {};

--Internal Procs

AppendToStreamList: ENTRY PROC [streamListPtr: StreamList] = {
  ENABLE UNWIND = > NULL;
  IF streamListHead # NIL THEN streamListHead.prev ← streamListPtr;
  streamListPtr.next ← streamListHead;
  streamListHead ← streamListPtr};

DeleteFromStreamList: ENTRY PROC [streamListPtr: StreamList] = {
  ENABLE UNWIND = > NULL;
  zone: UNCOUNTED ZONE ← streamListPtr.zone;
  SELECT TRUE FROM
    streamListPtr.writerInfo.state = closed
      AND streamListPtr.readerInfo.state = closed = > {
        RMCache.DeleteAllForFile[id: streamListPtr.resMgrID, fileID:
streamListPtr.fileHandle];
      RTOSFile.Delete[streamListPtr.fileHandle]};
```

```
  streamListPtr.writerInfo.state = closed
    AND streamListPtr.readerInfo.state = init = > FlushDirectory[streamListPtr];
  ENDCASE = > RETURN;
  IF streamListPtr.prev # NIL THEN streamListPtr.prev.next ← streamListPtr.next
  ELSE streamListHead ← streamListPtr.next;
  IF streamListPtr.next # NIL THEN streamListPtr.next.prev ← streamListPtr.prev;
  zone.FREE[@streamListPtr]};

NewDirectoryEntry: PROC [id: ResMgrIDs.ID, zone: UNCOUNTED ZONE]
  RETURNS [newEntry: DirectoryEntry] = {
  buffer: ResMgrStorage.BufferList ← ResMgr.Allocate[id: id, Pages: 1];
  newSegment: DirectorySegment ← LOOPHOLE[buffer.base];
  LOOPHOLE[newSegment, LONG POINTER TO CARDINAL] ↑ ← (FileIDsPerSegment - 1);
  newEntry ← zone.NEW[DirectoryEntryRep ← [segment: newSegment]];
  ResMgr.FreeBufferDescriptor[buffer]};

AddToDirectory: INTERNAL PROC [streamListPtr: StreamList] = {
  ENABLE UNWIND = > NULL;
  readerInfo: ReaderInfo ← @streamListPtr.readerInfo;
  writerInfo: WriterInfo ← @streamListPtr.writerInfo;
  currentSegment: DirectorySegment ← NIL;
  z: UNCOUNTED ZONE ← streamListPtr.zone;
  IF readerInfo.directoryTail = NIL THEN {
    readerInfo.directoryHead ← readerInfo.directoryTail ←
NewDirectoryEntry[streamListPtr.resMgrID, z];
    writerInfo.dIndex ← 0};
  currentSegment ← readerInfo.directoryTail.segment;
  IF writerInfo.dIndex = currentSegment.size THEN {
    newEntry: DirectoryEntry ← NewDirectoryEntry[streamListPtr.resMgrID, z];
    readerInfo.directoryTail.next ← newEntry;
    newEntry.prev ← readerInfo.directoryTail;
    readerInfo.directoryTail ← newEntry;
    writerInfo.dIndex ← 0};
  currentSegment.fileID[writerInfo.dIndex] ← writerInfo.fileID;
  writerInfo.dIndex ← writerInfo.dIndex + 1;
  readerInfo.directorySize ← readerInfo.directorySize + 1;
  NOTIFY readerInfo.fileAvailable};

GetFromDirectory: ENTRY PROC [streamListPtr: StreamList]
  RETURNS [fileID: RTOSFile.FileID] = {
  ENABLE UNWIND = > NULL;
  readerInfo: ReaderInfo ← @streamListPtr.readerInfo;
  currentSegment: DirectorySegment ← NIL;
  WHILE readerInfo.directorySize = 0 DO WAIT readerInfo.fileAvailable; ENDLOOP;
  currentSegment ← readerInfo.directoryHead.segment;
  fileID ← currentSegment.fileID[readerInfo.dIndex];
  IF readerInfo.dIndex = (currentSegment.size - 1) THEN {
    z: UNCOUNTED ZONE ← streamListPtr.zone;
    bufferList: ResMgrStorage.BufferList ← ResMgr.AllocateBufferDescriptor[];
    currentEntry: DirectoryEntry ← readerInfo.directoryHead;
    readerInfo.directoryHead ← currentEntry.next;
    IF readerInfo.directoryHead # NIL THEN readerInfo.directoryHead.prev ← NIL
    ELSE readerInfo.directoryTail ← NIL;
```

```
IF currentEntry = NIL THEN ERROR;
z.FREE[@currentEntry];
bufferList.allocateSize ← 1;
bufferList.base ← LOOPHOLE[currentSegment];
ResMgr.FreeBufferList[id: streamListPtr.resMgrID, buffer: bufferList]};
readerInfo.directorySize ← readerInfo.directorySize - 1;
readerInfo.dIndex ← readerInfo.dIndex + 1};

CreateOutputSegment: PROC [
  resMgrID: ResMgrIDs.ID, bufferList: ResMgrStorage.BufferList,
transferSizeInPages: ResMgrStorage.Pages]
  RETURNS [fileID: RTOSFile.FileID, holdingBuffer: ResMgrStorage.BufferList] = {
  fileID ← RTOSFile.Create[
    fileType: ASWFileTypes.interpress, size: DIFConstants.MIPSegmentSize + 1,
    replicated: FALSE, contiguous: FALSE];
  holdingBuffer ← ResMgr.Allocate[id: resMgrID, Pages:
DIFConstants.MIPSegmentSize + 1];
  SwapAndFree[bufferList, (holdingBuffer.base + Environment.wordsPerPage),
resMgrID]};

FlushSegment: ENTRY PROC [nsH: StreamList, setEOF: BOOLEAN ← FALSE] = {
  ENABLE UNWIND = > NULL;
  IF nsH.writerInfo.state = write THEN {
  SetFileSize[nsH.writerInfo.holdingBuffer, nsH.writerInfo.currentSizeInPages];
  CacheIt[
    bufferList: nsH.writerInfo.holdingBuffer, forceOut: ifNecessary,
        id: nsH.resMgrID, fileID: nsH.writerInfo.fileID, fileOffset: 0,
        length: nsH.writerInfo.holdingBuffer.allocateSize];
  AddToDirectory[nsH];
  nsH.writerInfo.fileID ← RTOSFile.nullID};
  IF setEOF THEN nsH.writerInfo.state ← closed};

OpenForRead: ENTRY PROC [fileID: RTOSFile.FileID]
  RETURNS [streamList: StreamList] = {
  ENABLE UNWIND = > NULL;
  streamList ← streamListHead;
  WHILE streamList # NIL AND streamList.fileHandle # fileID DO
    streamList ← streamList.next; ENDLOOP;
  IF streamList # NIL THEN streamList.readerInfo.state ← read};

FlushDirectory: PROC [streamList: StreamList] = {
  directoryEntry: DirectoryEntry ← streamList.readerInfo.directoryHead;
  lastEntrySize: CARDINAL =
    streamList.readerInfo.directorySize MOD FileIDsPerSegment;
  directorySizeInPages: ResMgrStorage.Pages =
    (streamList.readerInfo.directorySize + FileIDsPerSegment - 1) /
FileIDsPerSegment;
  directoryHoldingBuffer: ResMgrStorage.BufferList ← ResMgr.Allocate[
    id: streamList.resMgrID, Pages: (directorySizeInPages + 1)];
  destPtr: LONG POINTER ← directoryHoldingBuffer.base +
Environment.wordsPerPage;
    ptr: LONG POINTER ← NIL;
    LOOPHOLE[streamList.readerInfo.directoryTail.segment, LONG POINTER TO
CARDINAL] ↑
```

```
    ← lastEntrySize; -- Last entry needs to be updated.
  SetFileSize[directoryHoldingBuffer, directorySizeInPages];
  WHILE directoryEntry # NIL DO
    bufferList: ResMgrStorage.BufferList ← ResMgr.AllocateBufferDescriptor[];
    bufferList.allocateSize ← 1;
    bufferList.base ← LOOPHOLE[directoryEntry.segment];
    SwapAndFree[bufferList, destPtr, streamList.resMgrID];
    ptr ← directoryEntry;
    directoryEntry ← directoryEntry.next;
    streamList.zone.FREE[@ptr];
    destPtr ← destPtr + Environment.wordsPerPage;
    ENDLOOP;
  CacheIt[
    bufferList: directoryHoldingBuffer, forceOut: writeSync,
    id: streamList.resMgrID, fileID: streamList.fileHandle, fileOffset: 0,
    length: (directorySizeInPages + 1)]};

DirectoryFromFileID: PROC [
  fileID: RTOSFile.FileID, id: ResMgrIDs.ID, zone: UNCOUNTED ZONE]
  RETURNS [
    directoryHead, directoryTail: DirectoryEntry ← NIL, size: CARDINAL ← 0] = {
  directorySizeInPages: ResMgrStorage.Pages;
  bufferList: ResMgrStorage.BufferList ← ResMgr.AllocateBufferDescriptor[];
  directorySizeInPages ← GetFileSize[id, fileID];
  bufferList.allocateSize ← 1;
  bufferList.next ← NIL;
  FOR i: ResMgrStorage.Pages IN [1..directorySizeInPages] DO
    segment: RMCache.SegmentDescriptor ← [fileID, i, 1];
    newEntry: DirectoryEntry ← NewDirectoryEntry[id, zone];
    bufferList.base ← LOOPHOLE[newEntry.segment];
    RMCache.MakeStatic[id: id, segment: segment, buffer: bufferList];
    newEntry.prev ← directoryTail;
    IF directoryHead = NIL THEN directoryHead ← directoryTail ← newEntry
    ELSE {directoryTail.next ← newEntry; directoryTail ← directoryTail.next};
    size ← size + newEntry.segment.size;
    ENDLOOP;
  ResMgr.FreeBufferDescriptor[bufferList]};

SetFileSize: PROC [
  bufferList: ResMgrStorage.BufferList, fileSize: ResMgrStorage.Pages] = {
  LOOPHOLE[bufferList.base, LONG POINTER TO ResMgrStorage.Pages] ↑ ←
fileSize};

GetFileSize: PROC [id: ResMgrIDs.ID, fileID: RTOSFile.FileID]
  RETURNS [sizeInPages: ResMgrStorage.Pages] = {
  buffer: ResMgrStorage.BufferList ← ResMgr.Allocate[id: id, Pages: 1];
  segment: RMCache.SegmentDescriptor ← [fileID, 0, 1];
  RMCache.MakeStatic[id: id, segment: segment, buffer: buffer];
  sizeInPages ← LOOPHOLE[buffer.base, LONG POINTER TO
ResMgrStorage.Pages] ↑ ;
  ResMgr.FreeBufferList[id: id, buffer: buffer]};

EndOfStream: ENTRY PROC [streamList: StreamList] RETURNS [BOOLEAN] = {
  ENABLE UNWIND = > NULL;
```

```
IF streamList.readerInfo.abortStream THEN ERROR ABORTED;
RETURN[
  streamList.writerInfo.state = closed
  AND streamList.readerInfo.directorySize = 0]};

SpoolToOutStream: PROC [streamList: StreamList] = {
  bufferList: ResMgrStorage.BufferList ← ResMgr.AllocateBufferDescriptor[];
  outStream: BlockStream.StreamHandle ← streamList.readerInfo.streamHandle;
  BEGIN ENABLE ABORTED = > CONTINUE;
    block: BlockStream.Block;
    pagesLeftInBlock: ResMgrStorage.Pages ← 0;
    zone: UNCOUNTED ZONE ← streamList.zone;
    WHILE NOT EndOfStream[streamList] DO
        fileID: RTOSFile.FileID ← GetFromDirectory[streamList];
        pagesLeftInFile: ResMgrStorage.Pages ← GetFileSize[streamList.resMgrID,
fileID];
        fileOffset: ResMgrStorage.Pages ← 1; -- Start at one since file size is at
page 0
        transferSize: ResMgrStorage.Pages ← 0;
        WHILE pagesLeftInFile > 0 DO
          segment: RMCache.SegmentDescriptor;
          IF pagesLeftInBlock = 0 THEN {
            block ← outStream.acquire[outStream, LAST[LONG CARDINAL]];
            pagesLeftInBlock ←
ResMgrStorage.PagesFromBytes[block.stopIndexPlusOne];
            block.stopIndexPlusOne ← 0};
          transferSize ← MIN[pagesLeftInFile, pagesLeftInBlock];
          bufferList.base ← block.blockPointer + (block.stopIndexPlusOne /
Environment.bytesPerWord);
          bufferList.allocateSize ← transferSize;
          segment.backingFile ← fileID;
          segment.filePage ← fileOffset;
          segment.length ← transferSize;
          RMCache.MakeStatic[id: streamList.resMgrID, segment: segment, buffer:
bufferList];
          block.stopIndexPlusOne ← block.stopIndexPlusOne + (transferSize *
Environment.bytesPerPage);
          pagesLeftInBlock ← pagesLeftInBlock - transferSize;
          IF pagesLeftInBlock = 0 THEN outStream.transmit[outStream, block];
          pagesLeftInFile ← pagesLeftInFile - transferSize;
          fileOffset ← fileOffset + transferSize;
          ENDLOOP;
        RMCache.DeleteAllForFile[id: streamList.resMgrID, fileID: fileID];
        RTOSFile.Delete[fileID];
        ENDLOOP;
    IF pagesLeftInBlock # 0 THEN outStream.transmit[outStream, block];
  END;
  outStream.setEOF[outStream];
  ResMgr.FreeBufferDescriptor[bufferList]};

SwapAndFree: PROC [sourceBuffer: ResMgrStorage.BufferList, destintationPtr:
LONG POINTER, id: ResMgrIDs.ID] = {
  destintationBuffer: ResMgrStorage.BufferList ←
ResMgr.AllocateBufferDescriptor[];
```

```
    destintationBuffer.base ← destintationPtr;
    destintationBuffer.allocateSize ← sourceBuffer.allocateSize;
    ResMgr.SwapBuffers[id: id, id1: id, buffer0: sourceBuffer, buffer1:
destintationBuffer];
    ResMgr.FreeBufferList[id: id, buffer: sourceBuffer];
    ResMgr.FreeBufferDescriptor[destintationBuffer]};

CacheIt: PROC [
    bufferList: ResMgrStorage.BufferList, forceOut: RMCache.ForceOut,
    id: ResMgrIDs.ID, fileID: RTOSFile.FileID, fileOffset, length: ResMgrStorage.Pages]
= {
    segment: RMCache.SegmentDescriptor ← [fileID, fileOffset, length];
    priority: RMCache.SegmentPriority ← [keepLeastRecent[]];
    RMCache.MakeStatic[id: id, segment: segment, buffer: bufferList, dontRead:
TRUE];
    RMCache.SwapToCache[id: id, segment: segment, priority: priority,
        forceOut: forceOut, staticBuffer: bufferList];
    ResMgr.FreeBufferList[id: id, buffer: bufferList]};

Transmit: BlockStream.TransmitBlockProcedure = {
    nsH: StreamList ← LOOPHOLE[sH.bufPtr];
    bufferList: ResMgrStorage.BufferList ← ResMgr.AllocateBufferDescriptor[];
    blockPtr: LONG POINTER ← block.blockPointer;
    transferSizeInPages: ResMgrStorage.Pages ← ResMgrStorage.PagesFromBytes[
      block.stopIndexPlusOne - block.startIndex];

bufferList.base ← blockPtr + block.startIndex / Environment.bytesPerWord;
    bufferList.allocateSize ← transferSizeInPages;
    bufferList.next ← NIL;

SELECT TRUE FROM
      nsH.writerInfo.state = init = > {
        [nsH.writerInfo.fileID, nsH.writerInfo.holdingBuffer] ← CreateOutputSegment[
          nsH.resMgrID, bufferList, transferSizeInPages];
        nsH.writerInfo.state ← write};

nsH.writerInfo.currentSizeInPages + transferSizeInPages >
      DIFConstants.MIPSegmentSize = > {
            pagesLeftInBlock: ResMgrStorage.Pages =
              DIFConstants.MIPSegmentSize - nsH.writerInfo.currentSizeInPages;
            pagesInNewBlock: ResMgrStorage.Pages = transferSizeInPages -
pagesLeftInBlock;
            nextBase: LONG POINTER = bufferList.base + (pagesLeftInBlock *
Environment.wordsPerPage);
            IF pagesLeftInBlock > 0 THEN { -- Spans across holding buffer; split up
accordingly
                destPtr: LONG POINTER ← nsH.writerInfo.holdingBuffer.base +
                  ((nsH.writerInfo.currentSizeInPages + 1) * Environment.wordsPerPage);
                bufferList.allocateSize ← pagesLeftInBlock;
                SwapAndFree[bufferList, destPtr, nsH.resMgrID];
                bufferList ← ResMgr.AllocateBufferDescriptor[];};
        FlushSegment[nsH]; -- This may be forked if proves to be bottleneck
        nsH.writerInfo.currentSizeInPages ← 0;
```

```
            bufferList.base ← nextBase;
            bufferList.allocateSize ← pagesInNewBlock;
        [nsH.writerInfo.fileID, nsH.writerInfo.holdingBuffer] ← CreateOutputSegment[
            nsH.resMgrID, bufferList, pagesInNewBlock];
        };

ENDCASE => {
        destPtr: LONG POINTER ← nsH.writerInfo.holdingBuffer.base +
            ((nsH.writerInfo.currentSizeInPages + 1) * Environment.wordsPerPage);
        SwapAndFree[bufferList, destPtr, nsH.resMgrID];
        };

nsH.writerInfo.currentSizeInPages ←
        nsH.writerInfo.currentSizeInPages + transferSizeInPages;

IF nsH.writerInfo.statusOnBlockNumber # 0 THEN {
        nsH.writerInfo.statusOnBlockNumber ← nsH.writerInfo.statusOnBlockNumber -
1;
        IF nsH.writerInfo.statusOnBlockNumber = 0 THEN
            nsH.writerInfo.streamStatusProc[sH, nthBlockTransmitted];
        };
    };

SetEOF: BlockStream.SetEOFProcedure = {
    nsH: StreamList ← LOOPHOLE[sH.bufPtr];
    FlushSegment[nsH, TRUE]};

SetAbort: ENTRY BlockStream.SetAbortProcedure = {
    nsH: StreamList ← LOOPHOLE[sH.bufPtr];
    IF nsH.readerInfo.state = read THEN {
        nsH.readerInfo.abortStream ← TRUE;
        Process.Abort[nsH.readerInfo.spooler]};
    };

Delete: BlockStream.DeleteProcedure = {
    nsH: StreamList ← LOOPHOLE[sH.bufPtr];
    zone: UNCOUNTED ZONE ← nsH.zone;
    DeleteFromStreamList[nsH];
    zone.FREE[@sH]};

Acquire: BlockStream.AcquireBlockProcedure = {ERROR};
Receive: BlockStream.ReceiveBlockProcedure = {ERROR};
Return: BlockStream.ReturnBlockProcedure = {ERROR};

END...
```

-- File: Print3SchedImplA.mesa - last edit:

DIRECTORY
 BlockStream USING [StreamHandle],
 Courier USING [Error],
 DBError USING [OperationFailed],
 FENetServ USING [
  FirstBlockComplete, JobParms, JobParmsPtr, PreParseStepParms, Print],
 IPDIF USING [Command, FilterStream, Status, StatusProc],
 IPDIFScanner USING [Error],
 JobBackUp USING [LockID, nullLockID],
 JobID USING [ID, nullID],
 JobStep USING [Error, GetRootStep, RootStep, Status, StatusPut],
 JobQ USING [BackUpJob, DereferenceJob, Error, LockJob, ReferenceJob, UnlockJob],
 MIPStreamMgr USING [CreateCacheOutputStream, StreamStatusProc],
 NetLog USING [CreateLog],
 NetStream USING [CreateStream, CreateDiskStream],
 NetworkLog USING [LogNetJob],
 Print3,
 Print3Sched,
 Print3SchedInternal USING [
  AddInstance, FindInstanceByStream, FindInstanceByJob, PrintJobHandle,
  PrintJobObject, PrintStateHandle, PrintStateObject, RemoveInstance, State],
 Print3Spool,
 Print3Status USING [
  CheckServiceEnabled, CloseConnection, heap, OpenConnection, pagesInBuffer],
 Print3Stream USING [RegisterFile],
 Print3Utils USING [GetJobParms, DumpInstructions],
 PublicPrinting USING [InternalMedium, nullMedium],
 RTOSFile USING [Error, FileID, nullID],
 ResMgrStorage USING [Pages],
 Runtime USING [CallDebugger],
 ServNetServ USING [netServStep],
 SMNetServSSC,
 Stream USING [Handle, TimeOut],
 String,
 System USING [switches],
 Time USING [Current, defaultTime],
 XStream USING [BUG];

Print3SchedImplA: MONITOR LOCKS sH USING sH:
Print3SchedInternal.PrintStateHandle
 IMPORTS
  Courier, DBError, IPDIF, IPDIFScanner, FENetServ, JobStep, JobQ, MIPStreamMgr,
  NetLog, NetStream, NetworkLog, Print3, Print3SchedInternal, Print3Spool,
  Print3Status, Print3Stream, Print3Utils, RTOSFile, Runtime, String, Stream,
  System, Time, XStream
 EXPORTS Print3Sched, SMNetServSSC =

BEGIN

-- globals
bypassName: LONG STRING ← "saveip enabled";

```
debug: BOOLEAN ← FALSE;
callDebug: BOOLEAN ← TRUE;

--Public Procs

Abort: PUBLIC PROCEDURE [jobID: JobID.ID] =
BEGIN
pH: Print3SchedInternal.PrintJobHandle ←
  Print3SchedInternal.FindInstanceByJob[jobID: jobID];
IF (pH # NIL) THEN AbortInternal[sH: pH.sH] ELSE ERROR;  < <SIGNAL invalid
JobID>>
  pH.inStream.setAbort[pH.inStream];
  pH.outStream.setAbort[pH.outStream];
END;

AbortAll: PUBLIC PROCEDURE [] = {};

ClearFault: PUBLIC PROCEDURE [bucket: CARDINAL] = {};

PrintJob: PUBLIC PROCEDURE [
  master: Stream.Handle, printAttributes: Print3.PrintAttributes,
  printOptions: Print3.PrintOptions]
  RETURNS [printRequestID: Print3.RequestID] =
BEGIN -- locals intMediaArray: ARRAY [0..1) OF PublicPrinting.InternalMedium;
jobParmsPtr: FENetServ.JobParmsPtr ← NIL;
lockID: JobBackUp.LockID ← JobBackUp.nullLockID;
pH: Print3SchedInternal.PrintJobHandle ← NIL;
preParseParms: FENetServ.PreParseStepParms;
timeOut: BOOLEAN ← FALSE;
zone: UNCOUNTED ZONE ← Print3Status.heap;

intMediaArray[0] ← PublicPrinting.nullMedium;
Print3Status.CheckServiceEnabled[];

Print3Status.OpenConnection[];
jobParmsPtr ← zone.NEW[FENetServ.JobParms];

jobParmsPtr^ ← [
  access: [[all[]], [all[]]], accountNum: NIL, copyCount: 1,
  createDate: Time.defaultTime, finishing: sampleTray, jobName: "Job"L,
  media: DESCRIPTOR[intMediaArray], message: NIL, owner: NIL,
  priority: medium, recipientName: NIL, senderName: NIL, sigJob: FALSE];

preParseParms ← [
  defaulted: [
  TRUE, TRUE, TRUE, TRUE, TRUE, TRUE, TRUE, TRUE, TRUE, TRUE, TRUE],
  media: DESCRIPTOR[intMediaArray], plex: simplex,
  pagesToPrint: [range[[1, LAST[CARDINAL]]]]];
```

```
Print3Utils.GetJobParms[
  printAttributes, printOptions, jobParmsPtr, preParseParms];

printRequestID.jobID ← FENetServ.Print[jobParms: jobParmsPtr];

IF printRequestID.jobID = JobID.nullID THEN ERROR Print3.SpoolingQueueFull;

pH ← zone.NEW[Print3SchedInternal.PrintJobObject ← [next: NIL]];
pH.sH ← zone.NEW[Print3SchedInternal.PrintStateObject ← []];
Print3SchedInternal.AddInstance[pH];

pH.jobID ← printRequestID.jobID;
pH.preParseStepParms ← @preParseParms;

NetLog.CreateLog[zone: zone, nEntries: 120];

[pH.outStream, pH.preParseStepParms^.ipFileID] ←
  MIPStreamMgr.CreateCacheOutputStream[
  streamStatusProc: StreamStatusProc, zone: zone];

SELECT TRUE FROM
  System.switches['n] = down
    AND String.Compare[
    s1: jobParmsPtr^.owner, s2: bypassName, ignoreCase: TRUE] = 0 = >
    pH.inStream ← Spool[
    registerFiles: TRUE, printAttributes: printAttributes,
    printOptions: printOptions, jobParmsPtr: jobParmsPtr, master: master,
    zone: zone];

debug = >
    pH.inStream ← Spool[
    registerFiles: FALSE, printAttributes: printAttributes,
    printOptions: printOptions, jobParmsPtr: jobParmsPtr, master: master,
    zone: zone];

ENDCASE = >
    pH.inStream ← NetStream.CreateStream[
    blockSize: Print3Status.pagesInBuffer, source: master, zone: zone];

SetState[sH: pH.sH, state: running];

pH.jobReference ← JobQ.ReferenceJob[
  pH.jobID ! JobQ.Error, DBError.OperationFailed = > Print3.SystemError; ];

lockID ← JobQ.LockJob[
  job: pH.jobReference, jobID: pH.jobID, readOnly: FALSE !
  JobQ.Error, DBError.OperationFailed = > {
  JobQ.DereferenceJob[job: pH.jobReference]; Print3.SystemError}];

pH.rootStep ← JobStep.GetRootStep[
  lockID: lockID, stepType: ServNetServ.netServStep, transaction: captureIP !
  JobStep.Error, DBError.OperationFailed = > {
```

```
    JobQ.UnlockJob[lockID: lockID];
    JobQ.DereferenceJob[job: pH.jobReference];
    Print3.SystemError}];

JobStep.StatusPut[
 lockID, running, pH.rootStep.stepHandle !
 JobStep.Error, DBError.OperationFailed = > {
    JobQ.UnlockJob[lockID: lockID];
    JobQ.DereferenceJob[job: pH.jobReference];
    Print3.SystemError}];

JobQ.BackUpJob[lockID: lockID];
JobQ.UnlockJob[lockID: lockID];

IF pH.sH.state # aborting THEN {
 IPDIF.FilterStream[
   handle: LOOPHOLE[pH], inStream: pH.inStream, outStream: pH.outStream,
   statusProc: DIFStatusProc !
   ABORTED, Stream.TimeOut, Courier.Error, XStream.BUG = > {
     CleanUp[pH, jobParmsPtr, faulted, zone]; REJECT};
   IPDIFScanner.Error = > {
     CleanUp[pH, jobParmsPtr, faulted, zone]; Print3.SystemError};
   RTOSFile.Error = >
     SELECT errorType FROM
       insufficientContiguousSpace, noSpace = > {
         CleanUp[pH, jobParmsPtr, faulted, zone];
         Print3.InsufficientSpoolSpace};
       ENDCASE = > {
         CleanUp[pH, jobParmsPtr, faulted, zone]; Print3.SystemError};
     UNWIND = > {NULL}; ANY = > IF callDebug THEN
Runtime.CallDebugger["bug"L]];

CleanUp[pH, jobParmsPtr, done, zone];

NetworkLog.LogNetJob[
    netLogRecord: [
    jobID: printRequestID.jobID, objectName: jobParmsPtr^.jobName,
    senderName: jobParmsPtr^.senderName, version: 1,
    submissionTime: Time.Current[], destination: printQueue,
    messageStatus: noMessage, jobStatus: received]]}
   ELSE CleanUp[pH, jobParmsPtr, faulted, zone];

END; << PrintJob >>

--Internal procs

CleanUp: PROC [
  pH: Print3SchedInternal.PrintJobHandle, jobParmsPtr: FENetServ.JobParmsPtr,
  status: JobStep.Status, zone: UNCOUNTED ZONE] = { lockID: JobBackUp.LockID ← JobQ.LockJob[
   job: pH.jobReference, jobID: pH.jobID, readOnly: FALSE !
   JobQ.Error, DBError.OperationFailed = > {
    JobQ.DereferenceJob[job: pH.jobReference]; Print3.SystemError}];
```

```
JobStep.StatusPut[
 lockID, status, pH.rootStep.stepHandle !
 JobStep.Error, DBError.OperationFailed = > {
   JobQ.UnlockJob[lockID: lockID];
   JobQ.DereferenceJob[job: pH.jobReference];
   Print3.SystemError}];
JobQ.BackUpJob[lockID: lockID];
JobQ.UnlockJob[lockID: lockID];
JobQ.DereferenceJob[job: pH.jobReference];

pH.outStream.delete[pH.outStream];
pH.inStream.delete[pH.inStream];

Print3Status.CloseConnection[error: FALSE];
Print3SchedInternal.RemoveInstance[pH: pH];
zone.FREE[@pH.sH];
zone.FREE[@pH];
zone.FREE[@jobParmsPtr]};

Spool: PROC [
 registerFiles: BOOLEAN, printAttributes: Print3.PrintAttributes,
 printOptions: Print3.PrintOptions, jobParmsPtr: FENetServ.JobParmsPtr,
 master: Stream.Handle, zone: UNCOUNTED ZONE]
 RETURNS [bsH: BlockStream.StreamHandle ← NIL] =

BEGIN
file: RTOSFile.FileID ← RTOSFile.nullID;
fileSize: ResMgrStorage.Pages ← 0;
version: CARDINAL ← 1;
inStream: BlockStream.StreamHandle ← NIL;
protocolFile: RTOSFile.FileID ← RTOSFile.nullID;

IF registerFiles THEN {
 protocolFile ← Print3Utils.DumpInstructions[printAttributes, printOptions];
 [version] ← Print3Stream.RegisterFile[
   fileName: jobParmsPtr^.jobName, fileID: protocolFile,
   postfix: [".ii"L, 0, 3], fileNumber: version, forceNumber: TRUE,
   ipCaptureMode: TRUE]};
inStream ← NetStream.CreateStream[
 blockSize: Print3Status.pagesInBuffer, source: master, zone: zone];
[file, fileSize] ← Print3Spool.SpoolToDisk[
 inStream: inStream, ipCaptureMode: registerFiles];
IF registerFiles THEN
 [version] ← Print3Stream.RegisterFile[
   fileName: jobParmsPtr^.jobName, fileID: protocolFile,
   postfix: [".ii"L, 0, 3], fileNumber: version, forceNumber: TRUE,
   ipCaptureMode: registerFiles];
bsH ← NetStream.CreateDiskStream[
 blockSize: Print3Status.pagesInBuffer, source: file, sourceSize: fileSize,
 zone: zone];
END;
```

```
DIFStatusProc: IPDIF.StatusProc =
BEGIN
pH: Print3SchedInternal.PrintJobHandle ← LOOPHOLE[handle];
RETURN[DIFStatusProcInternal[sH: pH.sH, status: status]];
END;

StreamStatusProc: MIPStreamMgr.StreamStatusProc =
BEGIN
lockID: JobBackUp.LockID ← JobBackUp.nullLockID;

pH: Print3SchedInternal.PrintJobHandle ←
  Print3SchedInternal.FindInstanceByStream[bsH];
IF streamStatus = nthBlockTransmitted AND pH.sH.state = running THEN
  FENetServ.FirstBlockComplete[
    preParseStepParms: pH.preParseStepParms^, jobID: pH.jobID]
ELSE ERROR;
END;

AbortInternal: ENTRY PROCEDURE [sH: Print3SchedInternal.PrintStateHandle] = {
ENABLE UNWIND = > NULL;
IF sH.state = aborting THEN ERROR;
sH.state ← aborting;
};

DIFStatusProcInternal: ENTRY PROC [
sH: Print3SchedInternal.PrintStateHandle, status: IPDIF.Status]
RETURNS [command: IPDIF.Command] =
BEGIN
ENABLE UNWIND = > NULL;
SELECT sH.state FROM
  aborting = > command ← abort;

completing = >
   SELECT status FROM
    ok = > command ← continue;
    done = > {command ← continue; sH.state ← completing};
    error = > {command ← abort; sH.state ← aborting}
    ENDCASE;

idle = > command ← abort;

running = >
   SELECT status FROM
    ok = > command ← continue;
    done = > {command ← continue; sH.state ← completing};
    error = > {command ← abort; sH.state ← aborting}
    ENDCASE
  ENDCASE;
RETURN[command];
END;

SetState: ENTRY PROCEDURE [
sH: Print3SchedInternal.PrintStateHandle, state: Print3SchedInternal.State] =
```

{ENABLE UNWIND => NULL; sH.state ← state};
END.

```
-- File: Print3SchedImplB.mesa - Last edit:

DIRECTORY
 BlockStream USING [StreamHandle],
 JobID USING [ID],
 Print3SchedInternal;

Print3SchedImplB: MONITOR
 EXPORTS Print3SchedInternal =

BEGIN instanceHead: Print3SchedInternal.PrintJobHandle ← NIL;

AddInstance: PUBLIC ENTRY PROCEDURE[pH: Print3SchedInternal.PrintJobHandle]
=
  {ENABLE UNWIND = > NULL;
   listHead: Print3SchedInternal.PrintJobHandle ← instanceHead;
   IF listHead = NIL THEN instanceHead ← pH
   ELSE {
    WHILE listHead.next # NIL DO listHead ← listHead.next ENDLOOP;
    listHead.next ← pH}};

FindInstanceByStream: PUBLIC ENTRY PROCEDURE[bsH:
BlockStream.StreamHandle]
   RETURNS[pH: Print3SchedInternal.PrintJobHandle] = {
   ENABLE UNWIND = > NULL;
   pH ← instanceHead;
   WHILE (pH.outStream # bsH) AND (pH # NIL) DO pH ← pH.next ENDLOOP;
   RETURN[pH]};

FindInstanceByJob: PUBLIC ENTRY PROC[jobID: JobID.ID]
   RETURNS [pH: Print3SchedInternal.PrintJobHandle] = {
   ENABLE UNWIND = > NULL;
   pH ← instanceHead;
   WHILE (pH.jobID # jobID) AND (pH # NIL) DO pH ← pH.next ENDLOOP;
   RETURN[pH]};

RemoveInstance: PUBLIC ENTRY PROCEDURE [pH:
Print3SchedInternal.PrintJobHandle] = {
   instance: Print3SchedInternal.PrintJobHandle ← instanceHead;
   prevInstance: Print3SchedInternal.PrintJobHandle ← NIL;

WHILE (pH # instance) AND (instance # NIL) DO
    prevInstance ← instance;
    instance ← instance.next
   ENDLOOP;
  IF prevInstance # NIL THEN prevInstance.next ← instance.next
   ELSE instanceHead ← NIL};
```

END...

-- File: Print3StatusImpl.mesa - last edit:

DIRECTORY
  Courier USING [ExportRemoteProgram, UnexportRemoteProgram],
  EventHandler USING [MemoryActionCompleteProcType, ReportStateChange],
  Heap USING [systemZone],
  IPDIF USING [Init],
  JobID USING [nullID],
  JobQPlus USING [GetNumberOfJobs],
  PublicPrinting USING [Spooler],
  Print3 USING [Busy, ServiceUnavailable, SpoolingDisabled,
    TooManyClients, InsufficientSpoolSpace, SpoolingQueueFull],
  Print3Control USING [],
  Print3Courier USING [Dispatcher, Init, programNumber, version],
  Print3SM USING [InitList],
  Print3Status USING [],
  Process USING [Detach],
  ResMgrIDs USING [TransactionID],
  ResMgrStorage USING [bytesPerPage, Pages],
  SMNetServSSC,
  System USING [switches],
  TopLevel USING [WaitAllUp];

Print3StatusImpl: MONITOR
  IMPORTS Courier, EventHandler, Heap, IPDIF, JobQPlus, Print3, Print3Courier,
    Print3SM, Process, System, TopLevel
  EXPORTS Print3Control, SMNetServSSC, Print3Status =

BEGIN

-- Variables
  spoolingEnabled: BOOLEAN ← FALSE;
  serviceEnabled: BOOLEAN ← TRUE;
  serviceON: BOOLEAN ← FALSE;
  purgeON: BOOLEAN ← FALSE;
  shutdown: BOOLEAN ← FALSE;

diskUsage: ResMgrStorage.Pages ← 0;
  maxDiskUsage: ResMgrStorage.Pages ← 50000;  -- set by allocations
  maxExtensions: CARDINAL ← 32;  -- number of file extensions allowed.

openConnections: CARDINAL ← 0;
  maxConnections: CARDINAL ← 1;
  maxConnectionsOffPSwitch: CARDINAL = 6;
  connectionLimit: CARDINAL ← 6;  -- set by allocations -- Public Variables
  heap: PUBLIC UNCOUNTED ZONE ← Heap.systemZone;
  maxFileSize: PUBLIC ResMgrStorage.Pages ← 50000;  -- set by system limits
  pagesInBuffer: PUBLIC CARDINAL ← 60;
  bytesInBuffer: PUBLIC CARDINAL ← pagesInBuffer * ResMgrStorage.bytesPerPage;
  extendFileBy: PUBLIC ResMgrStorage.Pages ← MAX[pagesInBuffer,
maxFileSize/maxExtensions];
  defaultFileSize: PUBLIC ResMgrStorage.Pages ← pagesInBuffer;

--types memoryClearProc: EventHandler.MemoryActionCompleteProcType ← NIL;

-- Procedures

Shutdown: PUBLIC ENTRY PROCEDURE [id: ResMgrIDs.TransactionID,
        proc: EventHandler.MemoryActionCompleteProcType] =

BEGIN
ENABLE UNWIND = > NULL;

spoolingEnabled ← FALSE;
shutdown ← TRUE;

IF openConnections = 0 THEN {
  Process.Detach [FORK proc[[captureIP,netServ]]];
        RETURN;
  };

memoryClearProc ← proc;
END;

Resume: PUBLIC ENTRY PROCEDURE [id: ResMgrIDs.TransactionID] =

BEGIN
ENABLE UNWIND = > NULL;

spoolingEnabled ← TRUE;
shutdown ← FALSE;
END;

CheckStatus: < <Print3Status> > PUBLIC ENTRY PROCEDURE []
  RETURNS [disabled: BOOLEAN] =

BEGIN
ENABLE UNWIND = > NULL;

disabled ← IF shutdown OR
        NOT serviceEnabled OR
                NOT spoolingEnabled
    THEN TRUE ELSE FALSE;
END;

CheckServiceEnabled: < <Print3Status> > PUBLIC ENTRY PROCEDURE [] =

BEGIN
ENABLE UNWIND = > NULL;

IF purgeON THEN RETURN WITH ERROR Print3.Busy;

IF NOT serviceEnabled THEN RETURN WITH ERROR Print3.ServiceUnavailable;
END;

```
CloseConnection: <<Print3Status>> PUBLIC ENTRY PROCEDURE [error:
BOOLEAN] =

BEGIN
  ENABLE UNWIND => NULL;
  IF openConnections # 0 THEN openConnections <- openConnections - 1;
  IF shutdown THEN DoShutdown[];
  END;

CloseDiskConnection: <<Print3Status>> PUBLIC ENTRY PROCEDURE [size:
ResMgrStorage.Pages] =

BEGIN
  ENABLE UNWIND => NULL;

IF diskUsage <= size THEN diskUsage <- 0
  ELSE diskUsage <- diskUsage - size;
  END;

<< CloseStreamConnection: PUBLIC ENTRY PROCEDURE [] =

BEGIN
  ENABLE UNWIND => NULL;

streamAvailable <- TRUE;
  IF openConnections # 0 THEN
    openConnections <- openConnections - 1;
  IF shutdown THEN DoShutdown[];
  END; >>

ExportService: PUBLIC ENTRY PROCEDURE [] =

BEGIN << ExportService >>
  ENABLE UNWIND => NULL;

IF serviceON THEN RETURN;

Courier.ExportRemoteProgram[
    programNumber: Print3Courier.programNumber,
    versionRange: [Print3Courier.version, Print3Courier.version],
        zone: heap,
    dispatcher: Print3Courier.Dispatcher,
        classOfService: bulk,
    serviceName: "PrintProtocol"L];

serviceON <- TRUE;
  END; << ExportService >>

Init: PUBLIC PROCEDURE [] = {
  Process.Detach[FORK InitInternal[]]};

CheckDiskUsage: PUBLIC ENTRY PROCEDURE [masterSize: ResMgrStorage.Pages,
``` completed: BOOLEAN] =

BEGIN
ENABLE UNWIND = > NULL;

IF (diskUsage + masterSize) > = maxDiskUsage THEN
 RETURN WITH ERROR Print3.InsufficientSpoolSpace;
IF completed THEN diskUsage ← diskUsage + masterSize;
END;

GetSpoolingStatus: < <Print3Status> > PUBLIC ENTRY PROCEDURE []
 RETURNS [status: PublicPrinting.Spooler] =

BEGIN
ENABLE UNWIND = > NULL;

IF NOT spoolingEnabled THEN
 status ← disabled
ELSE IF JobQPlus.GetNumberOfJobs[].systemLimitReached THEN
 status ← full
ELSE IF openConnections < maxConnections THEN
 status ← available
ELSE
 status ← busy;
END;

OpenConnection: PUBLIC ENTRY PROCEDURE [] =

BEGIN
ENABLE UNWIND = > NULL;

IF NOT spoolingEnabled THEN
 RETURN WITH ERROR Print3.SpoolingDisabled;

IF JobQPlus.GetNumberOfJobs[].systemLimitReached THEN
 RETURN WITH ERROR Print3.SpoolingQueueFull;

IF openConnections > = maxConnections THEN
 RETURN WITH ERROR Print3.TooManyClients;

openConnections ← openConnections + 1;
END;

PurgeCompleted: PUBLIC ENTRY PROCEDURE [] =
BEGIN
ENABLE UNWIND = > NULL;

purgeON ← FALSE;
END;

SetMaxPrintConnections: PUBLIC ENTRY PROCEDURE
 [newLimit: CARDINAL] RETURNS [ok: BOOLEAN ← TRUE] =

BEGIN

```
        ENABLE UNWIND = > NULL;

IF newLimit IN [0..connectionLimit] THEN
      maxConnections ← newLimit
    ELSE
      ok ← FALSE;
    END;

SetMaxDiskUsage: PUBLIC ENTRY PROCEDURE
    [pages: ResMgrStorage.Pages] =
    BEGIN
    ENABLE UNWIND = > NULL;
    maxDiskUsage ← pages;
    END;

SetPrint3ServerSwitch: PUBLIC ENTRY PROCEDURE
    [onLine: BOOLEAN] =

BEGIN
    ENABLE UNWIND = > NULL;

serviceEnabled ← onLine;
    END;

SetServiceSwitch: PUBLIC PROCEDURE [onLine: BOOLEAN] =

BEGIN
    IF onLine THEN
      ExportService[]
    ELSE
      UnexportService[];
    END;

SetSpoolingSwitch: PUBLIC ENTRY PROCEDURE [enable: BOOLEAN] =

BEGIN
    ENABLE UNWIND = > NULL;

spoolingEnabled ← enable;
    END;

UnexportService: PUBLIC ENTRY PROCEDURE [] =

BEGIN
    ENABLE UNWIND = > NULL;

IF NOT serviceON THEN RETURN;

Courier.UnexportRemoteProgram[
      programNumber: Print3Courier.programNumber,
      versionRange: [Print3Courier.version, Print3Courier.version]];
```

```
serviceON ← FALSE;
END;

-- Private Procedures

DoShutdown: PROCEDURE [] =
BEGIN
IF openConnections = 0 AND memoryClearProc # NIL THEN {
  memoryClearProc[[captureIP,netServ]];
        memoryClearProc ← NIL;
        };
END;

InitInternal: ENTRY PROCEDURE [] =

BEGIN
ENABLE UNWIND = > NULL;

TopLevel.WaitAllUp[];
EventHandler.ReportStateChange[
id: [trans: captureIP, module: netServ],
data: [
state: notReady, jobInfo: [JobID.nullID, add, medium, 0, running],
resume: none, faultList: [NIL, NIL, NIL, NIL]]];

Print3SM.InitList[];
Print3Courier.Init[];
IPDIF.Init[];
IF System.switches['P] = down THEN
  maxConnections ← maxConnectionsOffPSwitch;
IF System.switches['n] = down THEN
  maxDiskUsage ← LAST [LONG CARDINAL];

EventHandler.ReportStateChange[
id: [trans: captureIP, module: netServ],
data: [
state: ready, jobInfo: [JobID.nullID, add, medium, 0, running],
resume: none, faultList: [NIL, NIL, NIL, NIL]]];
END;

END.
```

EXTERNAL SOFTWARE INTERFACES TO THE DIF SOFTWARE:

ASWFileTypes USING [rasterJob],
  BlockStream USING [StreamHandle];
  ByteBlt USING [ByteBlt],
  Courier USING [ErrorCode],
  DBError USING [OperationFailed],
  DirectoryType USING [OperatorAccess],
  Environment USING [Byte, bytesPerPage],
  EventHandler USING [MemoryActionCompleteProcType],
  FaultLogger USING [ID],
  Heap USING [systemZone],
  Inline USING [BITOR, LongMult],
  JobBackUp USING [LockID],
  JobID USING [ID],
  JobStep USING [RootStep],
  JobQ USING [Priority],
  MRSignature USING [defaultTrimOffset, defaultTrimSizeX, defaultTrimSizeY,
    TrimOffset, TrimSizeX, TrimSizeY],
  NetStream USING [CreateStream, CreateDiskStream],
  Print3 USING [PrintAttributes, PrintOptions, RequestID],
  Print3Control USING [],
  Print3Courier USING [Dispatcher, Init, programNumber, version],
  Process USING [Detach],
  PublicPrinting USING [Finishing, InternalMedia, PagesToPrint, Plex],
  RasterObjects USING [PixelSequence, PixelOverhead],
  ResMgrIDs USING [ID],
  ResMgrStorage USING [Pages];
  RMCache USING [BackFillSegment, «Error,» SegmentDescriptor],
  RTOSFile USING [FileID, nullID];
  RTOSIGStructures USING [
    TiledImageXYEntry, TiledImageXYTablePtr, TiledImageBreakTablePtr,
    TiledImageBreakEntry],
  RTOSMP2Process USING [DirectProcess],
  ServPreParse USING [DefaultRecord],
  Stream USING [CompletionCode];
  System USING [GreenwichMeanTime],
  Time USING [Current, defaultTime],
  TopLevel USING [WaitAllUp];
  UserProfile USING [DefaultJobAccess];
  XStream USING [BUG];

What is claimed is:

1. A printing system for producing prints from a first job and a second job, each of the first and second jobs being represented by a first data stream and a second data stream, respectively, each of the first and second data streams being generated by a data generating source, each of the first and second data streams being represented in a page description language and including one or more images, each of the images being represented by image data, the second data stream including a token expressed as a word, the word indicating that the second data stream includes a bitmap, comprising:

a parsing system for receiving the first data stream and separating the image data from the first data stream;

mass memory for receiving the image data separated from the first data stream by said parsing system, said mass memory including a raster memory section;

an input filtering section for receiving the second stream of data while said parsing system is separating the image data from the first data stream, said input filtering section including an input filter for reading a block of data from the second data stream to determine the presence of the token in the block of data;

a processor, responsive to said input filtering section, for performing an operation on the second data stream when said input filter has determined the presence of the token in the block of data, said operation including separating the bitmap from the second data stream to form a modified stream of data and a stream of image data, the stream of image data comprising the bitmap; said processor performing said operation on the second data stream concurrently with said parsing system separating the image data from the first data stream; and a page description storage memory section, the modified stream of data being stored in said page description language memory section and the stream of image data being stored in said raster memory section, wherein the modified stream of data is transmitted to said parsing system in lieu of the second stream of data and the stream of image data is extracted from the second data stream prior to communicating the modified data stream to the parsing system so that an amount of time required to parse the second data stream is minimized.

2. The printing system of claim 1, wherein the modified stream of data includes information designating a storage location for the stream of image data in said raster memory section.

3. The printing system of claim 1, in which said input filtering section communicates with multiple clients by way of a network connection, wherein the multiple clients access said input filtering section in parallel.

4. The printing system of claim 1, wherein said input filtering section includes a stream utility for managing transmission of the modified data stream to said page description storage memory section and transmission of the image data stream to said raster memory section.

5. A printing system for producing prints from a first job and a second job, each of the first and second jobs being represented by a first data stream and a second data stream, respectively, each of the first and second data streams being represented in a page description language with the page description language including control instructions dictating a manner in which a job is to be processed, the first and second data streams including one or more images with each image being represented by image data, the second data stream including one or more words, comprising:

a parsing system for receiving the first data stream and separating the image data from the first data stream;

mass memory for receiving the image data separated from the first data stream by said parsing system, said mass memory including a raster memory section;

an input/output device for performing an operation dictated by the control instructions of the second job, said input/output device including one or more device characteristics which are modifiable to permit the second job to be executed in accordance with its corresponding control instructions;

an input filtering section for receiving the second stream of data while said parsing system is separating the image data from the first data stream, said input filtering section including an input filter for reading a block of data from the second data stream, while image data is being separated from the first data stream, to determine the presence of the one or more words in the block of data;

a processor, responsive to said input filtering section, for performing a printing system operation in response to said input filter determining the presence of the one or more words in the block of data, said printing system operation including modifying the one or more device characteristics to permit the second job to be executed in accordance with the corresponding control instructions, said processor performing said operation on the second data stream concurrently with said parsing system separating the image data from the first data stream so that the printing system is provided with multi-tasking capability with respect to execution of the first and second jobs.

6. The printing system of claim 5, in which said input/output device comprises a printing machine including one or more font types, wherein the one or more device characteristics comprise the one or more font types available in the printing system.

7. The printing system of claim 6, in which the second data stream includes information regarding a font requirement dictated by the job, wherein said input filtering section includes a stream utility for determining whether the font requirement dictated by the job can be fulfilled in view of the one or more font types available in the printing system 8. The printing system of claim 5, in which the input/output device comprises a finishing device including one or more configurable finishing attributes, wherein the one or more device characteristics comprise the one or more finishing attributes.

9. The printing system of claim 8, in which the second data stream includes information regarding a manner in which the finishing attributes are to be configured, wherein said input filtering section includes a stream utility for configuring the finishing attributes with the information in the second data stream.

10. The printing system of claim 5, in which the printing system includes a printing machine with the printing machine including said parsing system, said mass memory, said input filtering section and said processor, wherein said input/output device communicates with the printing machine by way of a network connection.

11. In a printing system for producing prints from a first job and a second job, each of the first and second jobs being represented by a first data stream and a second data stream, respectively, each of the first and second data streams being generated by a data generating source, each of the first and second data streams being represented in a page description language and including one or more images, each of the images being represented by image data, the second data stream including a token expressed as a word, the word indicating that the second data stream includes a bitmap, a method of processing the first and second jobs, comprising:

parsing the first data stream to separate the the image data from the first data stream;

storing the image data separated from the first data stream in mass memory, said mass memory including a raster memory section;

reading a block of data from the second data stream, while the first data stream is being parsed with said parsing, to determine the presence of the token in the block of data;

performing an operation on the second data stream when it is determined, with said reading, that the token is present in the block of data, said performing being concurrent with said parsing and including stripping the bitmap from the first data stream to form a modified stream of data and a stream of image data, the stream of image data comprising the bitmap; and storing the modified stream of data in the page description language memory section and the stripped bitmap in said raster memory section, wherein the bitmap is stripped from the second data stream prior to parsing the second data stream so that an amount of time required to parse the second data stream is decreased substantially.

12. The method of claim 11, further comprising providing the modified stream of data with information designating a storage location for the bitmap in said raster memory section.

13. The method of claim 11, in which a third data stream having a block of data with a token is provided to the printing system, wherein said reading includes reading the block of data from the second data stream and the block of data from the third data stream concurrently.

14. The method of claim 11, wherein said storing of the modified stream of data and the stripped bitmap is performed with a stream utility.

15. In a printing system for producing prints from a first job and a second job, each of the first and second jobs being represented by a first data stream and a second data stream, respectively, each of the first and second data streams being represented in a page description language with the page description language including control instructions dictating a manner in which a job is to be processed, the first and second data streams including one or more images with each image being represented by image data, the second data stream including one or more words, comprising:

a) providing an input/output device for performing an operation dictated by the control instructions of the second job, said input/output device including one or more device characteristics which are modifiable to permit the second job to be executed in accordance with its corresponding control instructions;

b) parsing the first data stream to separate the the image data from the first data stream;

c) storing the image data separated from the first data stream in mass memory;

d) reading a block of data from the second data stream, while the first data stream is being parsed with said parsing, to determine the presence of the one or more words in the block of data; and e) performing an operation in the printing system when it is determined, with said reading, that the one or more words are present in the block of data, said performing being concurrent with said b) and including modifying the one or more device characteristics to permit the second job to be executed in accordance with the corresponding control instructions, wherein the printing system is provided with multi-tasking capability with respect to execution of the first and second jobs.

16. The method of claim 15, in which the printing system includes a printing machine at which said b) through e) are performed, further comprising providing a network connection between the printing machine and the input/output device.

17. The method of claim 15, in which the printing system includes a font storage section with one or more preselected font types and the second data stream includes font requirements dictated by the second job, further comprising determining if one or more of the one or more preselected font types corresponds with the the font requirements dictated by the second job.

18. The method of claim 17, in which said printing system includes a stream utility, wherein said determining is performed with the stream utility.

19. The method of claim 15, in which the input/output device comprises a finishing device including one or more configurable finishing attributes, wherein said e) includes configuring at least one of the one or more configurable finishing attributes in accordance with the one or more words present in the second data stream.

* * * * *